(12) United States Patent
Van Os

(10) Patent No.: US 10,169,431 B2
(45) Date of Patent: Jan. 1, 2019

(54) DEVICE, METHOD, AND GRAPHICAL USER INTERFACE FOR MAPPING DIRECTIONS BETWEEN SEARCH RESULTS

(71) Applicant: Apple Inc., Cupertino, CA (US)

(72) Inventor: Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 14/513,050

(22) Filed: Oct. 13, 2014

(65) Prior Publication Data

US 2015/0032735 A1   Jan. 29, 2015

Related U.S. Application Data

(63) Continuation of application No. 12/788,281, filed on May 26, 2010, now Pat. No. 8,862,576, which is a
(Continued)

(51) Int. Cl.
*G06F 17/30* (2006.01)
*G06F 3/0482* (2013.01)
(Continued)

(52) U.S. Cl.
CPC ...... *G06F 17/30554* (2013.01); *G06F 3/0482* (2013.01); *G06F 3/0485* (2013.01);
(Continued)

(58) Field of Classification Search
CPC ........... G06F 17/3087; G06F 17/30554; G06F 17/3097; G06F 3/0482; G06F 3/0485;
(Continued)

(56) References Cited

U.S. PATENT DOCUMENTS 4,899,138 A   2/1990   Araki et al.
4,935,728 A   6/1990   Kley
(Continued)

FOREIGN PATENT DOCUMENTS

CN   1683905 A   10/2005
CN   1754084 A   3/2006
(Continued)

OTHER PUBLICATIONS

International Preliminary Report on Patentability received for PCT Patent Application No. PCT/US2010/020229, dated Jul. 19, 2012, 13 pages.
(Continued)

*Primary Examiner* — Merilyn P Nguyen
(74) *Attorney, Agent, or Firm* — Dentons US LLP

(57) ABSTRACT

A method includes: displaying a map, a first field configured to receive a first query input, and a second field configured to receive a second query input; receiving the first query input in the first field; receiving the second query input in the second field; initiating a search that uses the first query input and a search that uses the second query input; concurrently displaying on the map a first plurality of search results for the first query input and a second plurality of search results for the second query input; detecting selection of a first search result in the first plurality of search results; detecting selection of a second search result in the second plurality of search results; and displaying a route on the map from the first search result to the second search result.

39 Claims, 72 Drawing Sheets

Related U.S. Application Data continuation of application No. PCT/US2010/020229, filed on Jan. 6, 2010.

(51) Int. Cl.
   *G06F 3/0485* (2013.01)
   *G06F 3/0488* (2013.01)

(52) U.S. Cl.
   CPC ........ *G06F 3/0488* (2013.01); *G06F 17/3087* (2013.01); *G06F 17/3097* (2013.01)

(58) Field of Classification Search
   CPC ............. G06F 3/0488; G06F 17/30958; G06F 3/04842; G01C 21/367
   USPC ........................................................ 707/722
   See application file for complete search history.

(56) References Cited

U.S. PATENT DOCUMENTS

| | | | |
|---|---|---|---|
| 5,416,890 | A | 5/1995 | Beretta |
| 5,559,707 | A | 9/1996 | Delorme et al. |
| 5,594,469 | A | 1/1997 | Freeman et al. |
| 5,594,810 | A | 1/1997 | Gourdol |
| 5,608,635 | A | 3/1997 | Tamai |
| 5,714,698 | A | 2/1998 | Tokioka et al. |
| 5,760,767 | A | 6/1998 | Shore et al. |
| 5,760,773 | A | 6/1998 | Berman et al. |
| 5,802,492 | A | 9/1998 | Delorme et al. |
| 5,825,352 | A | 10/1998 | Bisset et al. |
| 5,825,357 | A | 10/1998 | Malamud et al. |
| 5,864,635 | A | 1/1999 | Zetts et al. |
| 5,867,150 | A | 2/1999 | Bricklin et al. |
| 5,877,751 | A | 3/1999 | Kanemitsu et al. |
| 6,002,808 | A | 12/1999 | Freeman |
| 6,009,462 | A | 12/1999 | Birrell et al. |
| 6,028,271 | A | 2/2000 | Gillespie et al. |
| 6,038,508 | A | 3/2000 | Maekawa et al. |
| 6,038,522 | A | 3/2000 | Manson et al. |
| 6,040,824 | A | 3/2000 | Maekawa et al. |
| 6,072,494 | A | 6/2000 | Nguyen |
| 6,115,025 | A | 9/2000 | Buxton et al. |
| 6,115,053 | A | 9/2000 | Perlin |
| 6,201,544 | B1 | 3/2001 | Ezaki |
| 6,229,525 | B1 | 5/2001 | Alexander |
| 6,321,158 | B1 | 11/2001 | DeLorme et al. |
| 6,336,072 | B1 | 1/2002 | Takayama et al. |
| 6,380,931 | B1 | 4/2002 | Gillespie et al. |
| 6,405,129 | B1 | 6/2002 | Yokota |
| 6,434,484 | B1 | 8/2002 | Lee |
| 6,496,695 | B1 | 12/2002 | Kouji et al. |
| 6,512,529 | B1 | 1/2003 | Janssen et al. |
| 6,600,502 | B1 | 7/2003 | Brewster, Jr. |
| 6,667,751 | B1 | 12/2003 | Wynn et al. |
| 6,687,613 | B2 | 2/2004 | Yokota |
| 6,791,536 | B2 | 9/2004 | Keely et al. |
| 6,795,017 | B1 | 9/2004 | Puranik et al. |
| 6,894,678 | B2 | 5/2005 | Rosenberg et al. |
| 6,983,203 | B1 | 1/2006 | Wako |
| 7,032,187 | B2 | 4/2006 | Keely, Jr. et al. |
| 7,046,230 | B2 | 5/2006 | Zadesky et al. |
| 7,047,113 | B1 | 5/2006 | Burch et al. |
| 7,142,978 | B2 | 11/2006 | Nix et al. |
| 7,239,301 | B2 | 7/2007 | Liberty et al. |
| 7,256,770 | B2 | 8/2007 | Hinckley et al. |
| 7,366,609 | B2 | 4/2008 | Lee |
| 7,373,244 | B2 | 5/2008 | Kreft |
| 7,376,640 | B1 | 5/2008 | Anderson et al. |
| 7,379,811 | B2 | 5/2008 | Rasmussen et al. |
| 7,388,519 | B1 | 6/2008 | Kreft |
| 7,439,969 | B2 | 10/2008 | Chithambaram et al. |
| 7,457,704 | B2 | 11/2008 | Yasuda et al. |
| 7,479,949 | B2 | 1/2009 | Jobs et al. |
| 7,484,180 | B2 | 1/2009 | McCormack et al. |
| 7,487,114 | B2 | 2/2009 | Florance et al. |
| 7,495,659 | B2 | 2/2009 | Marriott et al. |
| 7,499,040 | B2 | 3/2009 | Zadesky et al. |
| 7,595,725 | B1 | 9/2009 | Joseph et al. |
| 7,603,230 | B2 | 10/2009 | Suzuki et al. |
| 7,620,496 | B2 | 11/2009 | Rasmussen |
| 7,640,100 | B2 | 12/2009 | Spinelli |
| 7,656,393 | B2 | 2/2010 | King et al. |
| 7,663,607 | B2 | 2/2010 | Hotelling et al. |
| 7,676,767 | B2 | 3/2010 | Hofmeister et al. |
| 7,728,821 | B2 | 6/2010 | Hillis et al. |
| 7,768,395 | B2 | 8/2010 | Gold |
| 7,777,648 | B2 | 8/2010 | Smith et al. |
| 7,797,642 | B1 | 9/2010 | Karam et al. |
| 7,800,592 | B2 | 9/2010 | Kerr et al. |
| 7,808,479 | B1 | 10/2010 | Hotelling et al. |
| 7,812,826 | B2 | 10/2010 | Ording et al. |
| 7,812,860 | B2 | 10/2010 | King et al. |
| 7,831,917 | B1 | 11/2010 | Karam |
| 7,840,350 | B2 | 11/2010 | Spinelli |
| 7,890,886 | B2 | 2/2011 | Matthews et al. |
| 7,891,103 | B2 | 2/2011 | Mayor et al. |
| 7,907,124 | B2 | 3/2011 | Hillis et al. |
| 7,912,634 | B2 | 3/2011 | Reed et al. |
| 7,933,895 | B2 | 4/2011 | Amjadi |
| 7,945,546 | B2 | 5/2011 | Bliss et al. |
| 8,010,407 | B1 | 8/2011 | Santoro et al. |
| 8,019,531 | B2 | 9/2011 | Pinkus et al. |
| 8,060,389 | B2 | 11/2011 | Johnson |
| 8,090,533 | B2 | 1/2012 | Koike et al. |
| 8,095,303 | B1 | 1/2012 | Nesbitt et al. |
| 8,108,137 | B2 | 1/2012 | Kim |
| 8,122,384 | B2 | 2/2012 | Partridge et al. |
| 8,171,432 | B2 | 5/2012 | Matas et al. |
| 8,184,102 | B2 | 5/2012 | Park et al. |
| 8,205,157 | B2 | 6/2012 | Van Os et al. |
| 8,250,493 | B2 | 8/2012 | Yang et al. |
| 8,285,481 | B2 | 10/2012 | De Silva et al. |
| 8,302,033 | B2 | 10/2012 | Matas et al. |
| 8,332,144 | B2 | 12/2012 | Diaz et al. |
| 8,456,297 | B2 | 6/2013 | Van Os |
| 8,464,182 | B2 | 6/2013 | Blumenberg et al. |
| 8,468,469 | B1 | 6/2013 | Mendis et al. |
| 8,473,193 | B2 | 6/2013 | Neef et al. |
| 8,489,641 | B1 | 7/2013 | Seefeld et al. |
| 8,532,678 | B2 | 9/2013 | Geelen |
| 8,537,119 | B1 | 9/2013 | Grivna et al. |
| 8,573,479 | B1 | 11/2013 | Jenkins et al. |
| 8,607,167 | B2 | 12/2013 | Matas et al. |
| 8,793,575 | B1 | 7/2014 | Lattyak et al. |
| 8,862,576 | B2 | 10/2014 | Van Os |
| 9,329,051 | B1 | 5/2016 | Ichinokawa et al. |
| 9,880,699 | B2 * | 1/2018 | Bliss ................... G01C 21/367 |
| 2001/0020211 | A1 | 9/2001 | Takayama et al. |
| 2001/0045949 | A1 | 11/2001 | Chithambaram et al. |
| 2002/0015064 | A1 | 2/2002 | Robotham et al. |
| 2002/0057263 | A1 | 5/2002 | Keely et al. |
| 2002/0087262 | A1 | 7/2002 | Bullock et al. |
| 2002/0183924 | A1 | 12/2002 | Yokota |
| 2003/0018427 | A1 | 1/2003 | Yokota et al. |
| 2003/0054830 | A1 | 3/2003 | Williams et al. |
| 2003/0095112 | A1 | 5/2003 | Kawano et al. |
| 2003/0177265 | A1 | 9/2003 | Page et al. |
| 2003/0231190 | A1 | 12/2003 | Jawerth et al. |
| 2004/0030493 | A1 | 2/2004 | Pechatnikov et al. |
| 2004/0243307 | A1 | 12/2004 | Geelen |
| 2004/0260465 | A1 | 12/2004 | Tu |
| 2005/0032527 | A1 | 2/2005 | Sheha et al. |
| 2005/0055662 | A1 | 3/2005 | Strausbaugh et al. |
| 2005/0114021 | A1 | 5/2005 | Krull et al. |
| 2005/0125144 | A1 | 6/2005 | Nakagawa |
| 2005/0203768 | A1 | 9/2005 | Florance et al. |
| 2005/0239478 | A1 | 10/2005 | Spirito |
| 2005/0251331 | A1 * | 11/2005 | Kreft ....................... G01C 3/08 701/438 |
| 2005/0253806 | A1 | 11/2005 | Liberty et al. |
| 2006/0004304 | A1 | 1/2006 | Park |
| 2006/0022048 | A1 | 2/2006 | Johnson |
| 2006/0026521 | A1 | 2/2006 | Hotelling et al. |
| 2006/0026535 | A1 | 2/2006 | Hotelling et al. |

(56) References Cited

U.S. PATENT DOCUMENTS

| | | |
|---|---|---|
| 2006/0026536 A1 | 2/2006 | Hotelling et al. |
| 2006/0047416 A1 | 3/2006 | Goldberg et al. |
| 2006/0068808 A1 | 3/2006 | Karavias |
| 2006/0085767 A1 | 4/2006 | Hinckley et al. |
| 2006/0132455 A1 | 6/2006 | Rimas-Ribikauskas et al. |
| 2006/0143574 A1 | 6/2006 | Ito et al. |
| 2006/0181517 A1 | 8/2006 | Zadesky et al. |
| 2006/0192078 A1 | 8/2006 | Yang et al. |
| 2006/0197753 A1 | 9/2006 | Hotelling |
| 2006/0224311 A1 | 10/2006 | Watanabe et al. |
| 2006/0229802 A1 | 10/2006 | Vertelney et al. |
| 2006/0239248 A1 | 10/2006 | Hawk et al. |
| 2006/0242607 A1 | 10/2006 | Hudson |
| 2006/0267958 A1 | 11/2006 | Kolmykov-Zotov et al. |
| 2006/0284852 A1 | 12/2006 | Hofmeister et al. |
| 2007/0011150 A1* | 1/2007 | Frank ............. G06F 17/30241 |
| 2007/0033089 A1 | 2/2007 | Dharmarajan et al. |
| 2007/0037558 A1 | 2/2007 | Yu et al. |
| 2007/0046643 A1 | 3/2007 | Hillis et al. |
| 2007/0061126 A1 | 3/2007 | Russo et al. |
| 2007/0080958 A1 | 4/2007 | Chithambaram et al. |
| 2007/0083324 A1 | 4/2007 | Suzuki et al. |
| 2007/0112729 A1 | 5/2007 | Wiseman et al. |
| 2007/0118520 A1* | 5/2007 | Bliss ............. G01C 21/367 |
| 2007/0124062 A1 | 5/2007 | Janky et al. |
| 2007/0143264 A1* | 6/2007 | Szeto ............. G06F 17/30643 |
| 2007/0168888 A1 | 7/2007 | Jawerth |
| 2007/0176796 A1 | 8/2007 | Bliss et al. |
| 2007/0189737 A1 | 8/2007 | Chaudhri et al. |
| 2007/0225904 A1 | 9/2007 | Pantalone et al. |
| 2007/0236477 A1 | 10/2007 | Ryu et al. |
| 2007/0257891 A1 | 11/2007 | Esenther et al. |
| 2007/0271255 A1* | 11/2007 | Pappo ............. G06F 17/30864 |
| 2007/0273664 A1 | 11/2007 | Kim et al. |
| 2007/0281690 A1 | 12/2007 | Altman et al. |
| 2007/0282621 A1 | 12/2007 | Altman |
| 2007/0288480 A1* | 12/2007 | Caplan ............. G06F 17/30867 |
| 2008/0030460 A1 | 2/2008 | Hildreth et al. |
| 2008/0036743 A1 | 2/2008 | Westerman et al. |
| 2008/0040315 A1 | 2/2008 | Auerbach et al. |
| 2008/0055263 A1 | 3/2008 | Lemay et al. |
| 2008/0055269 A1 | 3/2008 | Lemay et al. |
| 2008/0082262 A1 | 4/2008 | Silva et al. |
| 2008/0086356 A1* | 4/2008 | Glassman ............. G06Q 30/02 705/14.41 |
| 2008/0088602 A1 | 4/2008 | Hotelling |
| 2008/0122796 A1 | 5/2008 | Jobs et al. |
| 2008/0147730 A1 | 6/2008 | Lee et al. |
| 2008/0154774 A1 | 6/2008 | Dennison et al. |
| 2008/0165144 A1 | 7/2008 | Forstall et al. |
| 2008/0165153 A1 | 7/2008 | Platzer et al. |
| 2008/0167809 A1 | 7/2008 | Geelen |
| 2008/0168396 A1 | 7/2008 | Matas et al. |
| 2008/0168398 A1 | 7/2008 | Geelen et al. |
| 2008/0172357 A1 | 7/2008 | Rechis et al. |
| 2008/0208447 A1 | 8/2008 | Geelen et al. |
| 2008/0208456 A1 | 8/2008 | Jouline et al. |
| 2008/0209332 A1 | 8/2008 | Chevsky et al. |
| 2008/0228386 A1 | 9/2008 | Geelen et al. |
| 2008/0320391 A1 | 12/2008 | Lemay et al. |
| 2008/0320419 A1* | 12/2008 | Matas ............. G01C 21/20 715/863 |
| 2009/0006543 A1* | 1/2009 | Smit ............. G06F 17/30864 709/203 |
| 2009/0024590 A1 | 1/2009 | Sturge et al. |
| 2009/0037101 A1 | 2/2009 | Koike et al. |
| 2009/0058820 A1 | 3/2009 | Hinckley |
| 2009/0064055 A1 | 3/2009 | Chaudhri et al. |
| 2009/0090567 A1 | 4/2009 | Tonouchi |
| 2009/0132395 A1* | 5/2009 | Lam ............. G06F 17/30699 705/30 |
| 2009/0172599 A1 | 7/2009 | Nezu |
| 2009/0177385 A1 | 7/2009 | Matas et al. |
| 2009/0178007 A1 | 7/2009 | Matas et al. |
| 2009/0244023 A1 | 10/2009 | Kim et al. |
| 2009/0271745 A1 | 10/2009 | Sakamoto et al. |
| 2009/0281724 A1 | 11/2009 | Blumenberg et al. |
| 2009/0289815 A1 | 11/2009 | Reed et al. |
| 2009/0295753 A1 | 12/2009 | King et al. |
| 2009/0299620 A1* | 12/2009 | Shin ............. G01C 21/3484 701/532 |
| 2010/0005061 A1 | 1/2010 | Basco et al. |
| 2010/0031186 A1 | 2/2010 | Tseng et al. |
| 2010/0057712 A1* | 3/2010 | Ranganathan, Sr. .................. G06F 17/30873 707/E17.014 |
| 2010/0094548 A1* | 4/2010 | Tadman ............. G01C 21/36 701/533 |
| 2010/0107099 A1 | 4/2010 | Frazier et al. |
| 2010/0114916 A1* | 5/2010 | Cooke ............. G06F 17/30873 707/752 |
| 2010/0121917 A1 | 5/2010 | Chevsky et al. |
| 2010/0225607 A1 | 9/2010 | Kim |
| 2010/0293186 A1* | 11/2010 | Nambata et al. ............. 707/769 |
| 2010/0309149 A1 | 12/2010 | Blumenberg et al. |
| 2010/0312462 A1 | 12/2010 | Gueziec et al. |
| 2011/0041084 A1 | 2/2011 | Karam |
| 2011/0045868 A1 | 2/2011 | Sheha et al. |
| 2011/0112754 A1 | 5/2011 | Reed et al. |
| 2011/0112755 A1 | 5/2011 | Reed et al. |
| 2011/0164058 A1 | 7/2011 | Lemay |
| 2011/0184638 A1 | 7/2011 | Jouline et al. |
| 2011/0276591 A1* | 11/2011 | Bliss ............. G01C 21/367 707/769 |
| 2011/0289104 A1 | 11/2011 | Watt |
| 2012/0011137 A1 | 1/2012 | Sheha et al. |
| 2012/0030308 A1* | 2/2012 | Jeffe ............. H04L 67/18 709/217 |
| 2012/0109509 A1 | 5/2012 | Nesbitt et al. |
| 2012/0221978 A1 | 8/2012 | Matas et al. |
| 2012/0262482 A1 | 10/2012 | Miwa |
| 2012/0287218 A1 | 11/2012 | Ok |
| 2012/0311478 A1 | 12/2012 | Van Os et al. |
| 2013/0055163 A1 | 2/2013 | Matas et al. |
| 2013/0080923 A1 | 3/2013 | Anzures et al. |
| 2013/0097173 A1 | 4/2013 | Stovicek et al. |
| 2013/0326380 A1 | 12/2013 | Lai et al. |
| 2013/0326407 A1 | 12/2013 | Van Os et al. |
| 2014/0095073 A1 | 4/2014 | Matas et al. |
| 2014/0365901 A1 | 12/2014 | Moha et al. |
| 2016/0290818 A1 | 10/2016 | Kim et al. |
| 2017/0059340 A1 | 3/2017 | Kim et al. |

FOREIGN PATENT DOCUMENTS

| | | |
|---|---|---|
| CN | 101033981 A | 9/2007 |
| CN | 101097152 A | 1/2008 |
| CN | 101270998 A | 9/2008 |
| CN | 101430697 A | 5/2009 |
| DE | 102005047648 A1 | 4/2007 |
| DE | 102008008948 A1 | 8/2009 |
| EP | 908835 A2 | 4/1999 |
| EP | 1653376 A2 | 5/2006 |
| EP | 1840511 A1 | 10/2007 |
| EP | 2077436 A1 | 7/2009 |
| TW | 200942784 A | 10/2009 |
| WO | 1997/007467 A1 | 2/1997 |
| WO | 1998/007112 A2 | 2/1998 |
| WO | 2003/017120 A1 | 2/2003 |
| WO | 2004/076977 A1 | 9/2004 |
| WO | 2005/104039 A2 | 11/2005 |
| WO | 2007/131225 A2 | 11/2007 |
| WO | 2008/081521 A1 | 7/2008 |
| WO | 2009/002942 A2 | 12/2008 |

OTHER PUBLICATIONS

European Search Report received for European Patent Application No. 12187505.8, dated Jan. 14, 2013, 3 pages.
Office Action received for European Patent Application No. 12187505.8, dated Feb. 12, 2013, 5 pages.

(56) References Cited

OTHER PUBLICATIONS

Office Action received for Korean Patent Application No. 10-2012-7022248, dated Jun. 12, 2014, 7 pages (3 pages of English Translation and 4 pages of Official Copy).
Office Action received for Korean Patent Application No. 10-2012-7022253, dated Jun. 12, 2014, 8 pages (4 pages of English Translation and 4 pages of Official Copy).
Office Action received for Korean Patent Application No. 10-2012-7020652, dated Aug. 4, 2014, 5 pages (2 pages of English Translation and 3 pages of Official Copy).
Final Office Action received for U.S. Appl. No. 11/969,211, dated Aug. 17, 2011, 24 pages.
Office Action received for Chinese Patent Application No. 201080001767.6, dated Sep. 16, 2014, 11 pages (Official Copy only). (See Communication under 37 CFR § 1.98(a) (3)).
Notice of Allowance received for Korean Patent Application No. 10-2012-7022248, dated Apr. 29, 2015, 2 pages (Official Copy only).(See Communication under 37 CFR § 1.98(a) (3)).
Office Action received for Korean Patent Application No. 10-2012-7022253, dated Apr. 29, 2015, 4 pages (Official Copy only).(See Communication under 37 CFR § 1.98(a) (3)).
Office Action received for Australian Patent Application No. 2014202094, dated Apr. 21, 2015, 3 pages.
Mio, "MioMap v 3.2 User Manual—Navigation Software for Mio DigiWalker C310", US English Version, available at <http://www.gpspassion.com/upload/MioMap_englishUS.pdf>, Aug. 2006, 84 pages.
Mio, "User's Manual MioMap 2.0", available at <http://web.archive.org/web/200612140000736/http://www.miotech.be/Manuals/269+/MioMapV2-Manual/268+_269+_miomap_Manual_EN.pdf>, Aug. 2005.
Mol, Henk, "Plan Your Trip with Google Maps", available at <http://www.visualsteps.com/downloads/Free_guide_google_maps.pdf>, Dec. 2009, 35 pages.
Navizon, "FAQ, Peer-to-Peer Wireless Positioning", available at <http://www.navizon.com/FAQ.htm>, Nov. 30, 2007, 8 pages.
Navizon, "How it Works", available at <http://www.navizon.com/FullFeatures.htm>, Nov. 30, 2007, 7 pages.
Navizon, "The First Positioning System that Combines GPS, WiFi and Phone Positioning", available at <http://www.navizon.com>, Nov. 30, 2007, 2 pages.
Pixlewit, "PageFlip", available at <http://web.archive.org/web/20070419035158/http://www.pixelwit.com/blog/page-flip/>, Apr. 11, 2007, 1 page.
Tidwell, Jenifer, "Animated Transition", Designing Interfaces, Patterns for effective Interaction Design, First Edition, O'Reilly Media, Inc., Nov. 2005, pp. 84-85.
Tidwell, Jenifer, "Designing Interfaces", Copyright() 2006 O'Reilly Media, Inc., 2006, pp. 84-85.
Wahlforss, Eric, "Featured Projects", Waypoints Maplist View, available at <http://eric.wahlforss.com/folio>, Jun. 14, 2007, 3 pages.
Westerman, Wayne, "Hand Tracking, Finger Identification, and Chordic Manipulation on A Multi-Touch Surface", Doctoral Dissertation, 1999, 363 Pages.
Youtube, "G-Map for iPhone Demo: 3-Way Map Mode", Heading-up Mode, Uploaded by navi0808, available at <http://www.youtube.com/watch?v=QQusXdiXarl&feature=related>, Feb. 13, 2009, 2 pages.
Youtube, "G-Map for iPhone: About Menus and Basic Functions", Heading up Map View Mode, Uploaded by navi0808, available at <http://www.youtube.com/watch?v=tN8uW_rM0Q>, Feb. 24, 2009, 1 page.
Youtube, "G-Map for iPhone: About Menus and Basic Functions", North-up Map View Mode, Uploaded by navi0808, available at <http://www.youtube.com/watch?v=tN8uW_rM0Q>, Feb. 24, 2009, 1 page.
Youtube, "G-Map U.S. iPhone Review", Uploaded by TapCritic, available at <http://www.youtube.com/watch? v=xrWUKwXQwIQ &feature=related>, Mar. 10, 2009, 1 page.

International Preliminary Report on Patentability received for PCT Patent Application No. PCT/US2008/050295, dated Jul. 7, 2009, 12 pages.
Notice of Allowance received for U.S. Appl. No. 12/789,440, dated Apr. 23, 2013, 2 pages.
Non-Final Office Action received for U.S. Appl. No. 13/662,370, dated Dec. 10, 2014, 32 pages.
Non-Final Office Action received for U.S. Appl. No. 13/662,370, dated Mar. 25, 2014, 35 pages.
Windows Mobile 6, "Fact Sheet", available at <www.WindowsMobile.com>, 2007, 2 pages.
International Search Report and Written Opinion received for PCT Patent Application No. PCT/US2008/050295, dated Jan. 14, 2009, 18 pages.
Invitation to Pay Additional Fees received for PCT Patent Application No. PCT/US2008/050295, dated Jul. 29, 2008.
International Preliminary Report on Patentability received for PCT Patent Application No. PCT/US2008/067925, dated Dec. 22, 2009, 13 pages.
International Search Report and Written Opinion received for PCT Patent Application No. PCT/US2008/067925, dated Dec. 17, 2008, 17 pages.
Invitation to Pay Additional Fees received for PCT Patent Application No. PCT/US2008/067925, dated Oct. 13, 2008.
International Search Report and Written Opinion received for PCT Patent Application No. PCT/US2010/020229, dated Apr. 12, 2012, 17 pages.
Invitation to Pay Additional Fees received for PCT Patent Application No. PCT/US2010/020229, dated Dec. 1, 2011, 4 pages.
Office Action received for Australian Patent Application No. 2010340369, dated Apr. 15, 2013, 5 pages.
Intention to Grant received for European Patent Application No. 12187505.8, dated Aug. 19, 2013, 7 pages.
Office Action received for Korean Patent Application No. 10-2012-7020652, dated Sep. 24, 2013, 7 pages.
Non-Final Office Action received for U.S. Appl. No. 11/969,211, dated Feb. 25, 2011, 21 pages.
Non-Final Office Action received for U.S. Appl. No. 11/969,211, dated Sep. 20, 2012, 27 pages.
Notice of Allowance received for U.S. Appl. No. 11/969,211, dated May 15, 2013, 25 pages.
Non-Final Office Action received for U.S. Appl. No. 12/143,741, dated Jan. 25, 2011, 18 pages.
Notice of Allowance received for U.S. Appl. No. 12/143,741, dated Dec. 30, 2011, 5 pages.
Notice of Allowance received for U.S. Appl. No. 12/143,741, dated Jul. 12, 2011, 5 pages.
Final Office Action received for U.S. Appl. No. 12/143,752, dated Dec. 23, 2011, 18 pages.
Non-Final Office Action received for U.S. Appl. No. 12/143,752, dated May 17, 2011, 37 pages.
Notice of Allowance received for U.S. Appl. No. 12/143,752, dated Sep. 17, 2012, 11 pages.
Non-Final Office Action received for U.S. Appl. No. 12/566,668, dated Jun. 18, 2012, 35 pages.
Notice of Allowance received for U.S. Appl. No. 12/566,668, dated Feb. 7, 2013, 9 pages.
Notice of Allowance received for U.S. Appl. No. 12/566,668, dated Oct. 23, 2012, 10 pages.
Final Office Action received for U.S. Appl. No. 12/788,281, dated May 10, 2013, 12 pages.
Non-Final Office Action received for U.S. Appl. No. 12/788,281, dated Feb. 17, 2012, 9 pages.
Non-Final Office Action received for U.S. Appl. No. 12/788,281, dated Oct. 15, 2013, 13 pages.
Non-Final Office Action received for U.S. Appl. No. 12/788,281, dated Sep. 26, 2012, 12 pages.
Notice of Allowance received for U.S. Appl. No. 12/788,281, dated Jun. 4, 2014, 9 pages.
Notice of Allowance received for U.S. Appl. No. 12/789,440, dated Jan. 14, 2013, 7 pages.
Notice of Allowance received for U.S. Appl. No. 12/789,440, dated Jun. 26, 2012, 9 pages.

(56) References Cited

OTHER PUBLICATIONS apple.com, "Maps with GPS", available at <http://www.apple.com/iphone/features/maps.html>, May 2009, 2 pages.
AV Bros., "AV Bros. Page Curl 2.0 for Windows and Mac OS X", User Guide, available at <http://c0002649.cdn2.cloudfiles.rackspacecloud.com/avpagecurl20.pdf>, 2004, 26 pages.
Carew, Sinead, "Phones that Tell You Where to Drive, Meet, Eat", May 28, 2007, 2 pages.
Daimlerchrysler, "Usecases Overview Map", 1 page.
Dalrymple, Jim, "Google Maps Adds Locator, but Not for iPhone", available at <http://news.yahoo.com/s/macworld/20071130/tc_macworld/googlemaps20071130_0&printer=1;_vlt+Auvf3s6LQK_p)ajtb954T_DQni6gB>, Nov. 30, 2007, 1 page.
Dornfest, "Google Hacks", Third Edition, O'Reilly Media, Inc., Aug. 3, 2006, 5 pages.
Flipping Book, "Premium Page Flipping", available at <http://web.archive.org/web/20041207072330 1http://www.page-flip.com/>, retrieved on Nov. 12, 2009, 1 page.
Geller, Jonathan S., "Magnetometer in Next iPhone Confirmed?", The Boy Genius Report, available at <http://www.boygeniusreport.com/2009/05/07/magnetometer-in-next-iphone-confirmed/>, May 7, 2009, 15 pages.
Gizmodo, "Windows Live Search for Mobile Goes Final, Still Great", Windows Moblile Map Contact List, available at <http://gizmodo.com/gadgets/software/windows-live-search-for-mobile-goesfinal-still-great-236002.php>, Mar. 11, 2007, 3 pages.
Gizmodo, "Windows Mobile 6 Professional Video Tour", available at <http://gizmodo.com/gadges/cellphones/windows-mobile-6-professional-video-tour-237039.PhP>, Mar. 11, 2007, 4 pages.
Google, "Review Guide—Google Maps for Mobile (Beta)", 2006, 7 pages.
Google Operating System, "Google Maps in Search History", available at <http://googlesystem.blogspot.in/2006/11/google-maps-in-search-history.html>, Apr. 2005, 1 page.
Google Operating System, "Google Maps Shows Real-Time Traffic Data", available at <http://googlesystem.blogspot.in/2007/02/google-maps-shows-real-time-traffic.html>, Feb. 28, 2007, 1 page.
Gralla, "Google™ Search and Tools in a Snap", Sams, Apr. 4, 2006, 15 pages.
Holthe et al., "Video Browsing Techniques for Web Interfaces", available at <http://ieeexplore.ieee.org/Xplore/login.jsp?url=http%3A%2F%2Fieeexplore.ieee.org%2Fstamp.jsp%3Farnumber%3D01593233&authDecision=-203>, 2005, 5 pages.
iPhone Hacks, "iPhone Software/Hardware Hack: LocoGPS—GPS Add-on for the iPhone", available at <http://www.iphonehacks.com/iphone_applications/index.html>, Dec. 25, 2007, 41 pages.
Kim, Arnold, "Video-In and Magnetometers Could Introduce Interesting iPhone App Possibilities", available at <http://www.macrumors.com/2009/04/08/video-in-and-magnetometers-could-introduce-interesting-iphone-app-possibilities/>, Apr. 8, 2009, 5 pages.
Microsoft, "Windows Mobile Fact Sheet", available at <http://www.WindowsMobile.com>, 2007, 2 pages.
Mio, "27 Countries in Your Pocket", available at <http://www.miotech.be/en/printview/press-releases-2005-09-29.htm>, Sep. 2005.
Mio, "Mio 269+ User's Manual", available at <http://www.miotech.be/Manuals/269+/Device-Manual/268-plus-269-plus-Device-Manual-EN.pdf>, Aug. 2005.

Non-Final Office Action received for U.S. Appl. No. 13/662,370, dated Sep. 2, 2015, 36 pages.
pininthemap.com, "PinInTheMap", Available at <http://pininthemap.com/> and https://web.archive.org/web/20070518233955/http://pininthemap.com/, May 18, 2007, 4 pages.
Decision to Grant Received for European Patent Application No. 12187505.8, dated Feb. 13, 2014, 2 pages.
Notice of Allowance received for U.S. Appl. No. 13/666,944, dated Aug. 18, 2015, 5 pages.
Notice of Allowance received for U.S. Appl. No. 13/666,944, dated Jul. 31, 2015, 2 pages.
Notice of Grant received for Chinese Patent Application No. 201080001767.6, dated Jul. 20, 2015, 6 pages (2 pages English Translation and 4 pages of Official Copy only).
Notice of Allowance received for Korean Patent Application No. 10-2012-7020652, dated Sep. 16, 2015, 3 pages (1 page of English Translation and 2 pages of Official Copy).
Notice of Allowance received for U.S. Appl. No. 13/666,944, dated Sep. 17, 2015, 2 pages.
Decision to Grant received for European Patent Application No. 10700013.5, dated Mar. 24, 2016, 2 pages.
Notice of Allowance received for Australian Patent Application No. 2014202094, dated Apr. 19, 2016, 2 pages.
Notice of Allowance received for Korean Patent application No. 10-2015-7035252, dated Mar. 2, 2016, 3 pages (1 page English Translation and 2 pages of Official Copy).
Final Office Action received for U.S. Appl. No. 13/662,370, dated Nov. 17, 2017, 32 pages.
"iPhone iOS3.1 User Guide", Online Available at https://manuals.info.apple.com/MANUALS/O/MA616/zh_CN/iPhone_iOS3.1_User_Guide_CH.pdf, Nov. 9, 2009, 172 pages (Official Copy Only) ((See Communication under 37 CFR § 1.98(a) (3)).
Office Action received for Chinese Patent Application No. 201510664750.3, dated Nov. 30, 2017, 13 pages (6 pages of English Translation and 7 pages of Official Copy).
Final Office Action received for U.S. Appl. No. 13/662,370, dated Apr. 14, 2016, 29 pages.
Final Office Action received for U.S. Appl. No. 14/101,205, dated Sep. 8, 2017, 19 pages.
Intention to Grant received for European Patent Application No. 10700013.5, dated Nov. 3, 2015, 5 pages.
Non-Final Office Action received for U.S. Appl. No. 14/101,205, dated Jan. 5, 2017, 17 pages.
Non-Final Office Action received for U.S. Appl. No. 13/662,370, dated Mar. 13, 2017, 33 pages.
Notice of Allowance received for Korean Patent Application No. 10-2016-7014723, dated Oct. 4, 2016, 3 pages (1 page of English Translation and 2 pages of Official Copy).
Office Action received for Korean Patent Application No. 10-2012-7022253, dated Aug. 24, 2015, 7 pages (3 pages of English Translation and 4 pages of Official Copy).
Advisory Action received for U.S. Appl. No. 13/662,370, dated Mar. 19, 2018, 6 pages.
Office Action received for Chinese Patent Application No. 201510664750.3, dated Aug. 1, 2018, 7 pages (4 pages of English Translation and 3 pages of Official Copy).

* cited by examiner

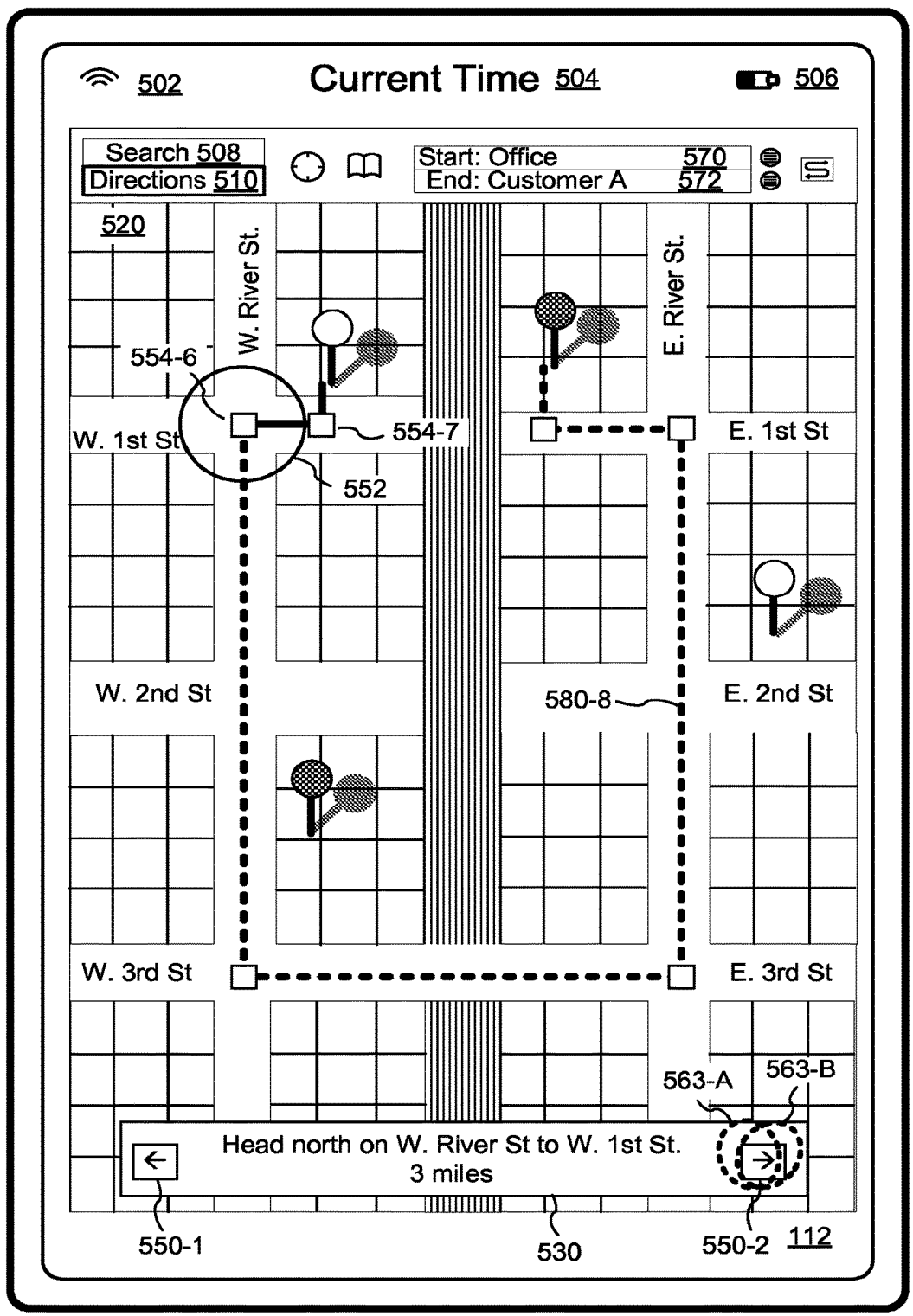
Figure 5AAA

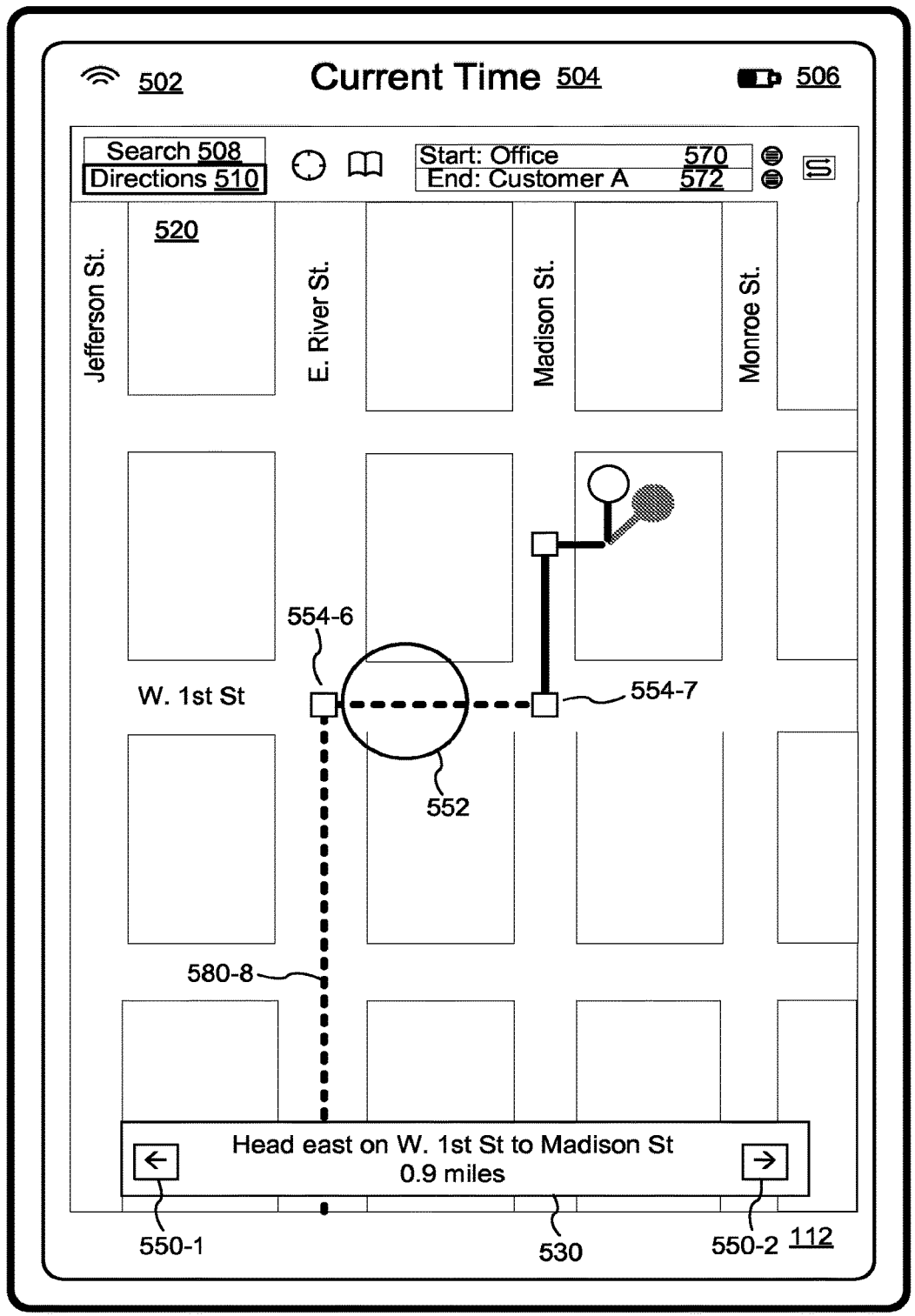
Figure 5BBB

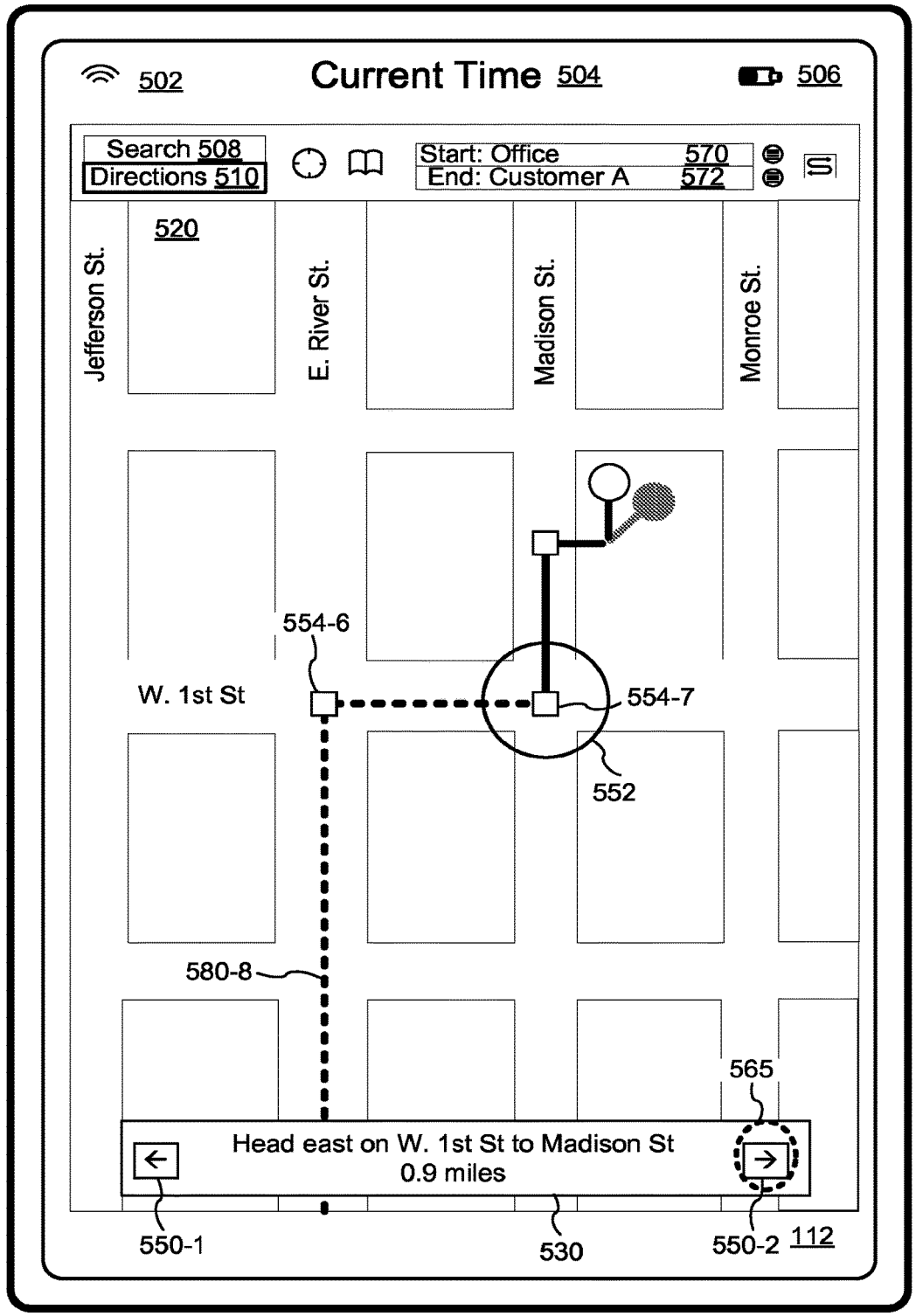
Figure 5CCC

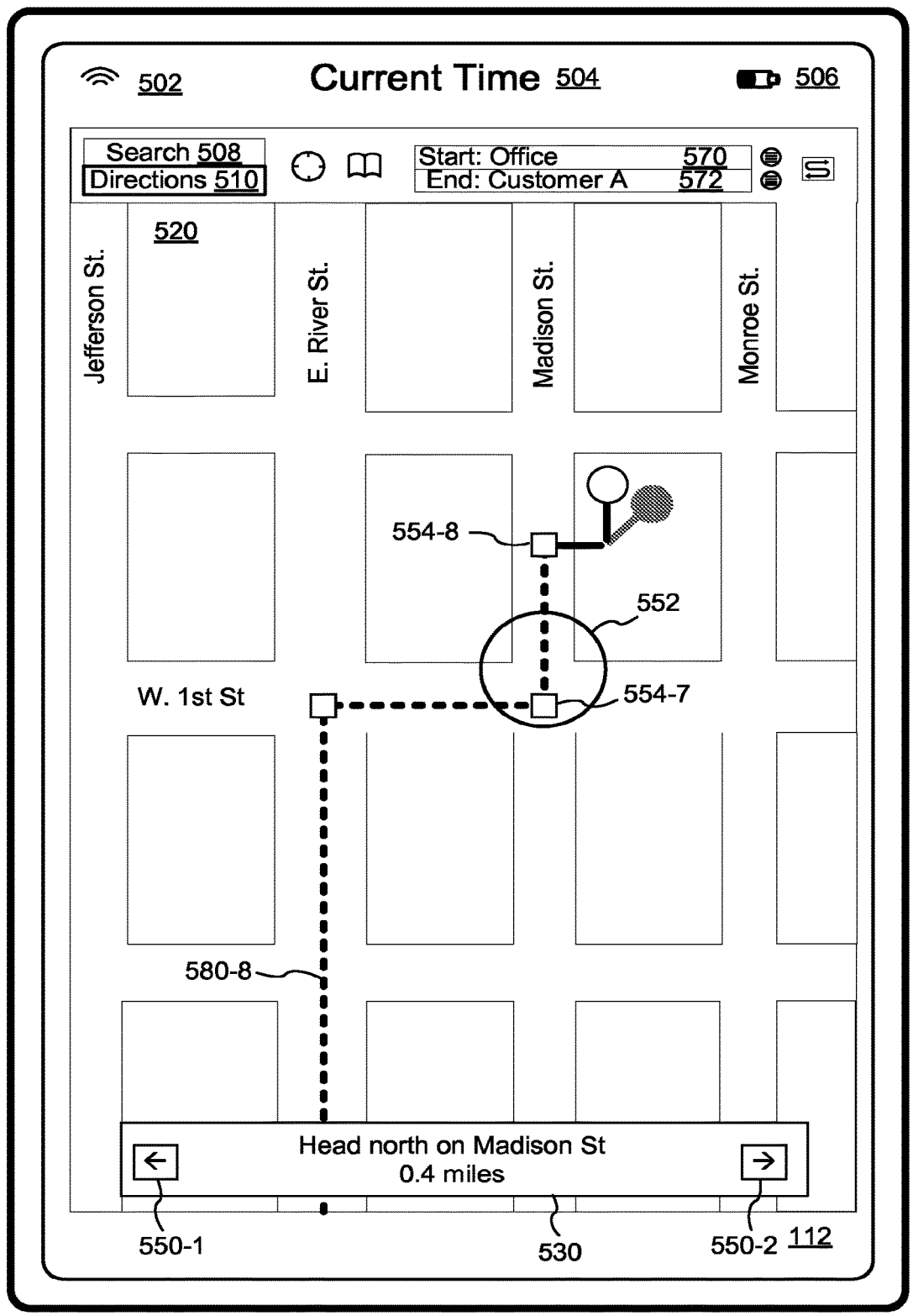
Figure 5DDD

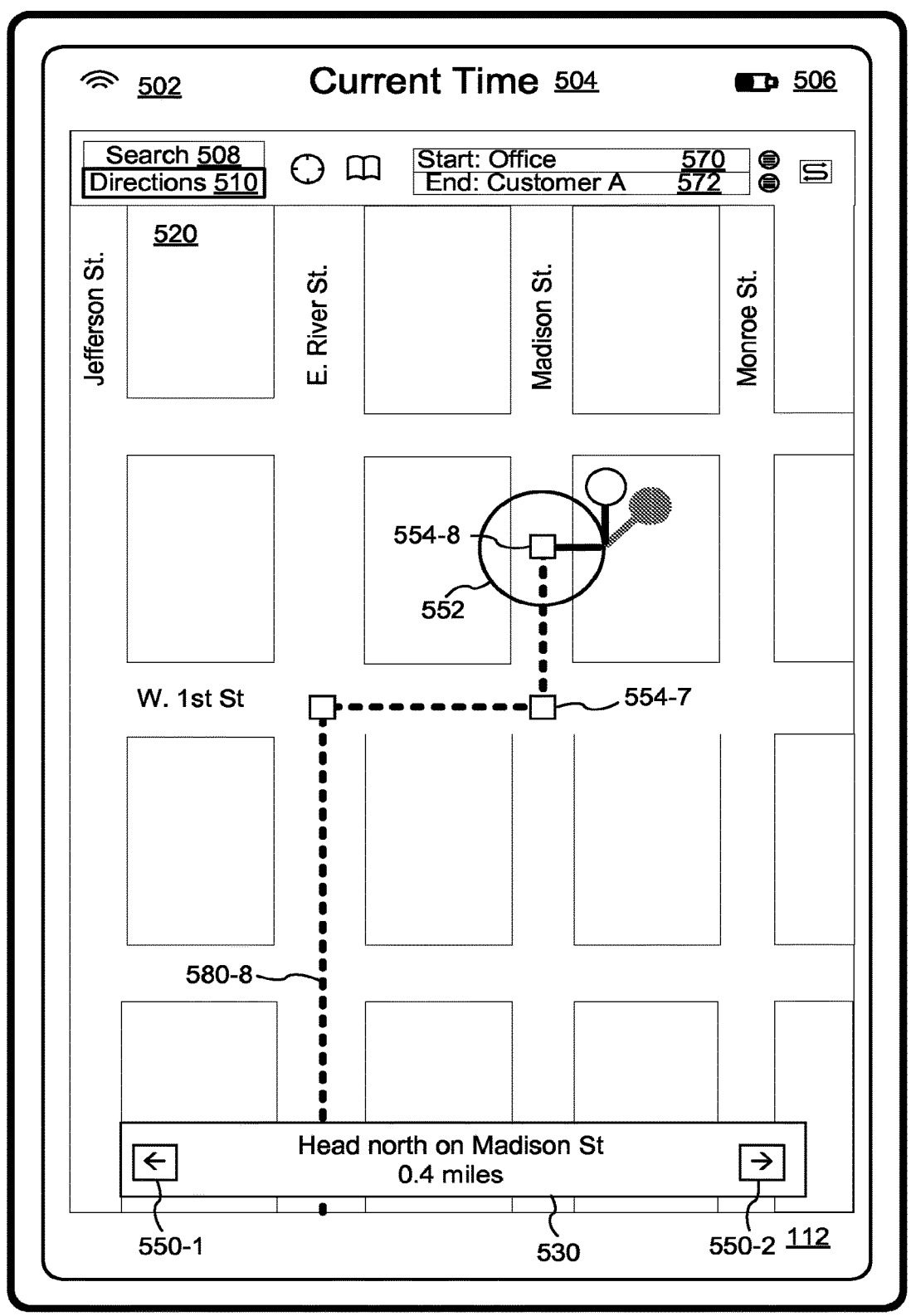
Figure 5EEE

DEVICE, METHOD, AND GRAPHICAL USER INTERFACE FOR MAPPING DIRECTIONS BETWEEN SEARCH RESULTS

RELATED APPLICATIONS

This application is a continuation of U.S. patent application Ser. No. 12/788,281, filed May 26, 2010, which is a continuation of PCT Patent Application No. PCT/US2010/020229, filed Jan. 6, 2010, which are incorporated herein by reference in their entirety.

This application is related to the following applications: (1) U.S. patent application Ser. No. 11/969,211, "Portable Multifunction Device, Method, and Graphical User Interface for Providing Maps and Directions," filed Jan. 3, 2008; (2) U.S. patent application Ser. No. 12/143,752, "Touch Screen Device, Method, and Graphical User Interface for Providing Maps, Directions, and Location-Based Information," filed Jun. 20, 2008; and (3) U.S. patent application Ser. No. 12/566,668, "Device, Method, and Graphical User Interface for Providing Maps, Directions, and Location-Based Information," filed Sep. 25, 2009. All of these applications are incorporated by reference herein in their entirety.

TECHNICAL FIELD

This relates generally to electronic devices with displays, including but not limited to electronic devices with displays that map directions.

BACKGROUND

The use of electronic computing devices that provide directions has increased significantly in recent years. Exemplary electronic computing devices that provide directions include navigation systems (e.g., global positioning system (GPS) navigation system). Such devices are widely used to map directions.

Existing methods for integrating search results with mapping for directions are cumbersome and inefficient. For example, it is quite tedious for a user to perform a first search for a starting point, identify a starting point in a first set of search results, perform a second search for an ending point, identify an ending point in a second set of second search results, and then enter the identified starting point and the identified ending point in a mapping application to determine a route between the identified starting point and the identified ending point. This process creates a significant cognitive burden on the user. This process becomes even more tedious if the user wants to select a different search result for the starting point or the ending point. It is well known that people have limited capacity of short-term memory and working memory. (See M. Daneman and P. Carpenter, "Individual differences in working memory and reading Journal of Verbal Learning & Verbal Behavior", 19(4): 450-66 (1980); G. A. Miller, "The magical number seven, plus or minus two: Some limits on our capacity for processing information", Psychological Review, 63, 81-97 (1956)). Because of their limited memory capacity, users can easily forget results of previous searches, and thus have to repeat the same searches. Furthermore, users can have difficulty relating results of a previous search with results of a later search. These problems reduce efficiency and productivity. In addition, existing methods take longer than necessary, thereby wasting energy. This latter consideration is particularly important in battery-operated devices.

SUMMARY

Accordingly, there is a need for computing devices with faster, more efficient methods and interfaces for integrating search results with mapping for directions. Such methods and interfaces may complement or replace conventional methods for mapping directions. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a voice recognition system. In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a computing device with a display. The method includes: displaying a map, a first field configured to receive a first query input, and a second field configured to receive a second query input. The method also includes receiving the first query input in the first field; receiving the second query input in the second field; initiating a search that uses the first query input and a search that uses the second query input; and concurrently displaying on the map a first plurality of search results for the first query input and a second plurality of search results for the second query input. The method further includes detecting selection of a first search result in the first plurality of search results; detecting selection of a second search result in the second plurality of search results; and in response to detecting selection of the first search result and detecting selection of the second search result, displaying a route on the map from the first search result to the second search result.

In accordance with some embodiments, a method is performed at a computing device with a display and a touch-sensitive surface. The method includes: displaying a portion of a route on a map; and detecting a plurality of gestures at a location on the touch-sensitive surface that corresponds to a next step icon. The method also includes, for each respective gesture in the plurality of gestures: when the respective gesture satisfies a first predefined condition, displaying an animation that moves from a current waypoint to a next waypoint on the route and displaying a portion of the route that includes the next waypoint; and when the respective gesture satisfies a second predefined condition that is distinct from the first predefined condition, displaying the portion of the route that includes the next waypoint without displaying the animation that moves from the current waypoint to the next waypoint on the route.

In accordance with some embodiments, a method is performed at a computing device with a display. The method includes: displaying a map on the display; while displaying the map, displaying a popup view with a list of prior query inputs; and detecting selection of a prior query input in the list of prior query inputs. The method also includes, in response to detecting selection of the prior query input in the list of prior query inputs: initiating a search using the selected prior query input; and displaying on the map one or more search results for the selected prior query input.

In accordance with some embodiments, a computing device includes a display, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a computing device with a display, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a computing device with a display, cause the device to perform the operations of any of the methods described above. In accordance with some embodiments, a computing device includes: a display; and means for performing the operations of any of the methods described above. In accordance with some embodiments, an information processing apparatus, for use in a computing device with a display, includes means for performing the operations of any of the methods described above.

Thus, computing devices with displays are provided with faster, more efficient methods and interfaces for integrating search results with mapping for directions, thereby increasing the effectiveness, efficiency, and user satisfaction with such devices. Such methods and interfaces may complement or replace conventional methods for mapping directions.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
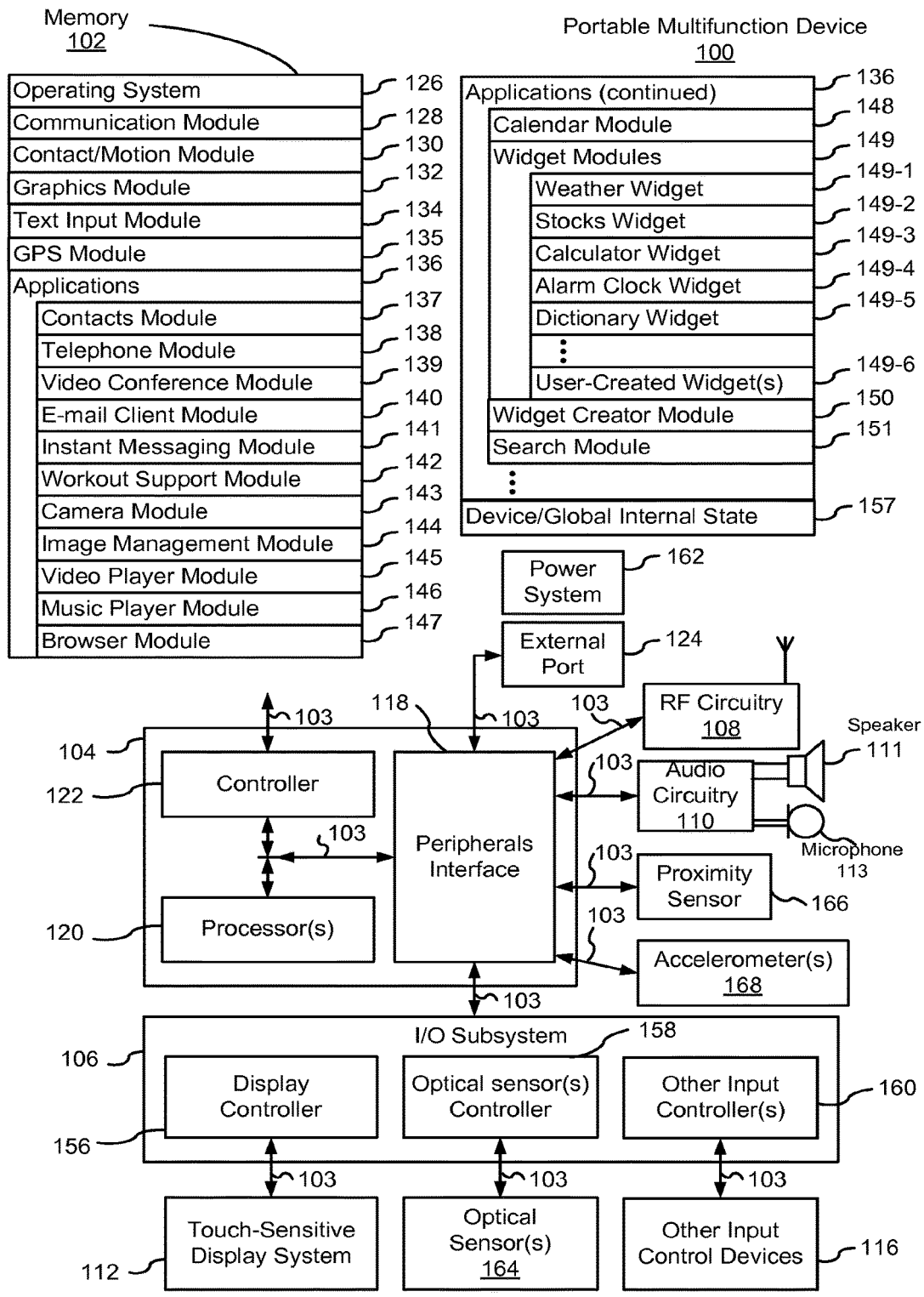
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "query input" refers to query inputs (e.g., search terms) concerning search results, where at least a subset of the search results are to be displayed on a map.

As used herein, the terms "speech recognition" are "voice recognition" are used interchangeably to refer to audio inputs based on speech and/or voice. As used herein, the term "voice command" refers to audio inputs based on speech and/or voice that initiate respective actions in devices.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Inc. of Cupertino, Calif. Other portable devices such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick. Furthermore, the computing device may include a voice recognition system.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
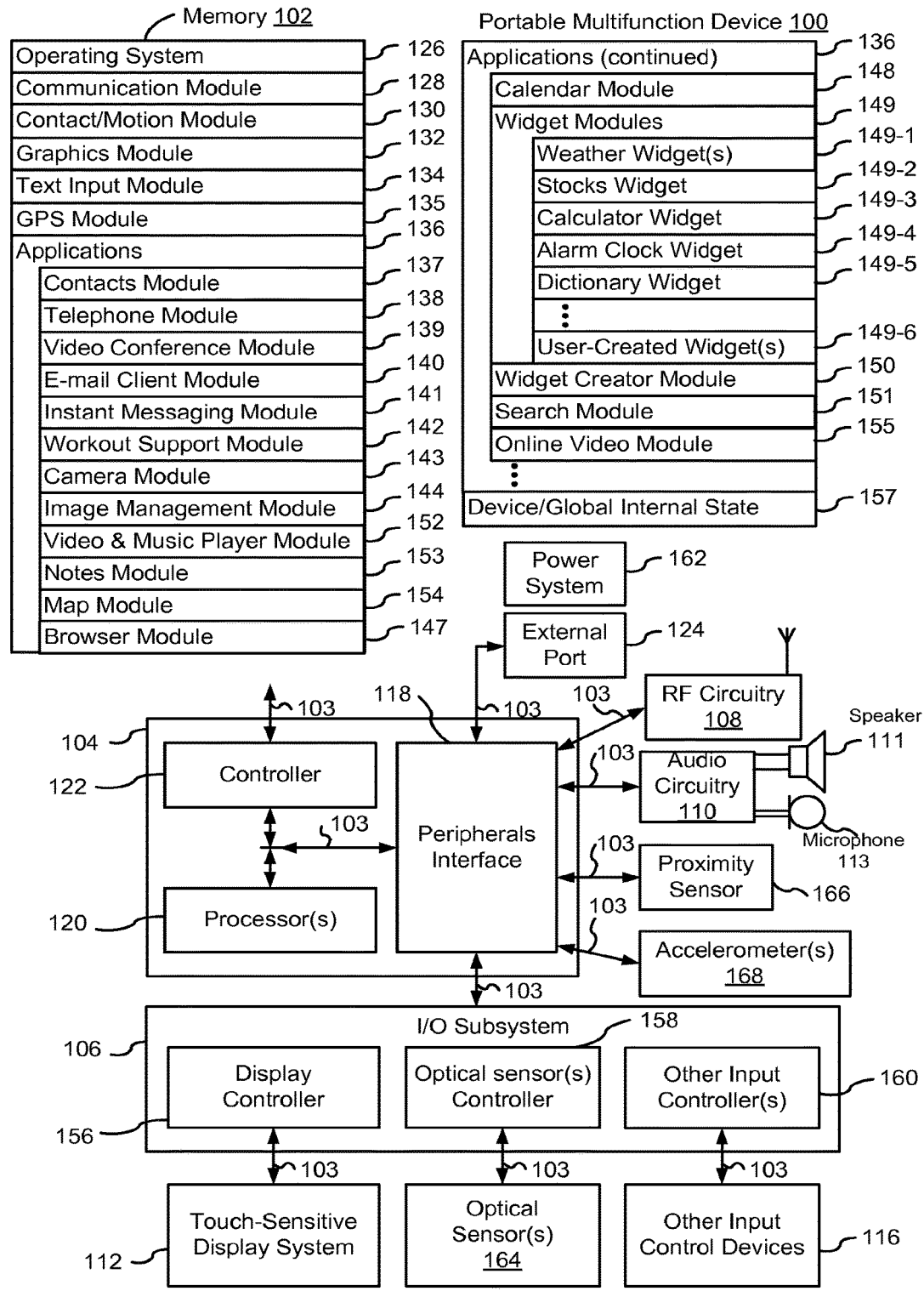

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touch pads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touch pads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a resolution in excess of 100 dpi. In some embodiments, the touch screen has a resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global state information 157, as shown in FIGS. 1A and 1B. Device/global state information 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
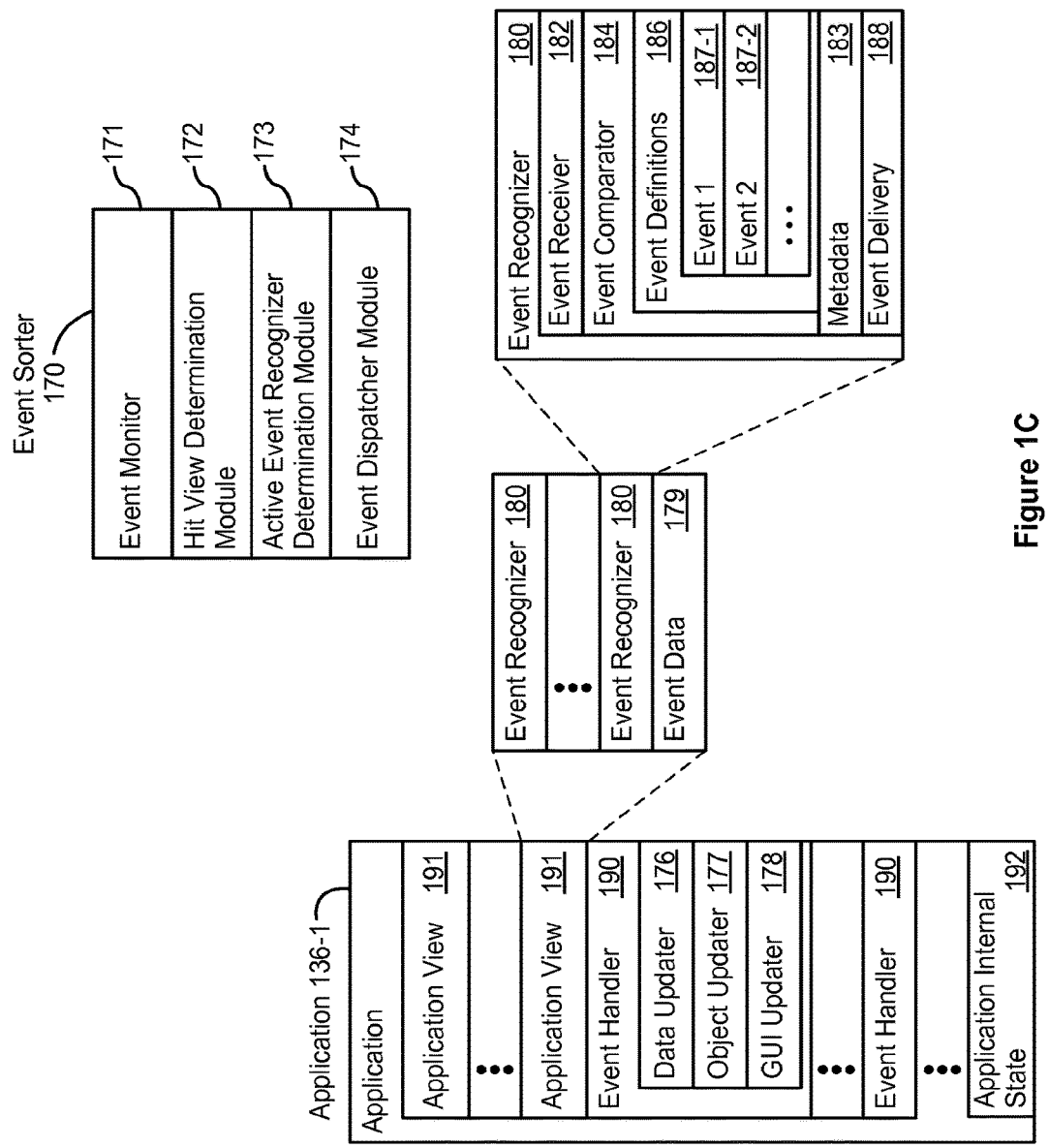
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
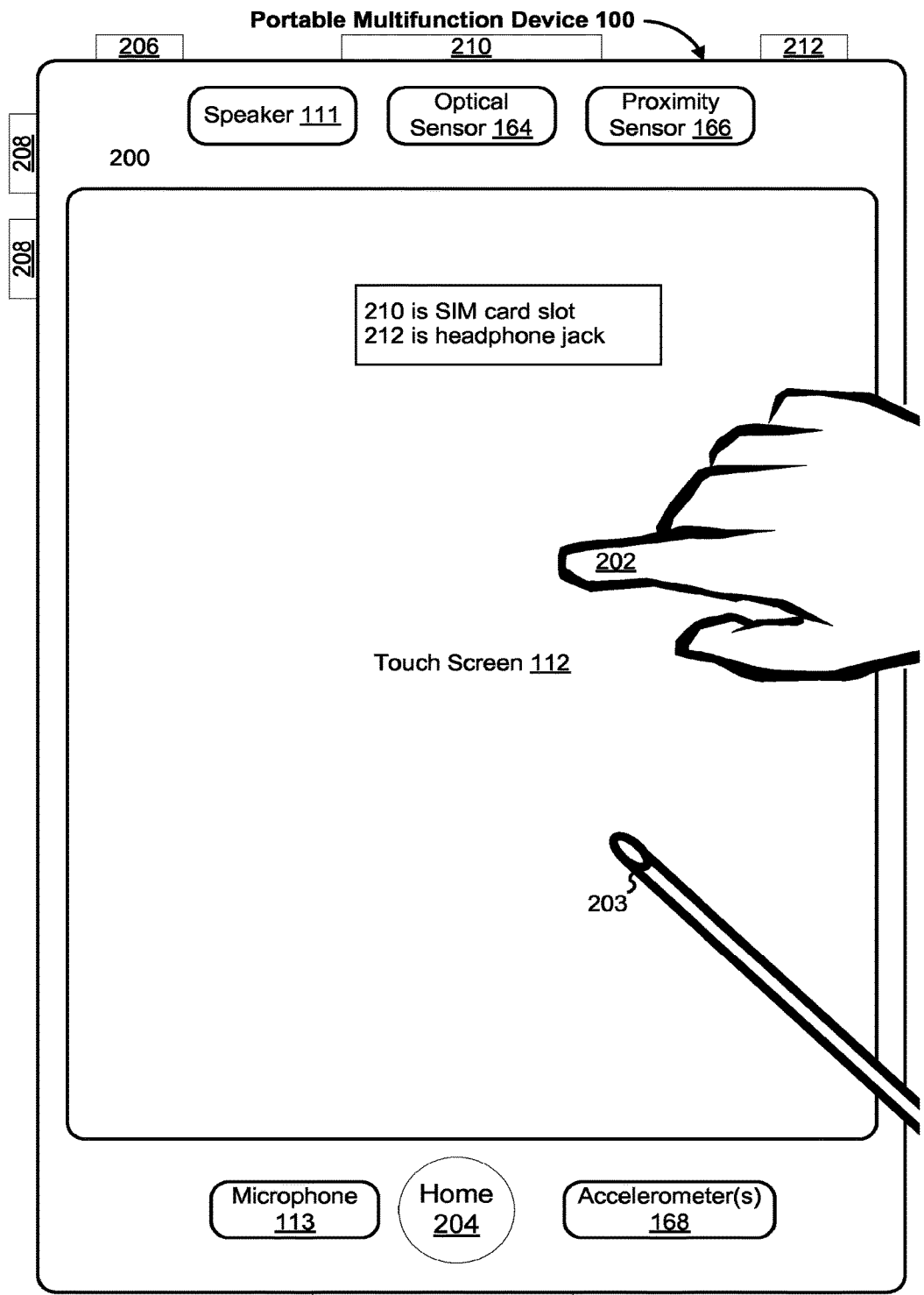
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (STM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

Figure 3:
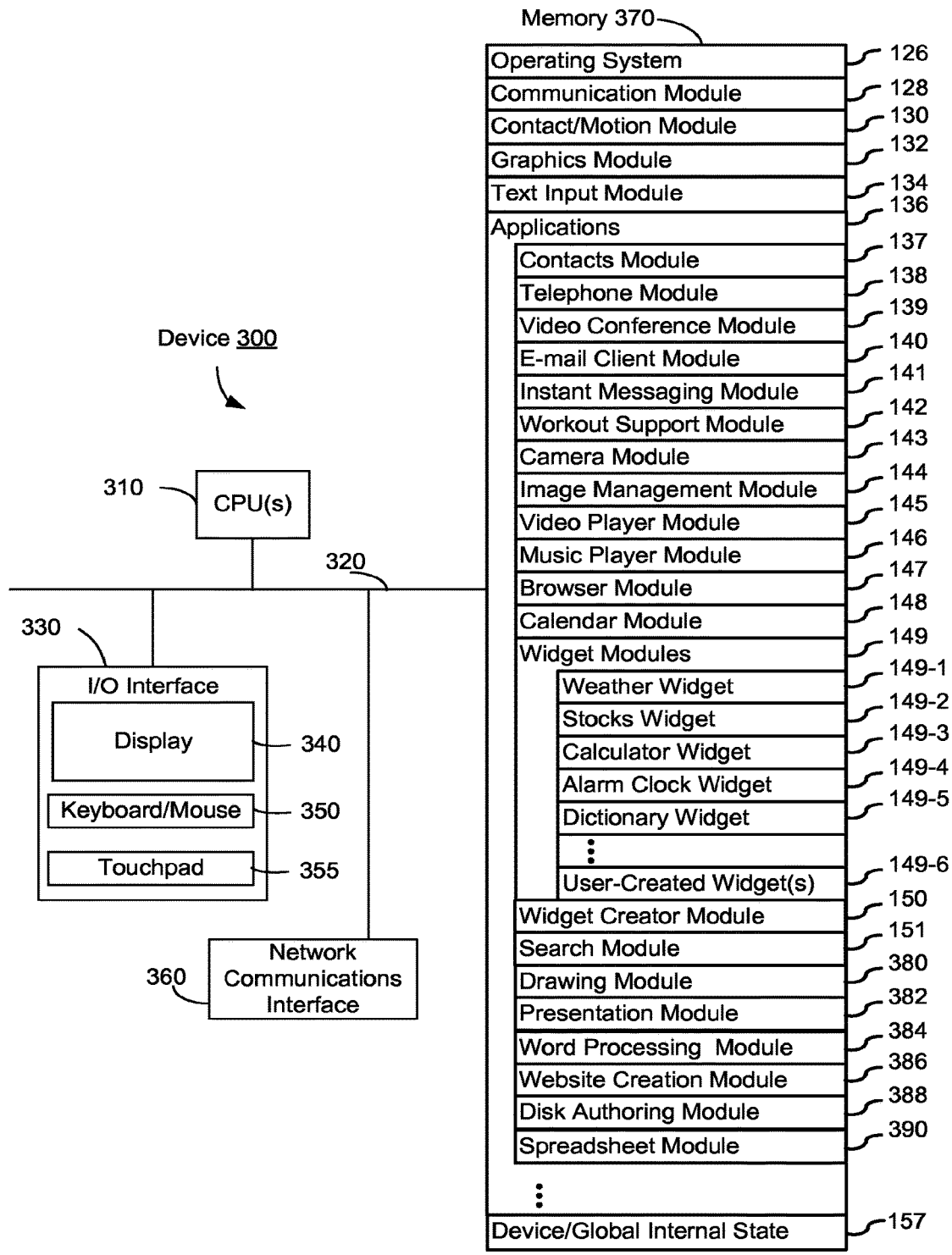
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
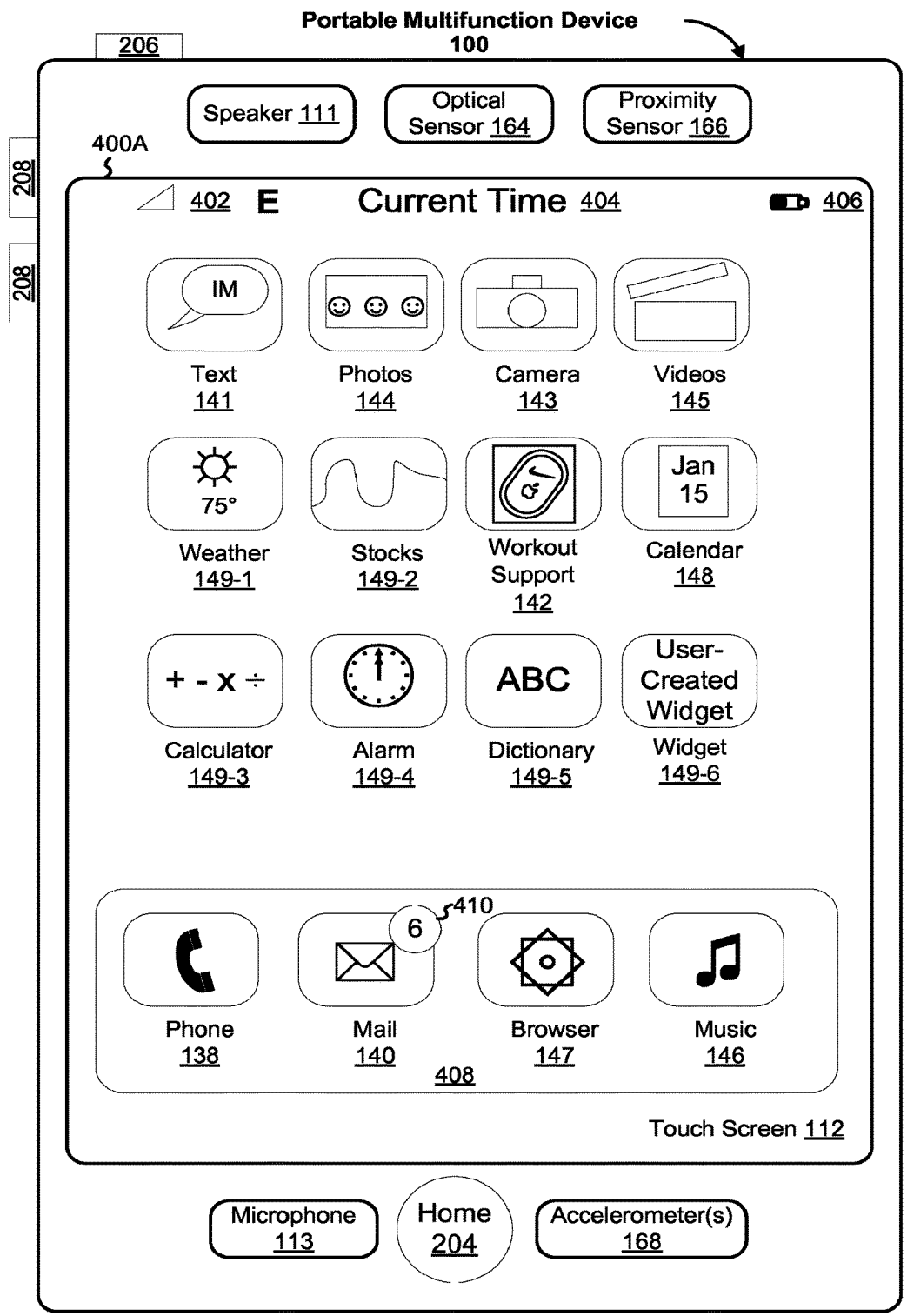
FIGS. 4A and 4B illustrate exemplary user interfaces for a menu of applications on a portable multifunction device in accordance with some embodiments.
Figure 4B:
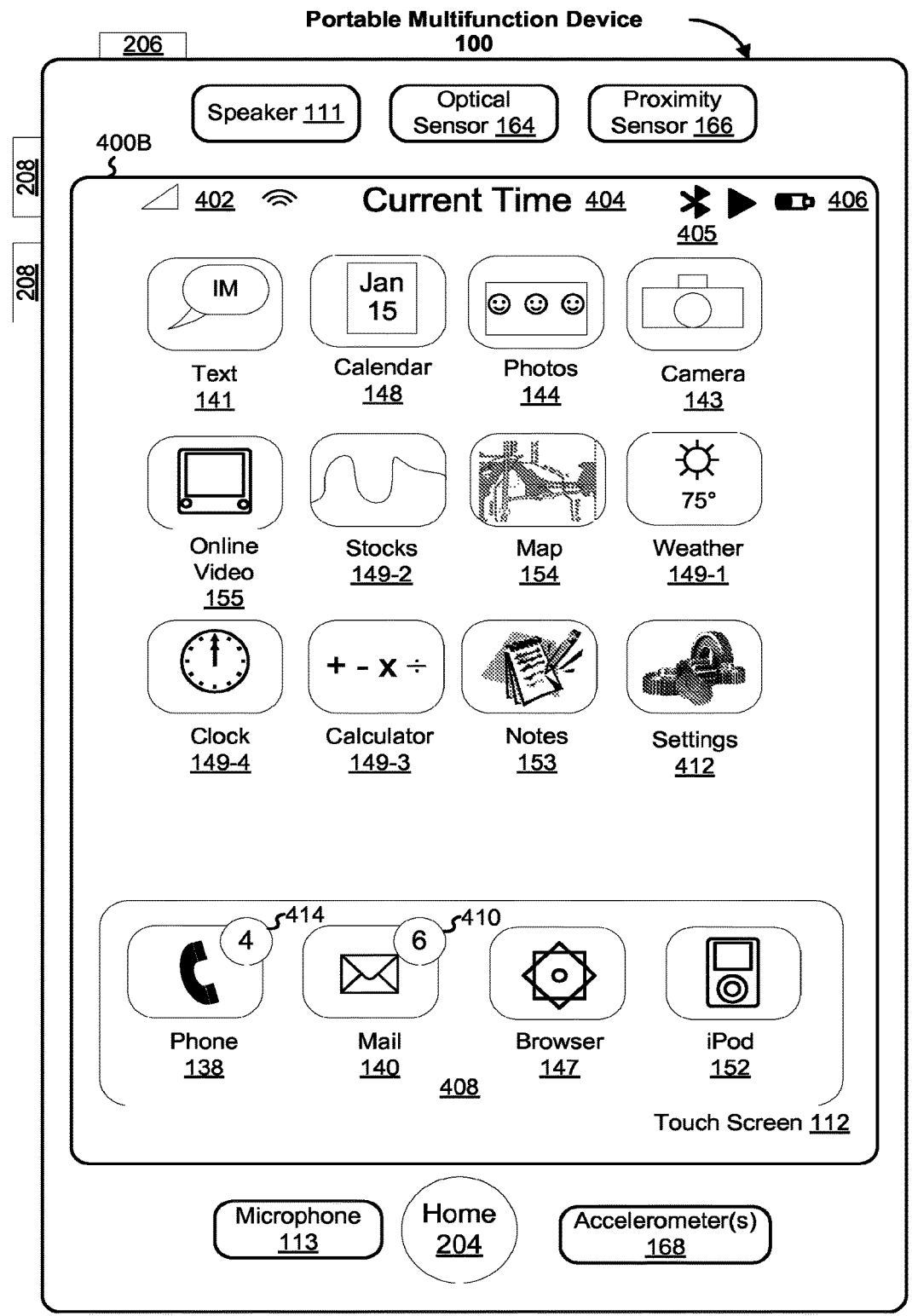

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
402, 404, 405, 406, 141, 148, 144, 143, 149-3, 149-2, 149-1, 149-4, 410, 414, 138, 140, and 147, as described above;
Map icon for map module 154;
Notes icon for notes module 153;
Settings 412, which provides access to settings for device 100 and its various applications 136, as described further below;
iPod icon for video and music player module 152, also referred to as iPod (trademark of Apple Inc.) module 152; and
Online video icon for online video module 155, also referred to as YouTube (trademark of Google Inc.) module 155.

Figure 4C:
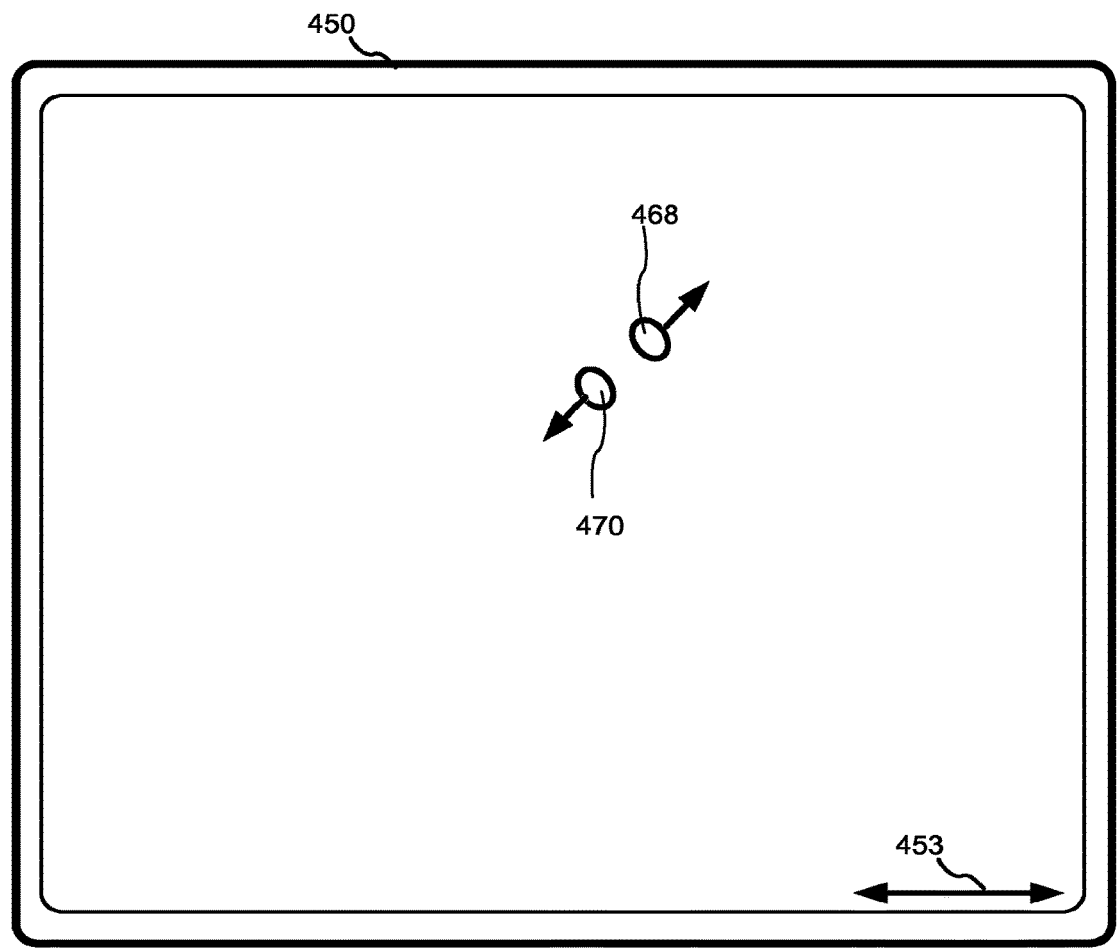
FIG. 4C illustrates an exemplary user interface for a multifunction device with a touch-sensitive surface that is separate from the display in accordance with some embodiments.
Figure 4C:
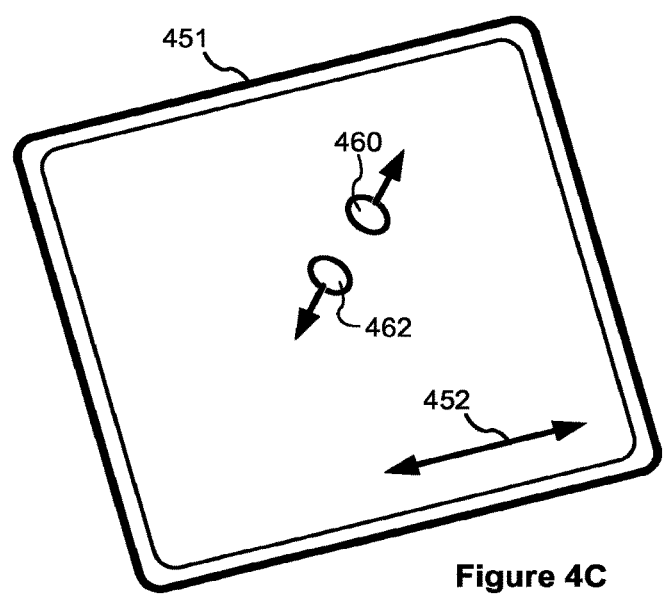

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input, stylus input, keyboard input, or voice input). For example, a tap gesture may be replaced with a mouse click while the cursor is located over the location of the tap gesture (e.g., instead of detection of the contact followed by ceasing to detect the contact). As another example, a voice input may be used to activate objects on a display (e.g., a voice command "next" may activate a "next" or "next step" icon on the display). Similarly, when multiple user inputs are simultaneously detected, it should be understood that multiple computer mice may be used simultaneously, or a mouse and finger contacts may be used simultaneously.

In the descriptions provided below, the term "contact" (except when used to describe an entry in a contact list, address book or the like) is used as a short hand term for "touch gesture," and thus each contact mentioned or described below may be any suitable touch gesture detected by a sensor (or set of sensors) of a touch-sensitive display or other touch-sensitive surface. Similarly, each "finger tap" mentioned or described below may be any suitable touch gesture. Furthermore, in some embodiments, "touch gestures" include not only gestures, made by one or more fingers or one or more styluses, that make physical contact a touch-sensitive screen 112 or other touch-sensitive surface, but also gestures that occur, in whole or in part, sufficiently close to touch-sensitive screen 112 or other touch-sensitive surface that the one or more sensors of touch-sensitive screen 112 or other touch-sensitive surface are able to detect those gestures.

In the context of the embodiments described below, user-initiated "searches" are performed in the context of a map program (e.g., map module 154) that works in conjunction with an online map application. For example, in some embodiments, when a user-initiated search is performed for a search query of "hotel," the search query "hotel" is transmitted by map module 154 of device 100 (or 300) to an online server providing mapping application services, and in response device 100 (or 300) receives map information. Map module 154 renders the received map information on display 112 (or 340) of device 100 (or 300). In this example, the map information received by the device includes a road map or other map for a particular geographic area (e.g., the geographic area surrounding the user's current location, or a geographic area corresponding to a geographic location last specified by the user) and a set of objects (e.g., search result pins) indicating map locations of hotels. There are numerous types of map searches, as described below, and the information returned to device 100 (or 300) in response to the search depends on the information requested. In other embodiments, a map database is locally stored in device 100 (or 300) in memory 102 (or 370) and user-initiated searches are performed locally by searching the locally stored map database.

Attention is now directed towards embodiments of user interfaces ("UI") and associated processes that may be implemented on a multifunction device with a display and a touch-sensitive surface, such as device 300 or portable multifunction device 100.

FIGS. 5A-5EEE illustrate exemplary user interfaces for mapping directions between search results in accordance with some embodiments. The user interfaces in these figures are used to illustrate the processes described below, including the processes in FIGS. 6A-6B, 7A-7B, and 8A-8C.

Figure 5A:
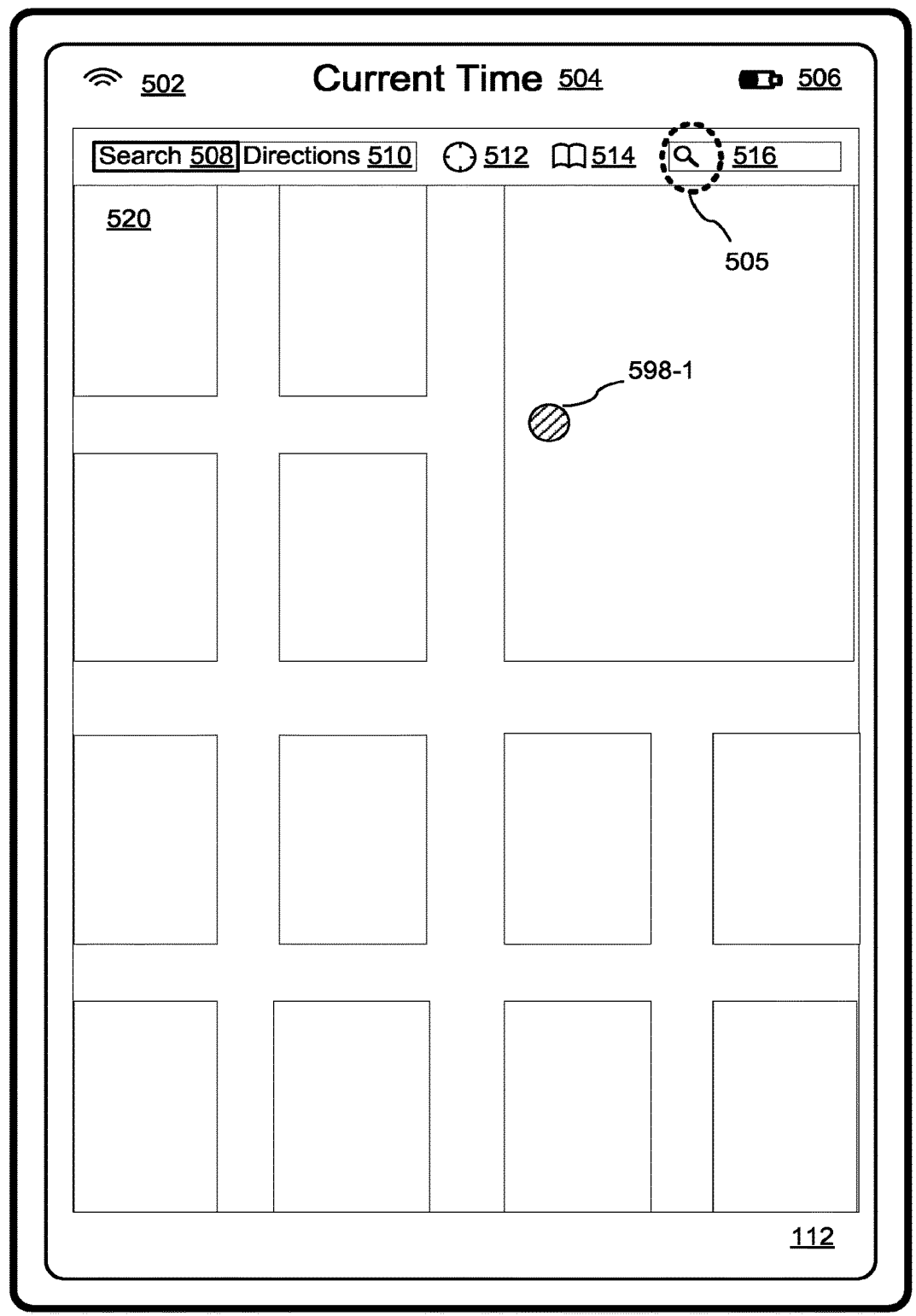
FIGS. 5A-5EEE illustrate exemplary user interfaces for mapping directions between search results in accordance with some embodiments.

FIG. 5A depicts an exemplary user interface displaying map 520 in a mapping application on touch screen 112. The mapping application may include the following elements, or a subset or superset thereof:

search mode icon 508 that when activated (e.g., by a finger tap on the icon) initiates the display of a map in a search mode; in the search mode, the map is configured to overlay search results; in this example, the search mode icon is activated, and as a result, the search mode icon is highlighted with a bold outline;

directions mode icon 510 that when activated (e.g., by a finger tap on the icon) initiates the display of a map in a directions mode; in the directions mode, the map is configured to overlay directions;

view location icon 512 that when activated (e.g., by a finger tap on the icon) initiates various modes, such as a tracked mode or a heading mode;

bookmark icon 514 that when activated (e.g., by a finger tap on the icon) initiates the display of bookmarks and/or contacts; and search term input area 516 that when activated (e.g., by a finger tap on the icon) initiates receiving search terms for a location search (e.g., search terms can be a full or partial address, or a name of a business or a person).

The exemplary user interface depicted in FIG. 5A also includes signal intensity indicator 502 (which indicates the intensity of the radio communication signal, such as signal for Wi-Fi, EDGE, and 3G), current time indicator 504, and battery power indicator 506.

In FIG. 5A, current location indicator 598-1 of the device is displayed on the map 520. In some embodiments, current location indicator 598-1 represents an approximate location of the device. FIG. 5A also illustrates a detection of contact 505 at a location on the touch screen 112 corresponding to (e.g., at or near) search field 516 (which is an example of a text entry field).

Figure 5B:
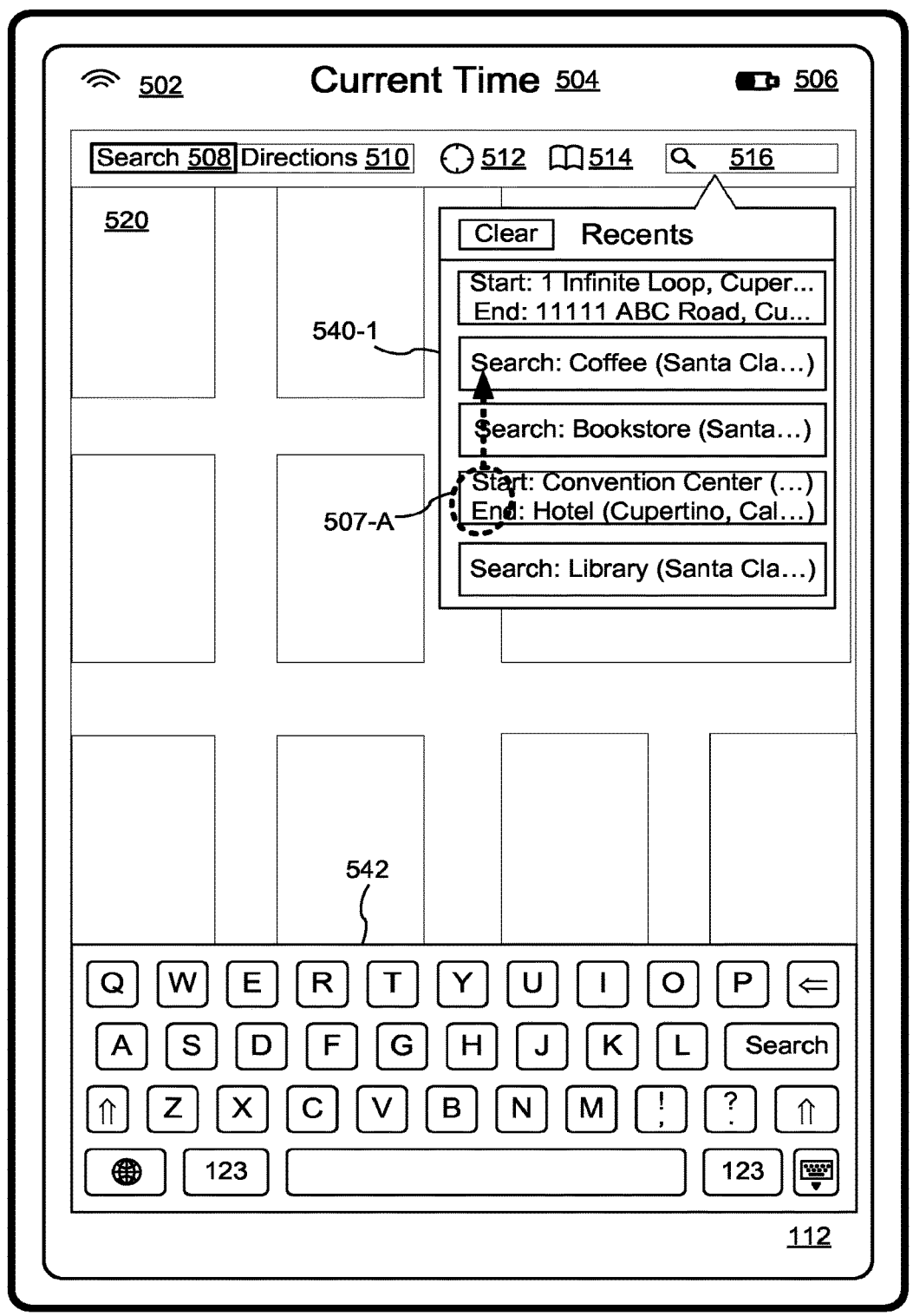

In FIG. 5B, in response to detecting contact 505, recents popup view 540-1 and keyboard 542 are displayed. Recents popup view 540-1 includes a list of recent query inputs. A user can provide query inputs by selecting one of the query inputs listed in recents popup view 540, or by typing one or more keywords on keyboard 542.

Figure 5C:
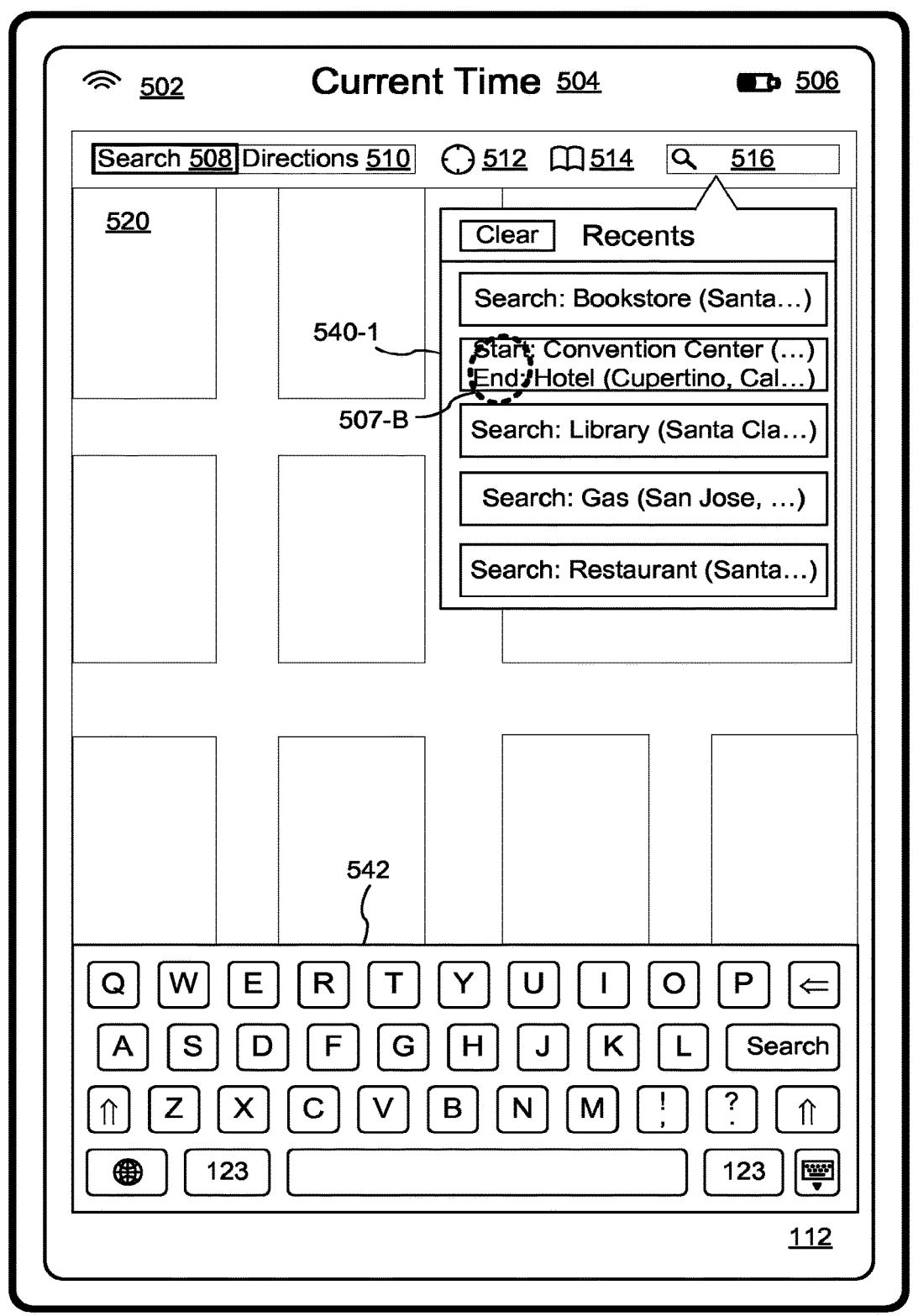

FIG. 5B also illustrates that contact 507-A is detected at a location on touch screen 112 corresponding to recents popup view 540-1. In FIG. 5C, contact 507 has moved to a different location (e.g., 507-B), and a portion of recents popup view 540-1 has scrolled in accordance with the movement of contact 507.

Figure 5D:
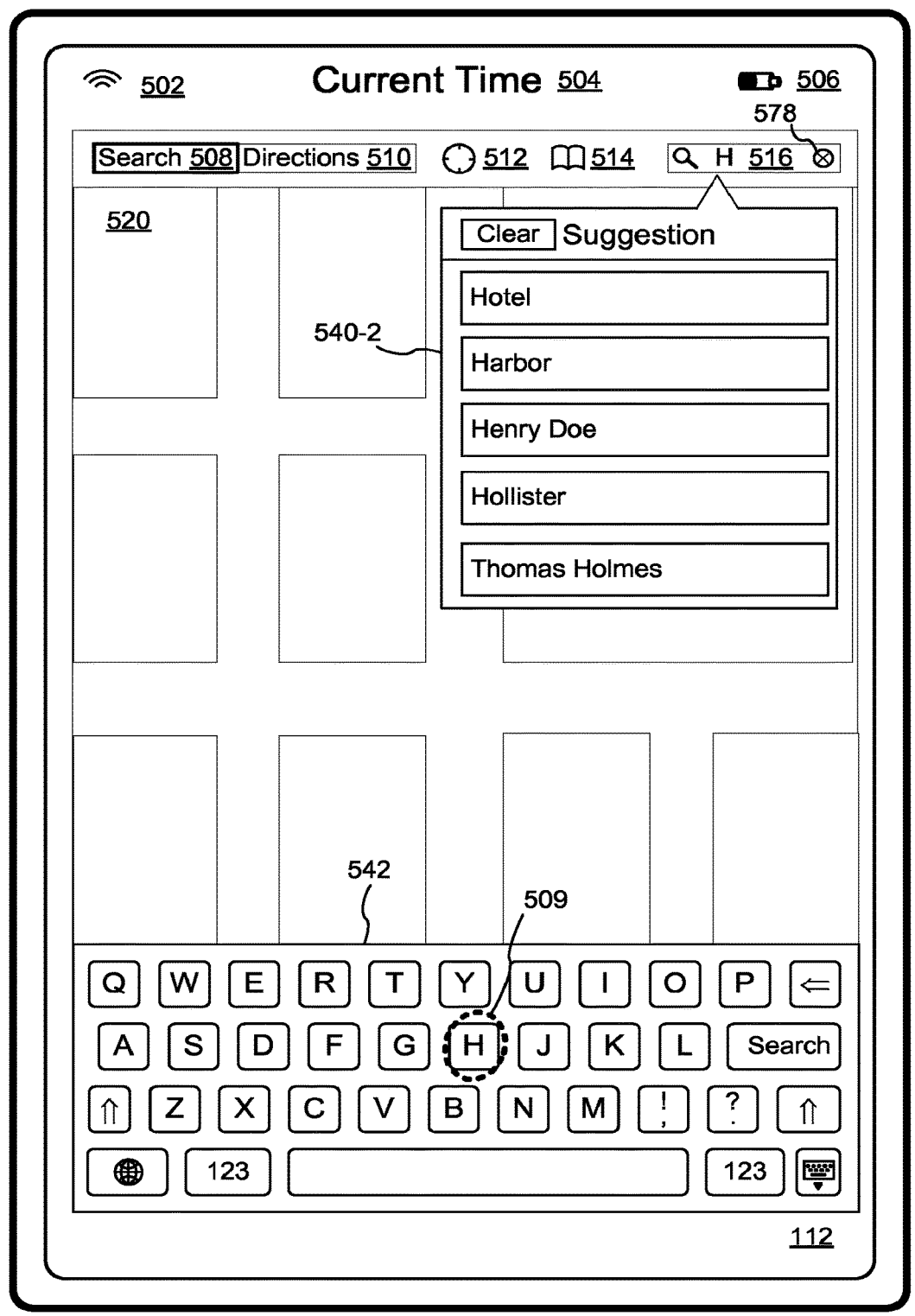

FIG. 5D illustrates that a user has initiated typing a keyword on keyboard 542. In this example, contact 509 is detected at a location on keyboard 542 corresponding to the key "H". In FIG. 5D, in response to detecting contact 509, recents popup view 540-1 changes to suggestions popup view 540-2, and the character "H" is displayed in search term input area 516. Suggestions popup view 540-2 displays suggested keywords that at least partially match the input received via the keyboard. In this example, suggestions popup view 540-2 displays suggested keywords that start with the provided search term character, "h," and optionally displays one or more suggested keyword phrases (e.g., "Thomas Holmes", the last name of which starts with an "h") having at least one word that starts with the provided search term character, "h." In addition, delete icon 578 is displayed within the search term input area 516. Delete icon 578 when activated (e.g., by a finger tap on the icon) deletes the entire entry, if any, in search term input area 516.

Figure 5E:
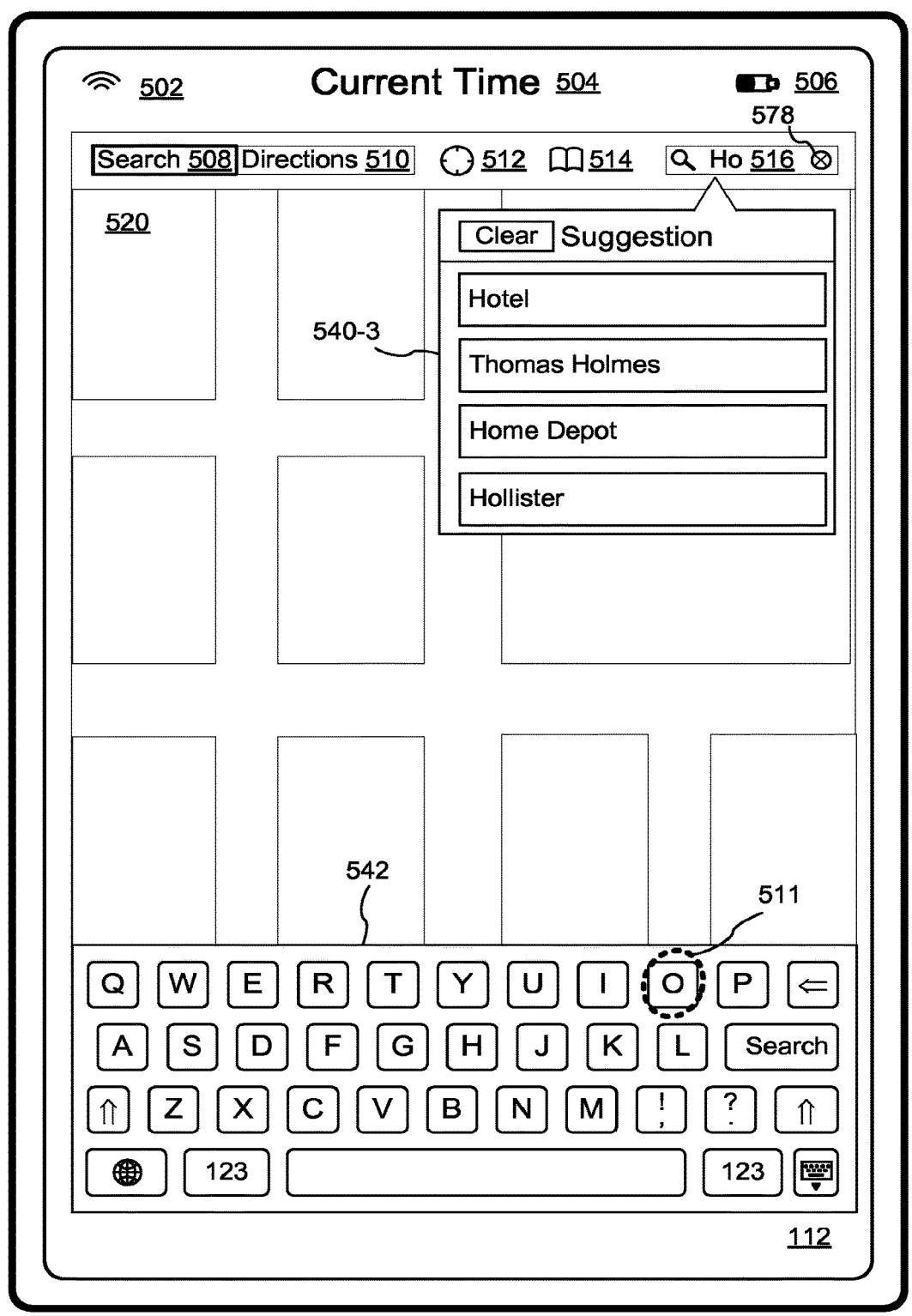

In FIG. 5E, contact 511 is detected at a location on keyboard 542 corresponding to the key "O". In response to detecting contact 511, the character "o" is additionally displayed in search term input area 516, and suggestions popup view 540-3 displays suggested keywords that start with (or that include a word that starts with) the user-provided characters, "ho".

Figure 5F:
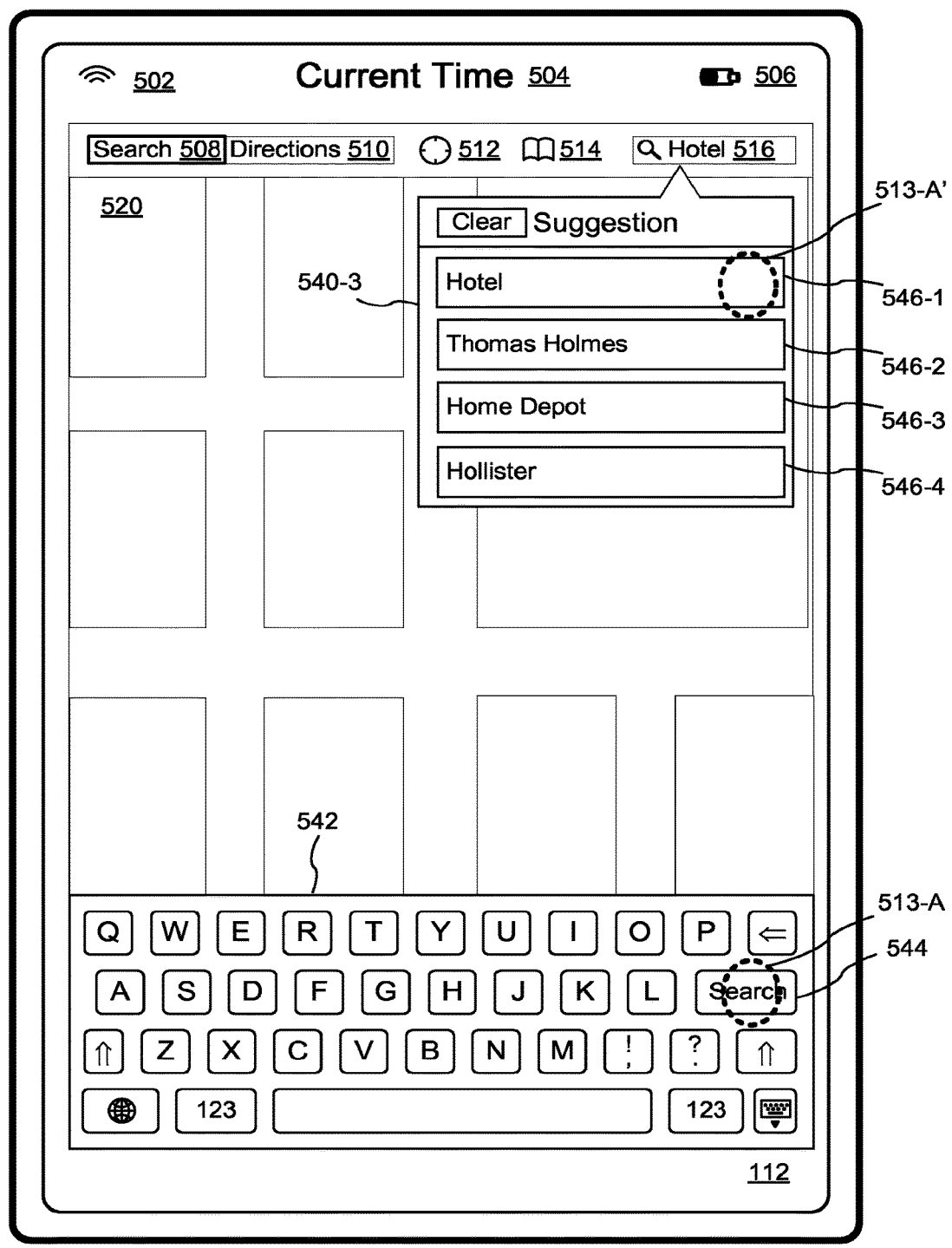

FIG. 5F illustrates that the search term input area 516 contains a search term, "Hotel". The search term "Hotel" can be provided by using keys on keyboard 542 as described above. In FIG. 5F, a gesture (e.g., contact 513-A) is detected at a location corresponding to a search initiation icon (e.g., search key 544). In response, a search is initiated to search for locations that correspond to the search term, "hotel". Alternatively, a contact 513-A' at one of the suggested keywords 546 that corresponds to the search keyword, "hotel" (in this example, the suggested keyword 546-1) initiates the same search, regardless of the entry already in search input area 516 (e.g., even if search input area 516 were to contain a different search term, such as "coffee", a contact on the suggested keyword, "hotel" initiates a search for locations that correspond to the search term, "hotel").

Figure 5G:
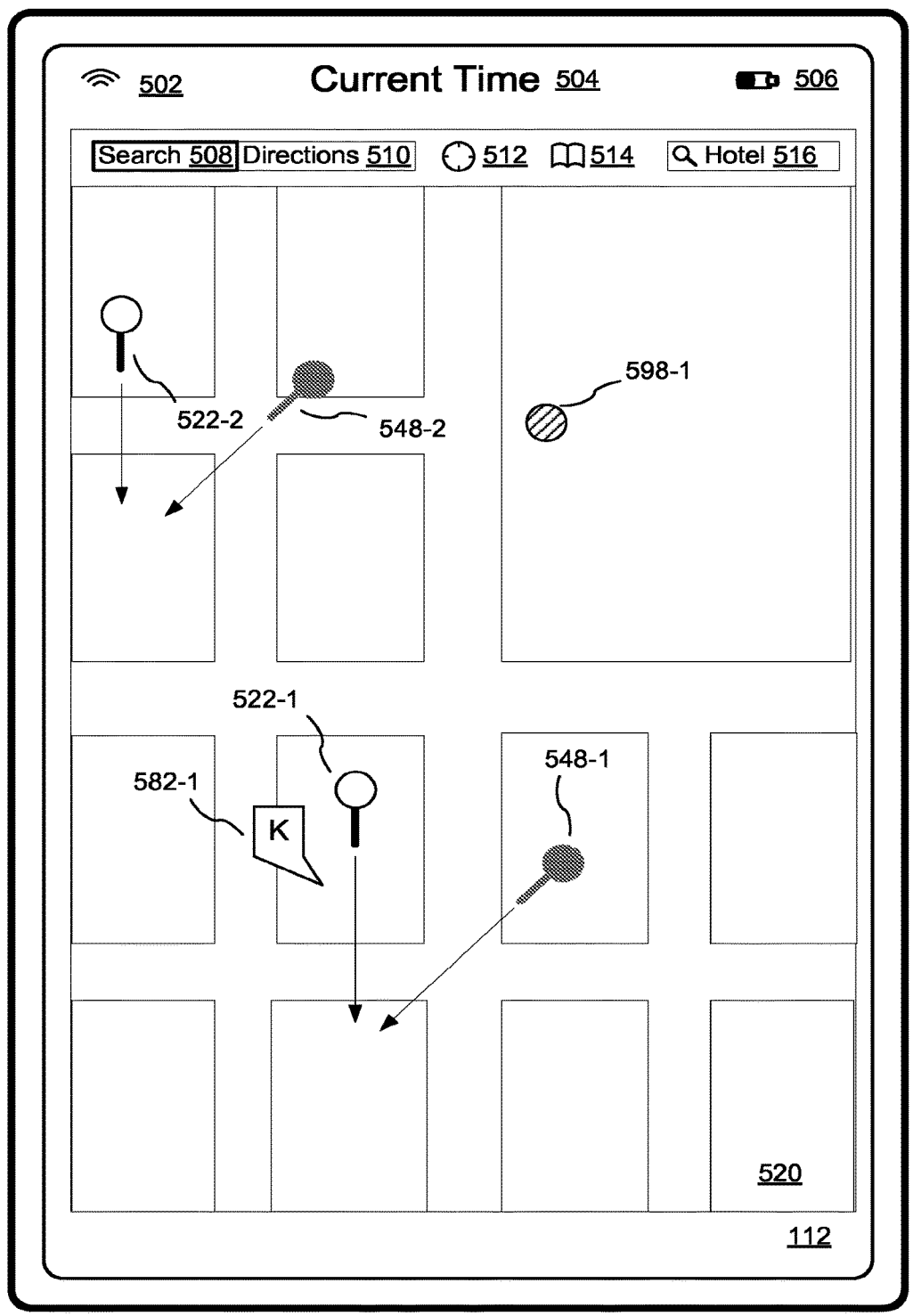
Figure 5H:
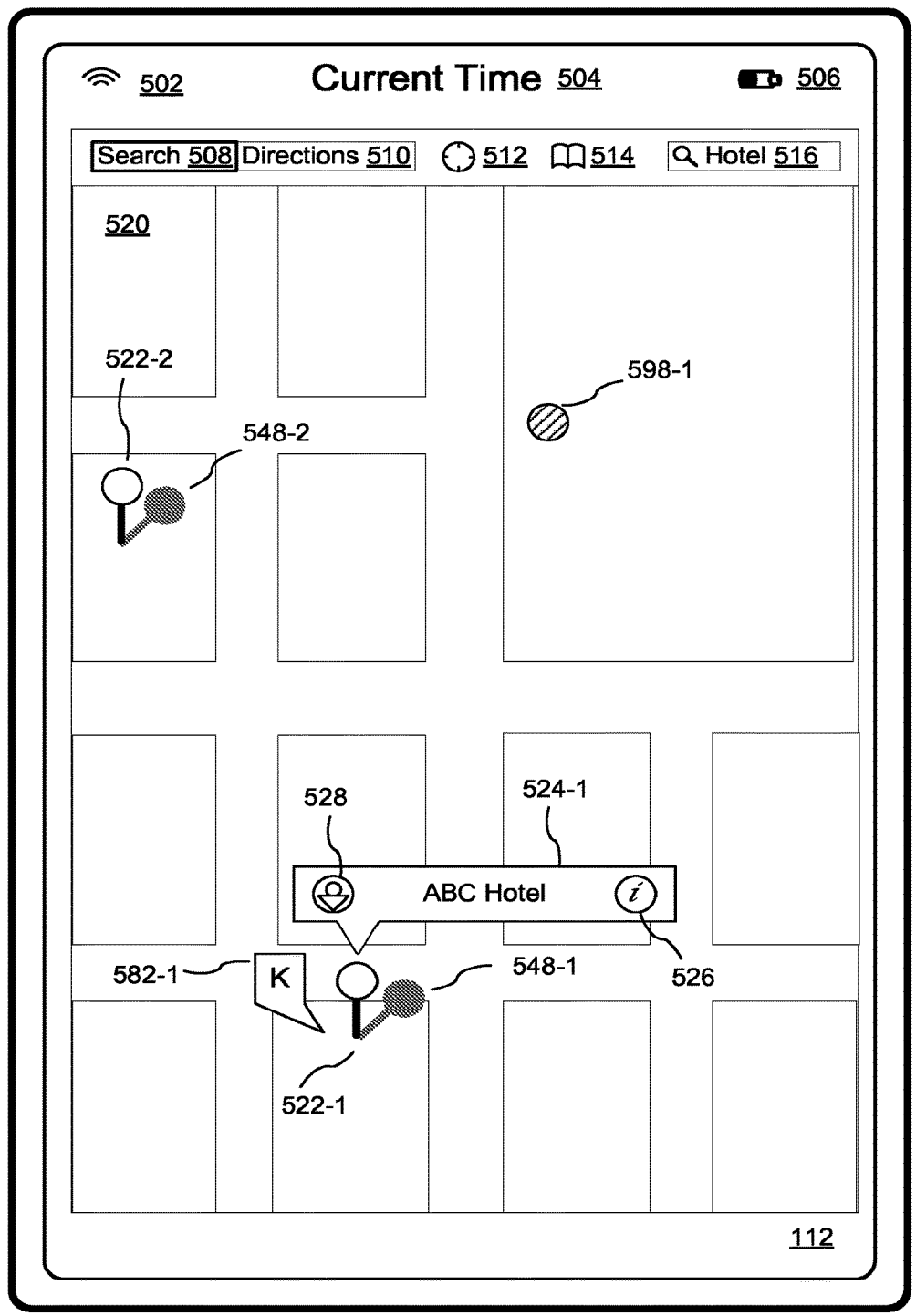

FIGS. 5G-5H illustrate an animation displaying search results on map 520. In FIG. 5G, search result pins (522-1 and 522-2) appear from an edge of touch screen 112 and move toward the locations corresponding to the search results. Also, pin shadows (548-1 and 548-2) or other visual effects may appear and move toward the locations corresponding to the search results. In addition, special indicator 582-1 appears and moves toward the location corresponding to a search result of special designation (e.g., a location selected by a sponsor, a popular location, etc.). In other embodiments, the search result pins may be animated in a different manner, or may appear on the map without an animation.

In FIG. 5H, callout 524-1 is displayed adjacent to search result pin 522-1. Callout 524-1 includes information text (e.g., name of the person, business, or building, type of a building/facility, address, etc.) associated with the corresponding location. In this example, callout 524-1 includes the name of business or building, "ABC Hotel," associated with the corresponding location. Callout 524-1 may also include street view icon 528 that when activated (e.g., by a finger tap on the icon, or by a voice command) initiates the display of a street view at the corresponding location; and/or information icon 526 that when activated (e.g., by a finger tap on the icon, or by a voice command) initiates the display of additional information associated with the corresponding location (e.g., a phone number and/or a website address of a person or business at the corresponding location).

Figure 5I:
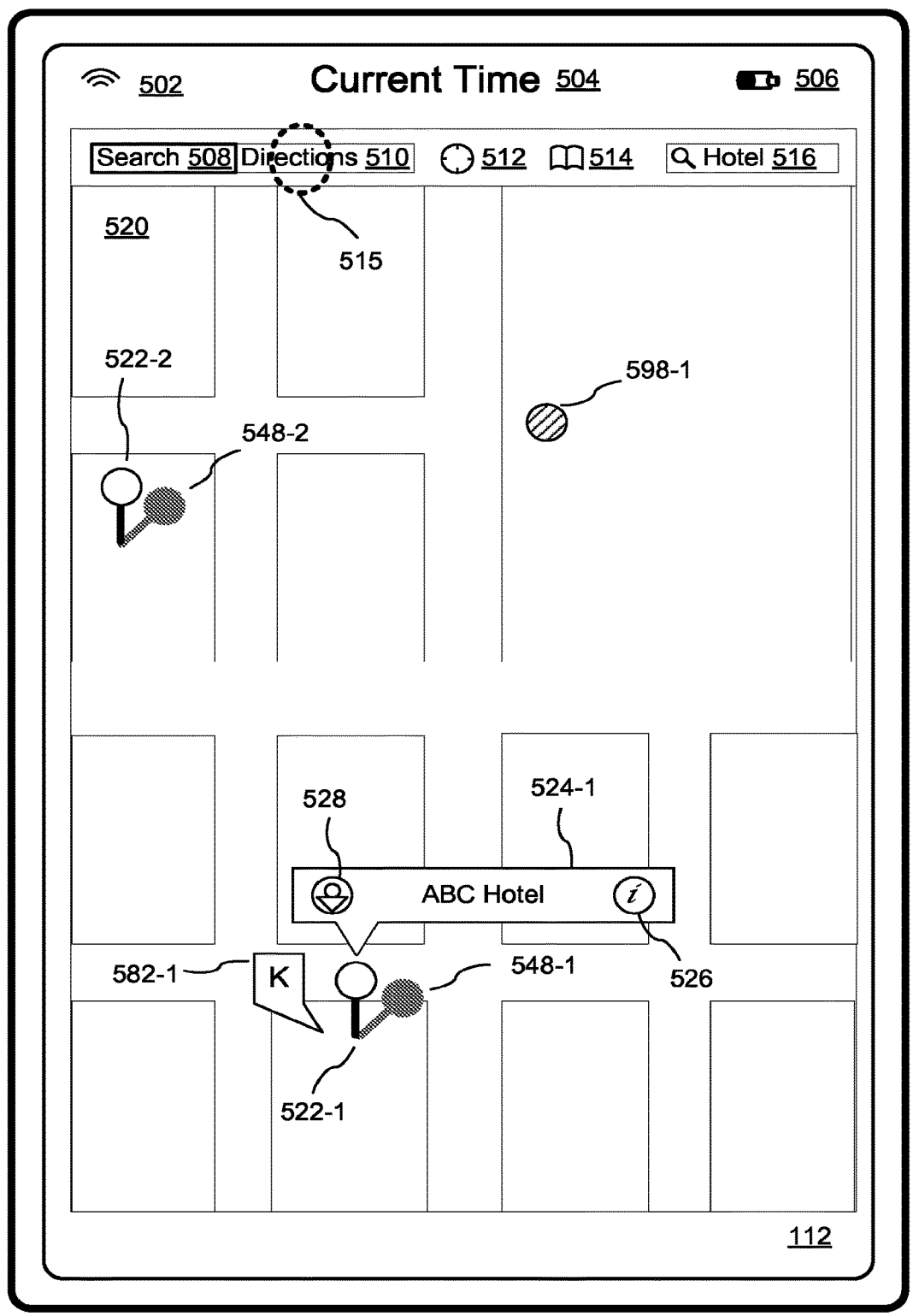

In FIG. 5I, contact 515 is detected at a location on touch screen 112 corresponding to directions mode icon 510. Contact 515 (or any equivalent user command) causes the map application to display a user interface in the directions mode.

Figure 5J:
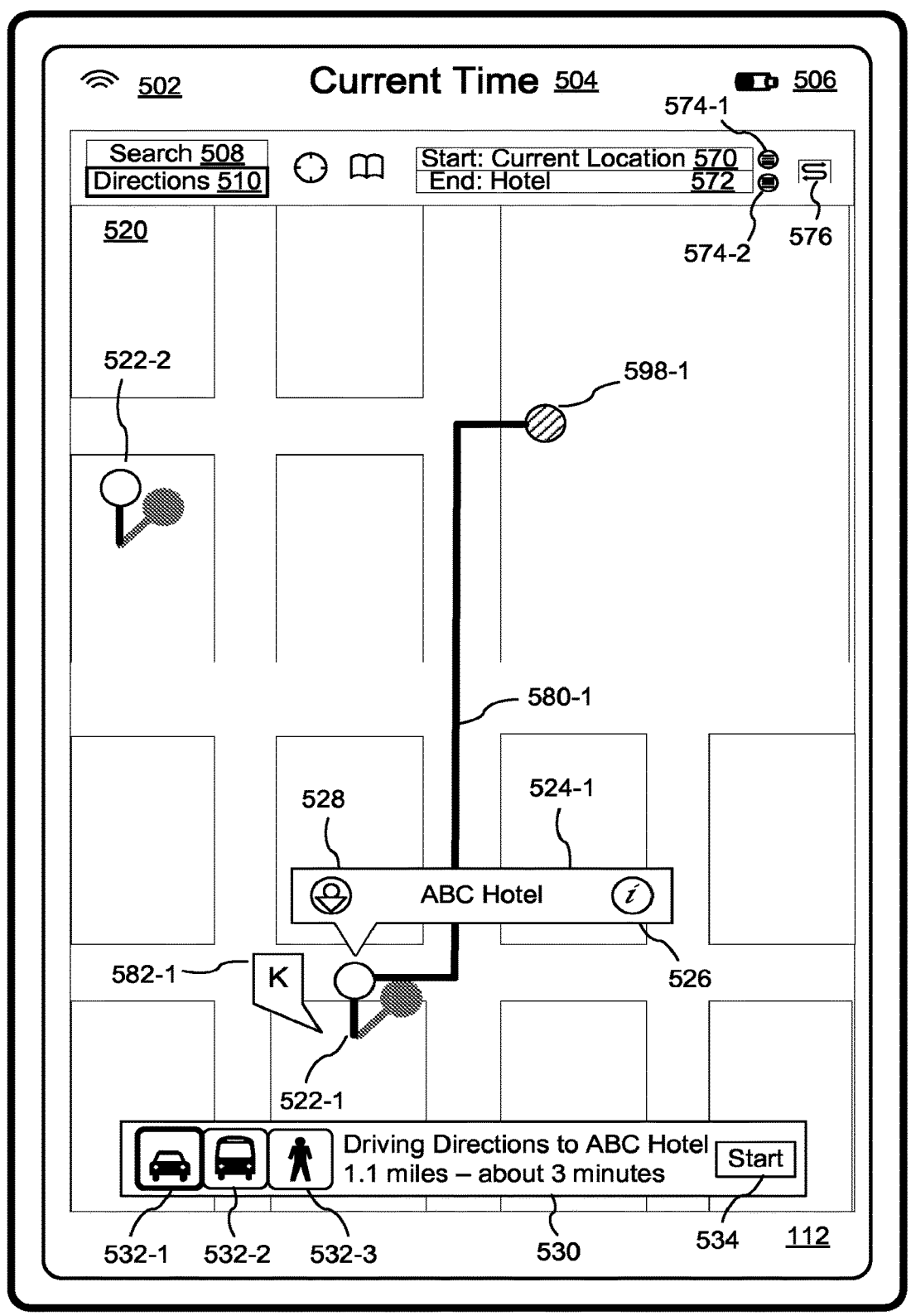

FIG. 5J illustrates an exemplary user interface in the directions mode. The exemplary user interface may include the following elements, a subset or superset thereof:
  starting point input area 570 that displays a starting point for a route; starting point input area 570 when activated (e.g., selected by a finger tap on the icon, or by a voice command) enables input of a search query for the starting point, as described with respect to FIGS. 5A-F;
  ending point input area 572 that displays an ending point for the route; ending point input area 572 when activated (e.g., selected by a finger tap on the icon, or by a voice command) enables input of a search query for the ending point, as described with respect to FIGS. 5A-F;
  starting points list icon 574-1 that when activated (e.g., by a finger tap on the icon, or by a voice command) initiates the display of a list of starting points (e.g., query results for starting points, or a list of recently selected locations);
  ending points list icon 574-2 than when activated (e.g., by a finger tap on the icon, or by a voice command) initiates the display of a list of ending points (e.g., query results for ending points, or a list of recently selected locations);
  reverse-route icon 576 that when activated initiates one or more of the following: switching the starting points and ending points (i.e., converting starting points to ending points, and converting ending points to starting points), switching an entry in starting point input area 570 and an entry in ending point input area 572, and updating directions;
  route 580-1, which indicates a route from a selected starting point to a selected ending point; in some embodiments, device 100 selects a starting point and an ending point based on predefined criteria; in this example, the device's current location (represented by current location indicator 598-1) is selected as a starting point, and search result pin 522-1 is selected as an ending point;
  directions popup view 530 that displays information associated with a route from a starting point to an ending point; in some embodiments, the information displayed in directions popup view 530 includes travel directions; in this example, the directions popup view 530 indicates the distance and travel time for route 580-1 to the ending point, ABC Hotel for a respective mode of travel ("driving");
  mode of travel icons 532 that when activated (e.g., by a finger tap on the icon, or by a voice command) initiate the selection of a mode of travel, and optionally update route 580-1 and/or directions popup view 530 (e.g., display an updated route and associated information for the selected mode of travel); in this example, mode of travel icons 532 include driving icon 532-1, public transportation icon 532-2, and walking icon 532-3; and
  start directions icon 534 that when activated (e.g., by a finger tap on the icon, or by a voice command) initiate the display of directions for the route from the selected starting point to the selected ending point.

Also in FIG. 5J, search result pins 522 become ending point search result pins. In other words, previous search results become user-selectable ending points. Depending on whether the reverse route icon is activated, these search results could also become user selectable starting points.

Figure 5K:
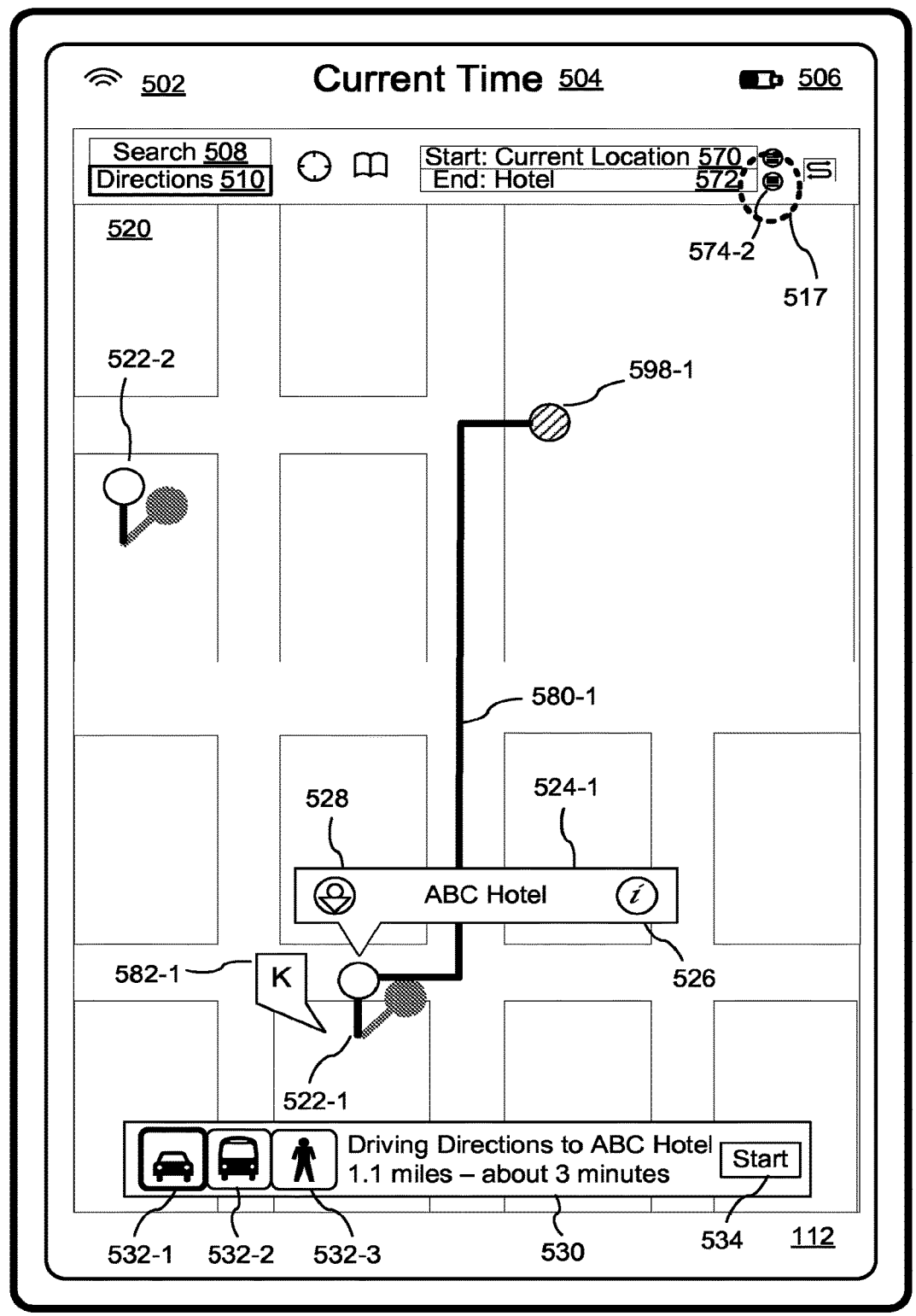

In FIG. 5K, contact 517 is detected at a location on touch screen 112 corresponding to (e.g., at or near) ending points list icon 574-2. In response, results popup view 540-4 is displayed in FIG. 5L. Results popup view 540-4 includes a list of query results obtained from a previous search for locations that correspond to the search query, "hotel."

Figure 5L:
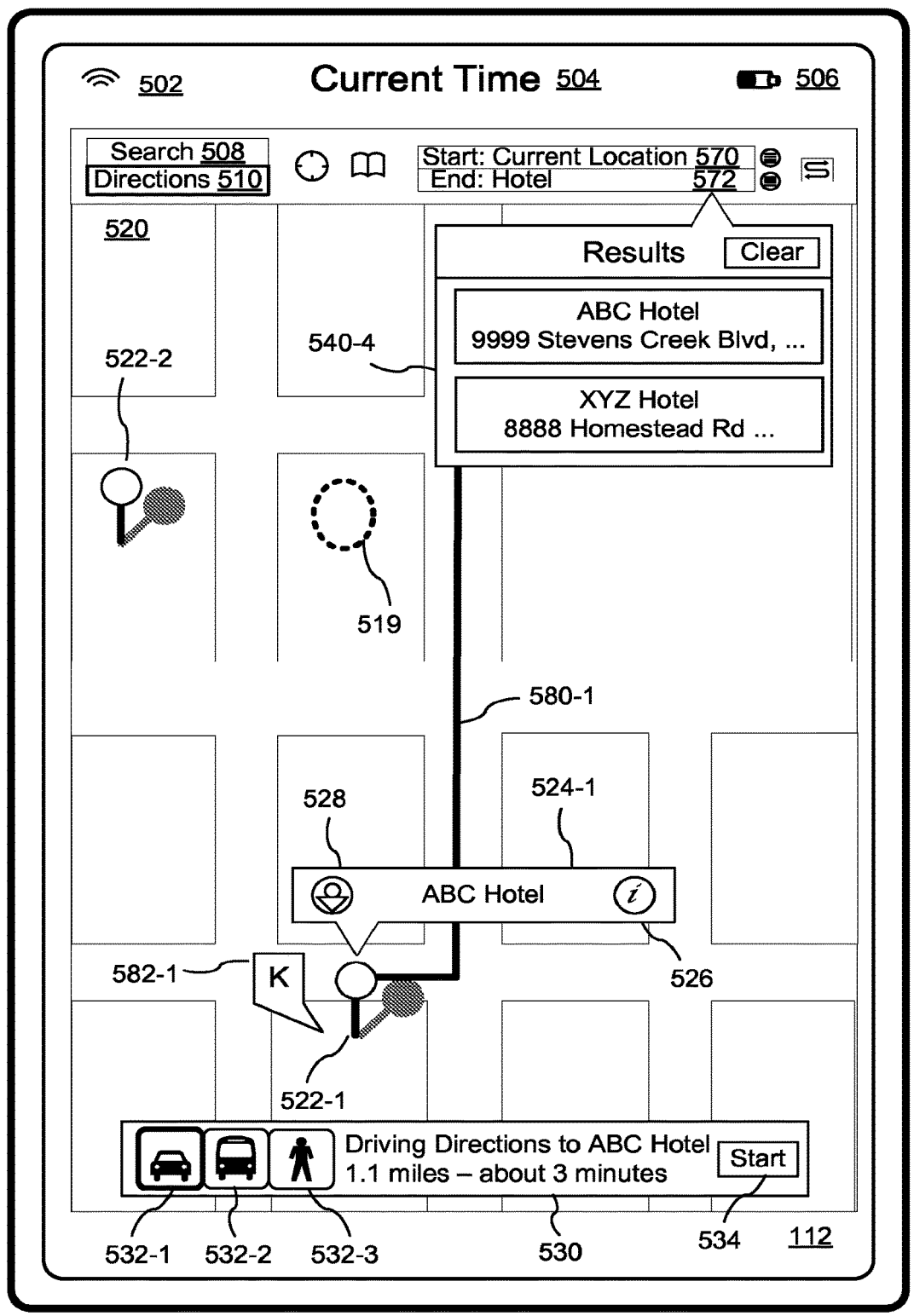

FIG. 5L also illustrates that contact 519 is detected at a location on touch screen 112 outside results popup view 540-4. In response, results popup view 540-4 ceases to display (or disappears), as shown in FIG. 5M.

Figure 5M:
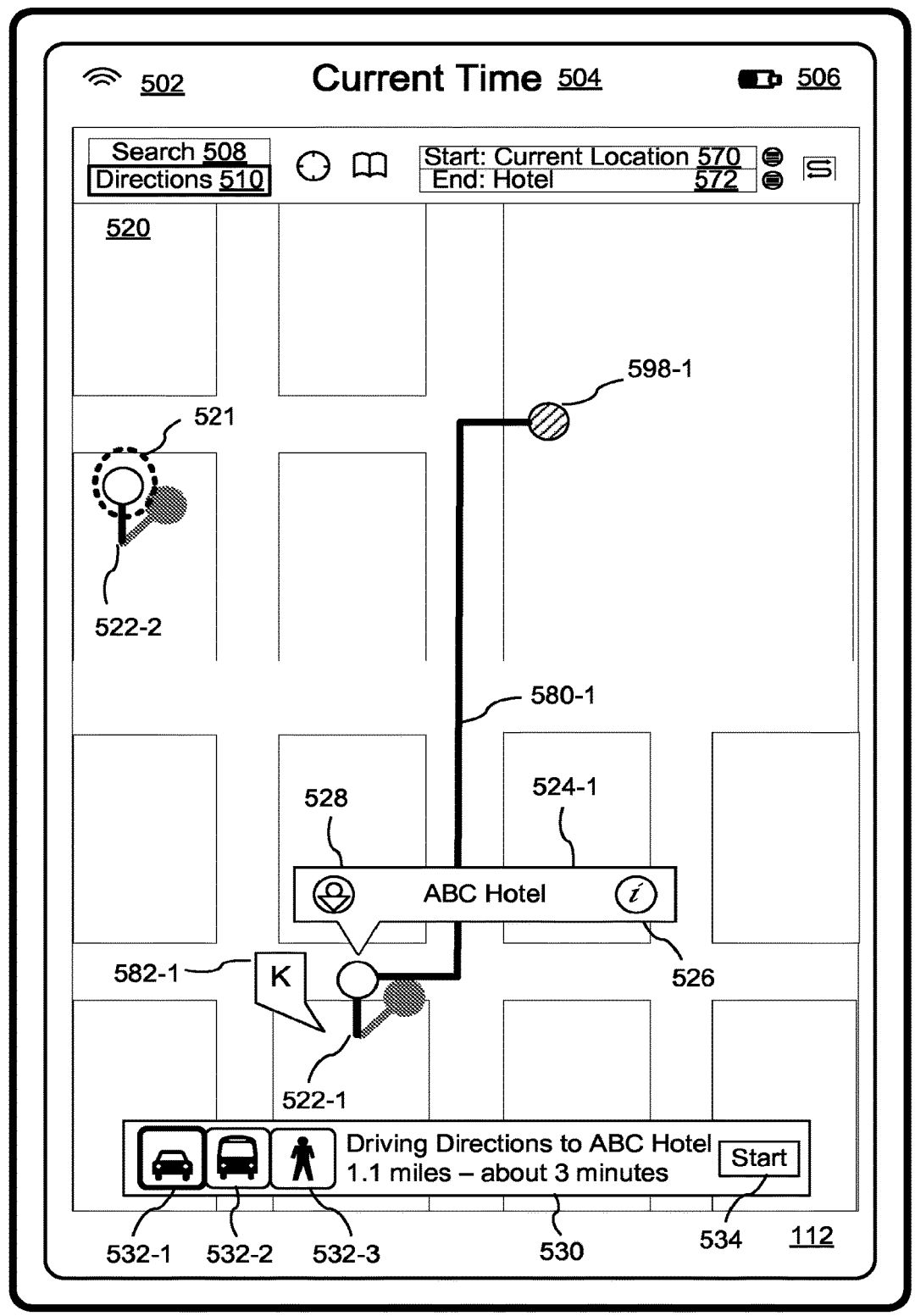
Figure 5N:
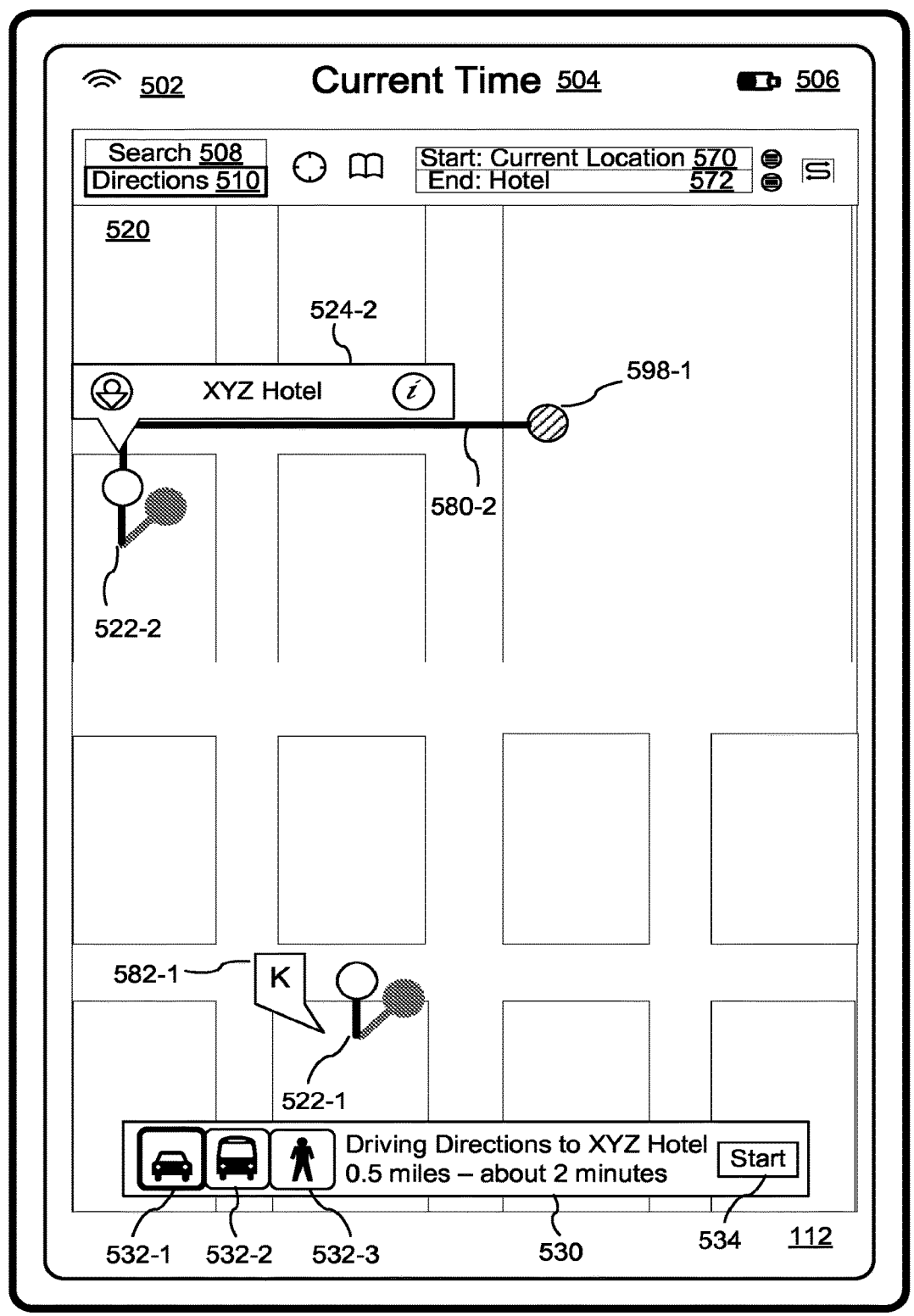

FIG. 5M also illustrates that contact 521 is detected at a location on touch screen 112 that corresponds to search result pin 522-2, thereby selecting search result pin 522-2. In response to contact 521, route 580-1 ceases to display (or disappears), and route 580-2 from current location 598-1 to search result pin 522-2 is displayed, as shown in FIG. 5N. In addition, callout 524-1 ceases to display (or disappears), and callout 524-2 is displayed. Optionally, callout 524-2 includes street view icon 528 and information icon 526 as described above. Directions popup view 530 displays information associated with route 580-2. Optionally, directions popup view 530 also includes icons 532-1, 532-2, 532-3, and 534 as described above.

Figure 5O:
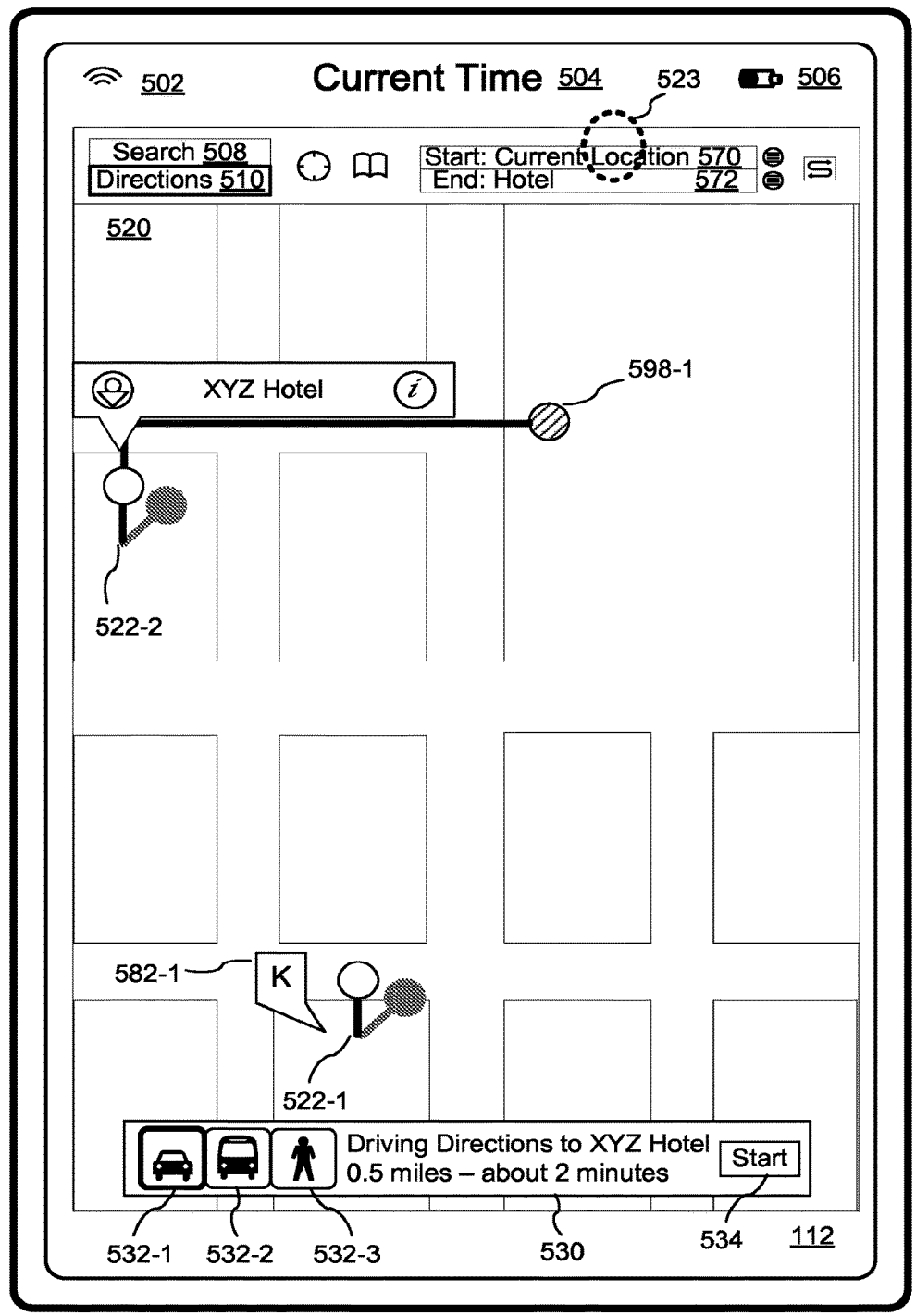
Figure 5P:
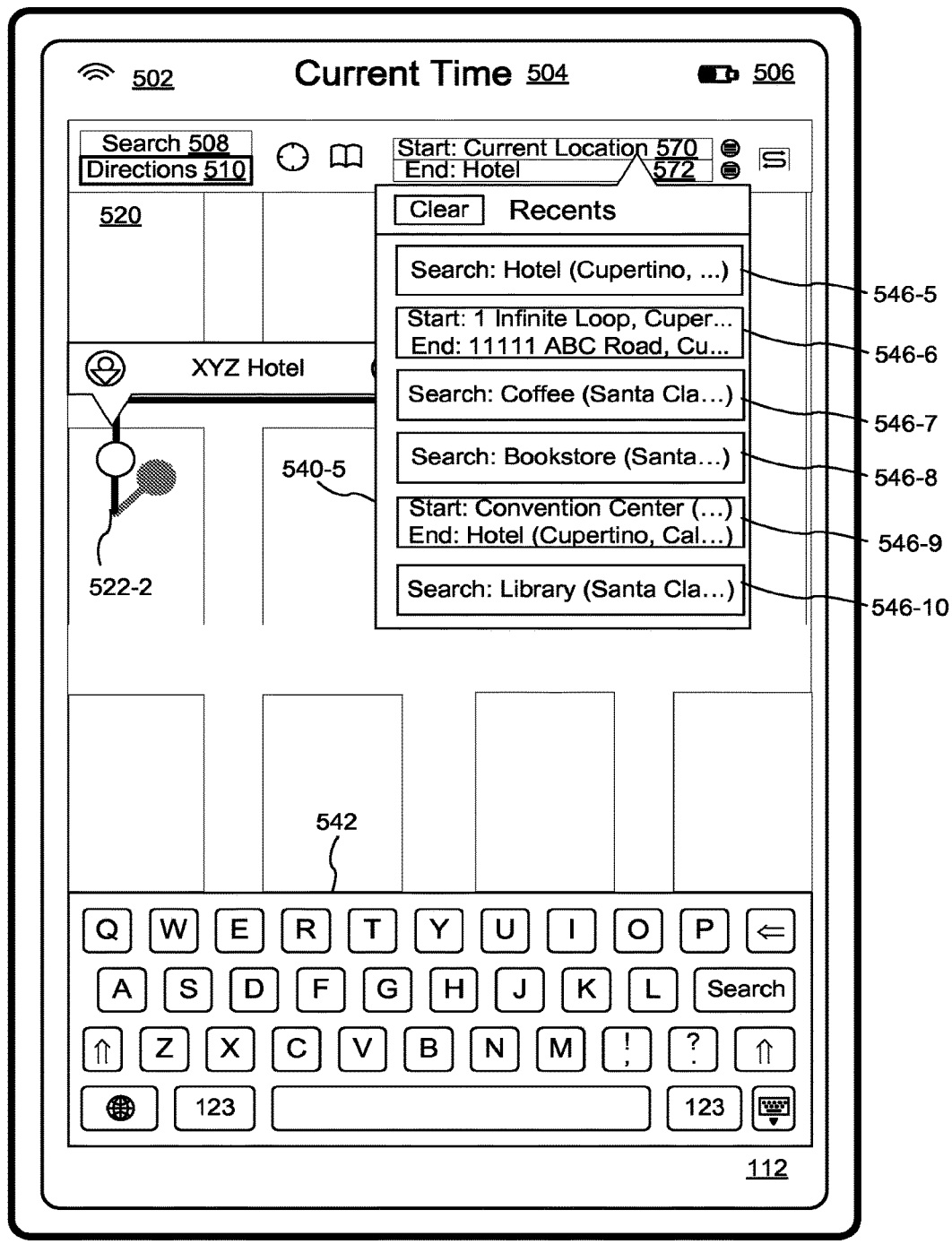
Figure 5Q:
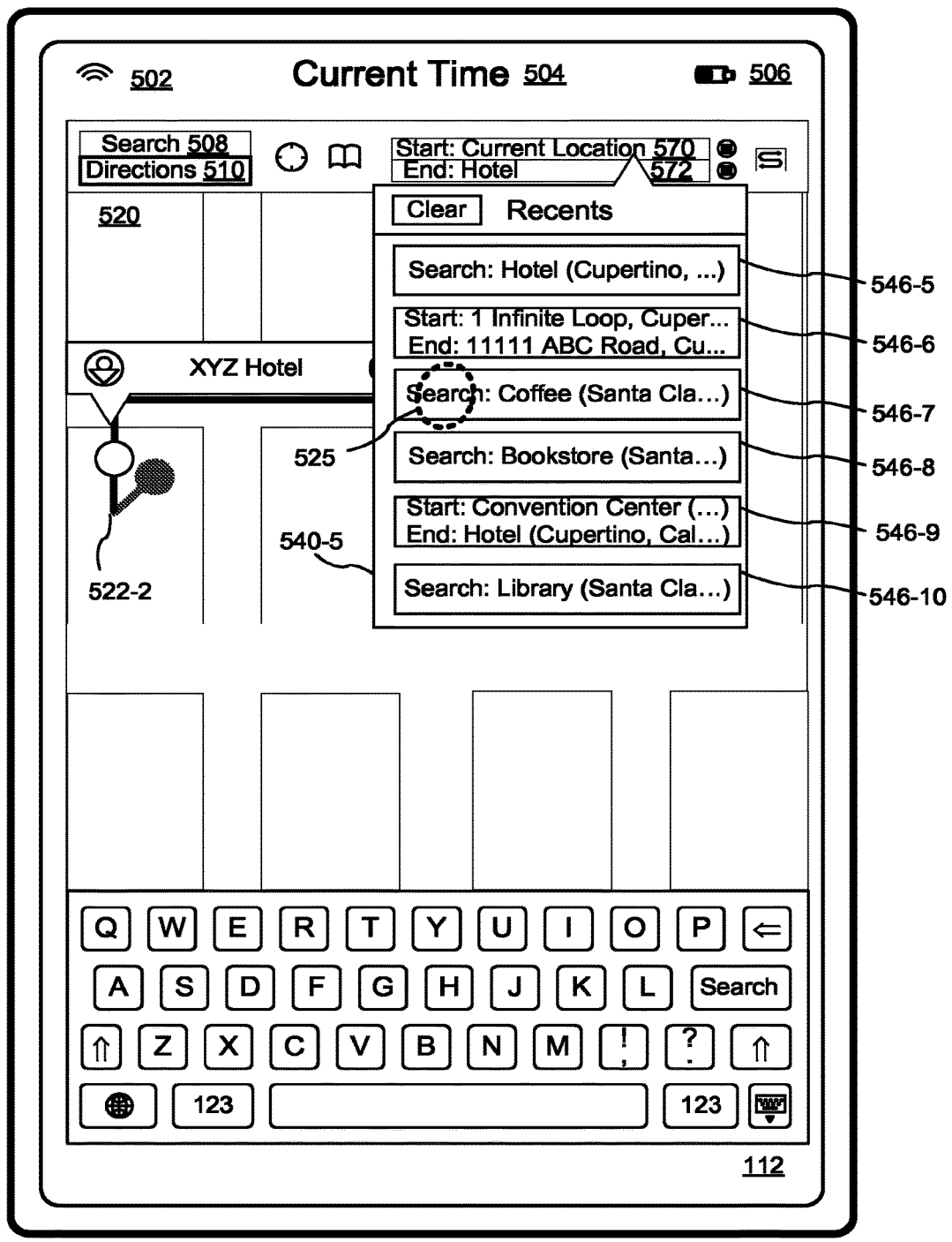
Figure 5R:
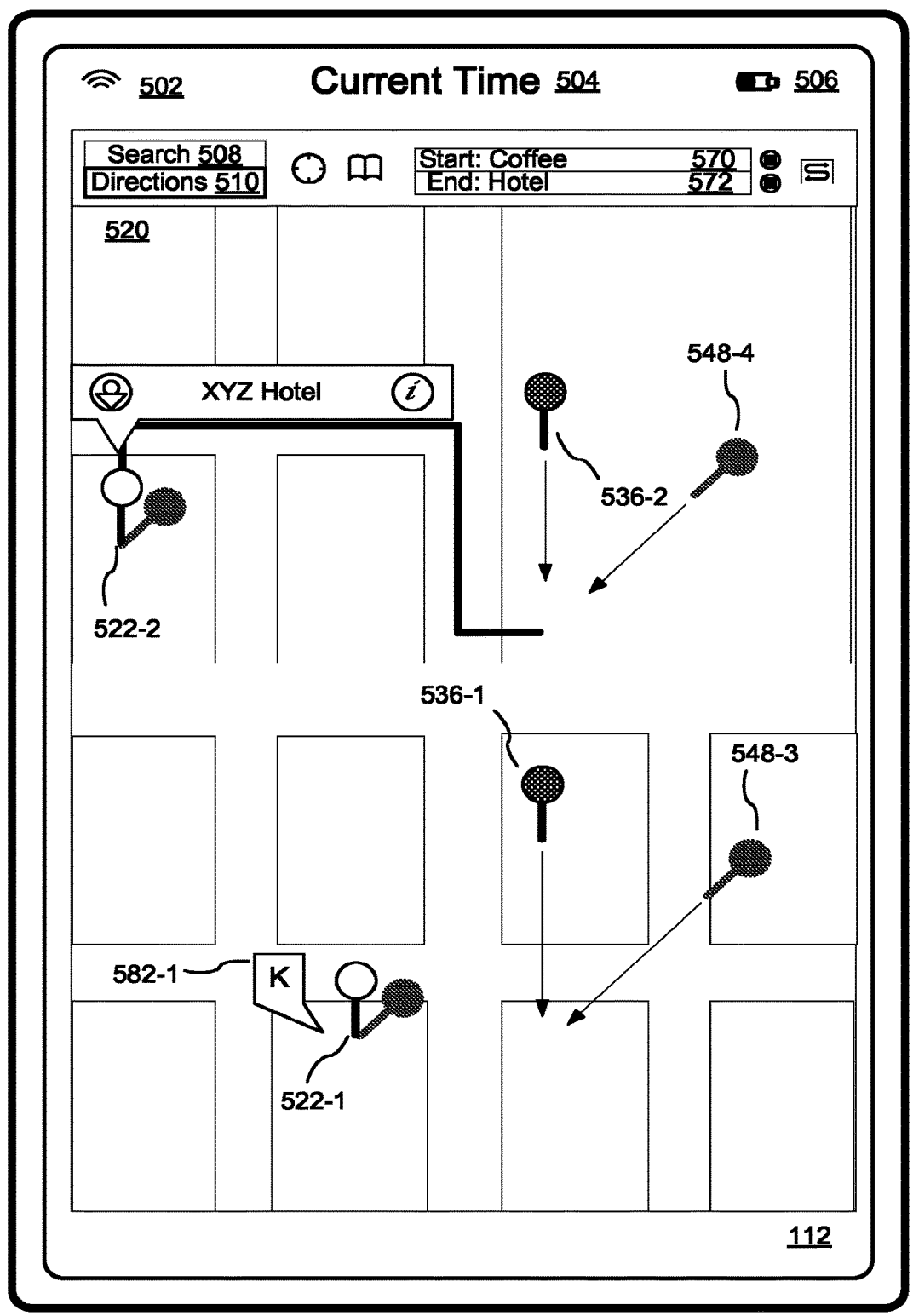
Figure 5S:
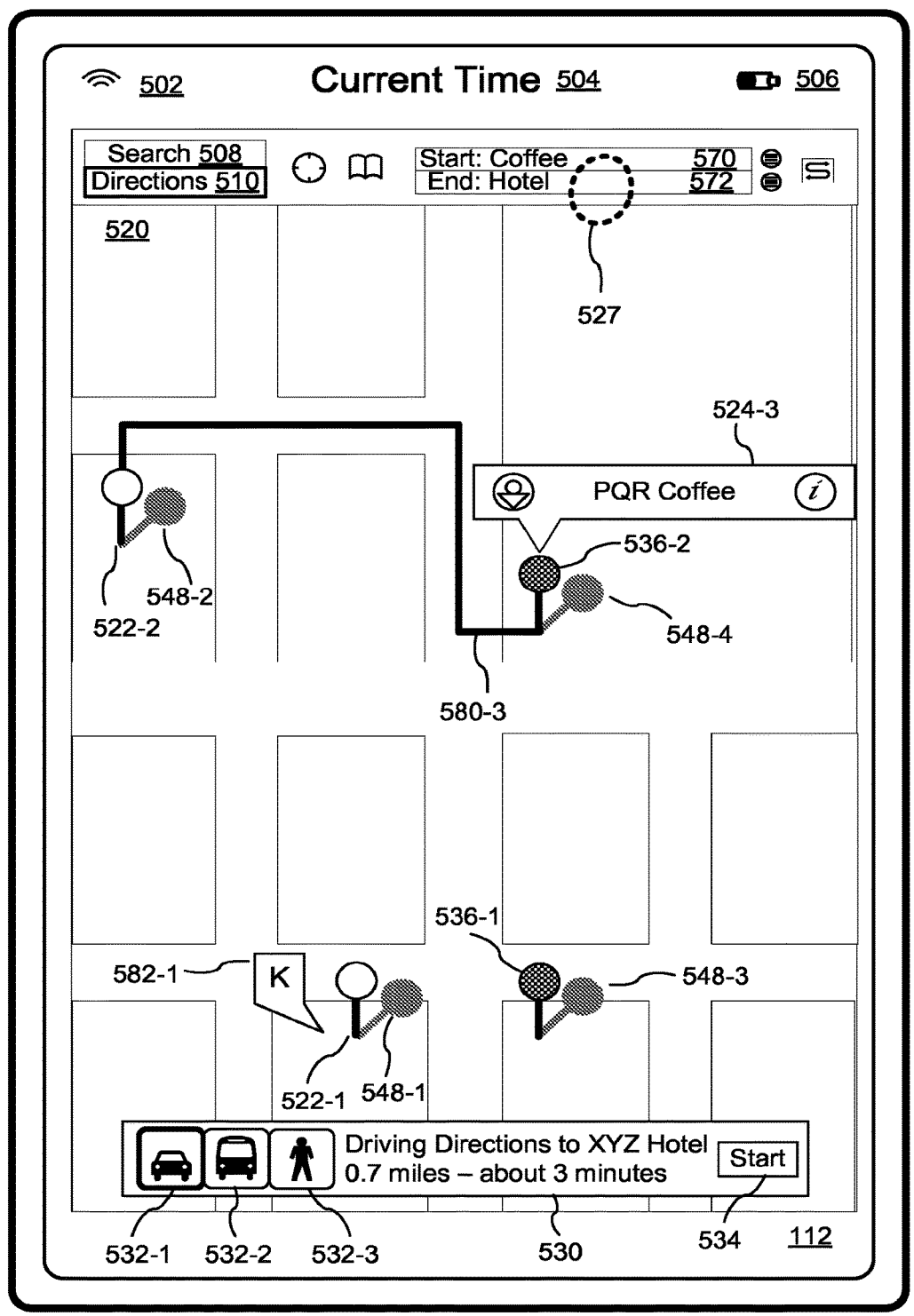

In FIG. 5O, contact 523 is detected at a location on touch screen 112 that corresponds to starting point input area 570. In response, recents popup view 540-5 and keyboard 542 are displayed, as shown in FIG. 5P. Recents popup view 540-5 (FIG. 5P) includes a list of recent search queries (also called query inputs) 546 for starting points. In FIG. 5Q, contact 525 is detected at a location on touch screen 112 that corresponds to recent query input 546-7. In response, a search is initiated to search for locations that correspond to the search query, "coffee". FIGS. 5R-5S illustrate changes to the user interface of the map application resulting for initiation of the search for locations that correspond to the search query, "coffee".

In particular, FIGS. 5R-5S illustrate an animation of displaying search results (for the search query, "coffee") on map 520. In FIG. 5R, starting point search result pins (536-1 and 536-2) and pin shadows (548-3 and 548-4) appear as described above. In addition, route 580-2 ceases to display (or disappears); and route 580-3 from starting point search result pin 536-2 to ending point search result pin 522-2 and callout 524-3 are displayed. In this example, ending point search result pins (536-1 and 536-2) and starting point search result pins (522-1 and 522-2) are visually distinguished by having different colors, patterns or shading. In some embodiments, pin shadows for starting point search result pins (e.g., 548-1 and 548-2) and pin shadows for ending point search result pins (e.g., 548-3 and 548-3) are visually distinguished by having different colors, patterns or shading.

Figure 5T:
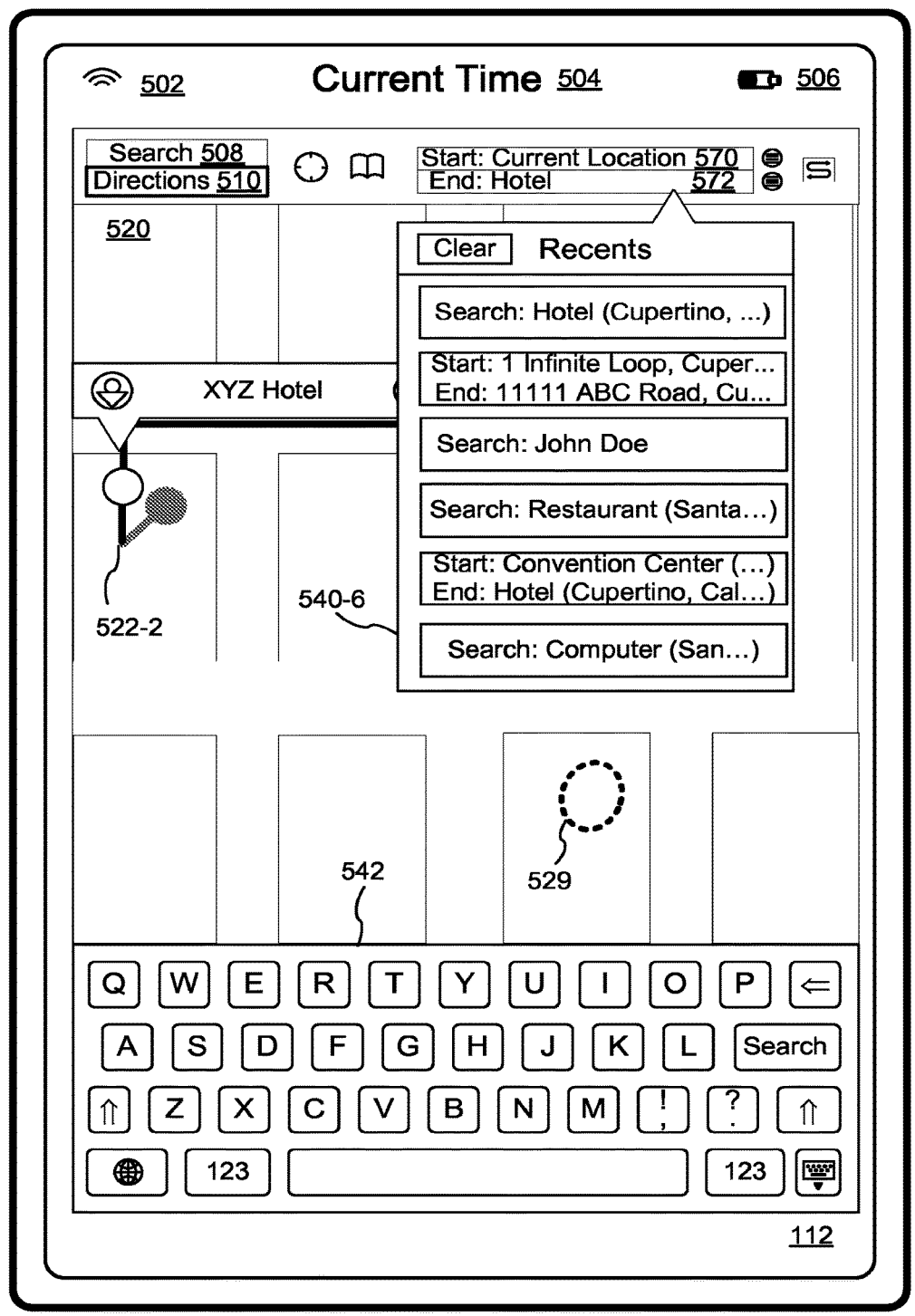

In FIG. 5S, contact 527 is detected at a location on touch screen 112 that corresponds to ending point input area 572. In response, the map application displays recents popup view 540-6 and keyboard 542, as shown in FIG. 5T. Recents popup view 540-6 includes a list of recent search queries for ending points. In this example, recent pop up view 540-6 for ending points and recent popup view 540-5 for starting points (in FIG. 5P) have distinct lists of recent query inputs (i.e., the list of recent query inputs for starting points and the list of recent query inputs for ending points are not identical). For example, recents popup view 540-6 (for ending points) includes search terms: restaurant, computer, and a name of a person, John Doe. None of these are included in recents popup view 540-5. However, in some other embodiments, the same recents popup view is provided for both starting points and ending points. Optionally, recents popup view 540-6 includes recently selected map locations and/or recent location search queries of all types (for map locations, for starting points and for ending points).

FIG. 5T also illustrates that contact 529 is detected at a location on touch screen 112 that corresponds to an area outside recents popup view 540-6. In response, the map application ceases to display recents popup view 540-6, as shown in FIG. 5U.

Figure 5U:
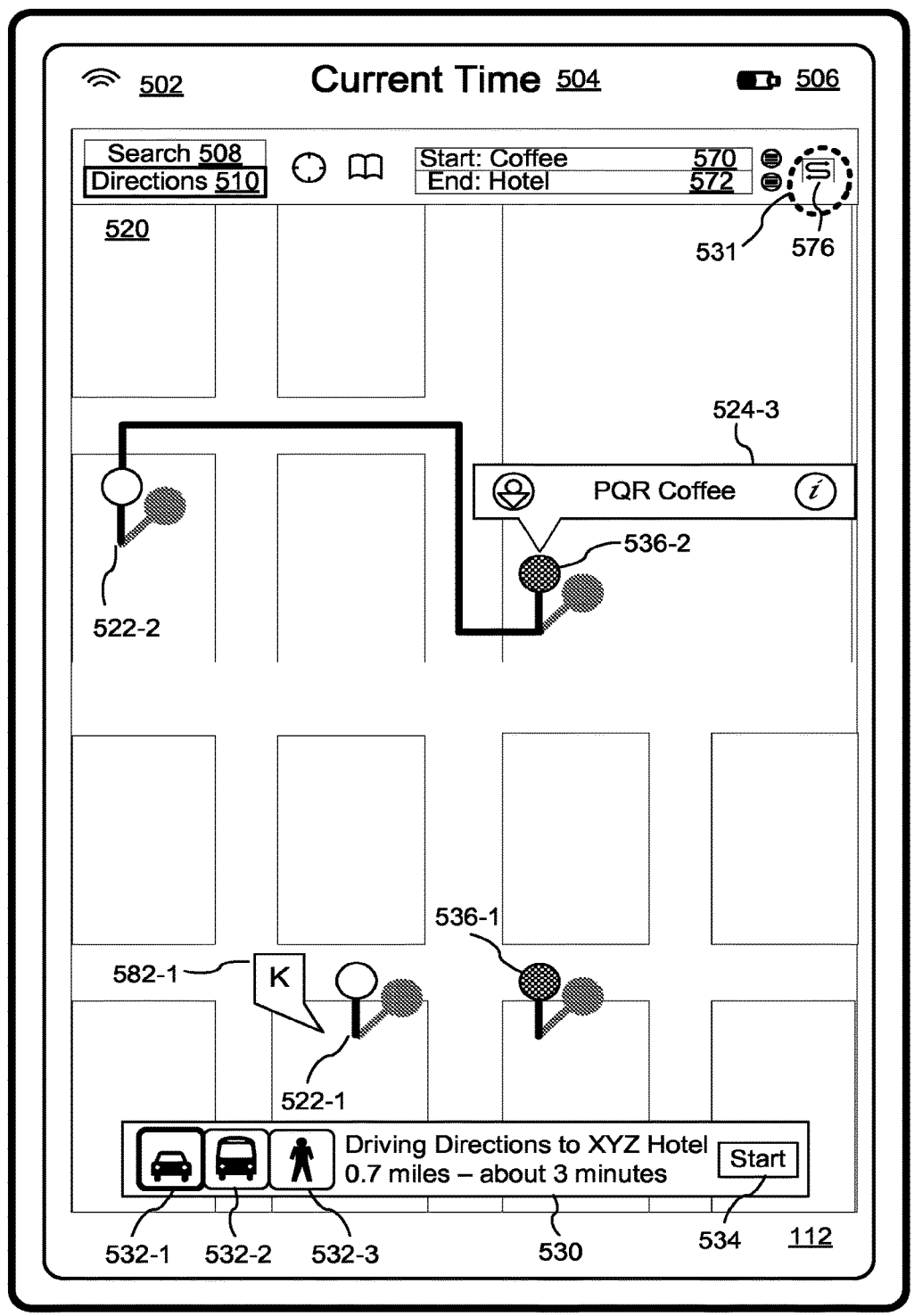
Figure 5V:
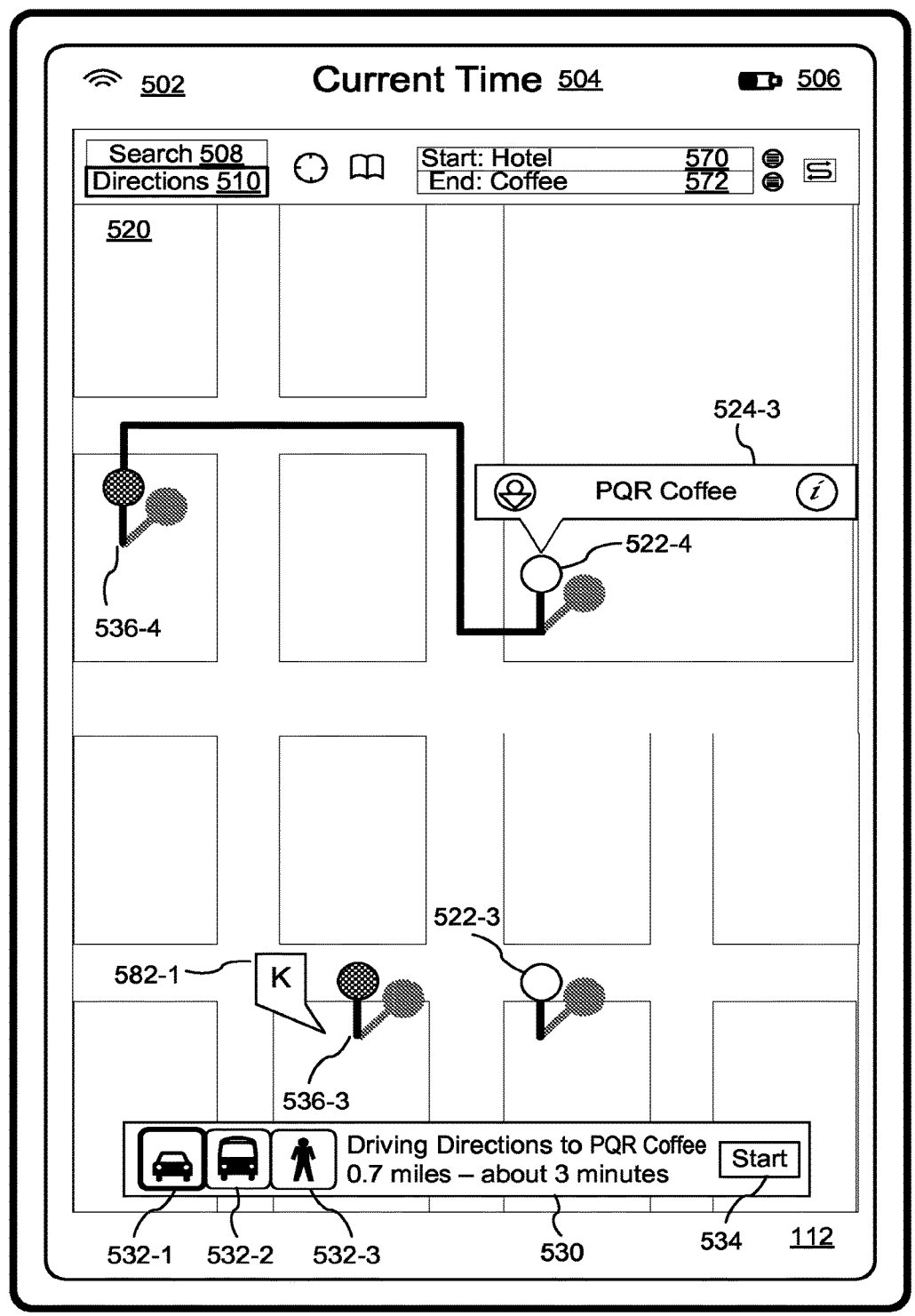

FIG. 5U illustrates detection of contact 531 at a location on touch screen 112 that corresponds to reverse-route icon 576. In response, the starting points and the ending points are switched, as shown in FIG. 5V. For example, search input areas 570 and 572 display hotel as a query input for starting points and coffee as a query input for ending points. Starting point search result pins 522-1 and 522-2 are converted to ending point search result pins 536-3 and 536-4. Similarly, ending point search result pins 536-1 and 536-2 are converted to starting point search result pins 522-3 and 522-4. Directions popup view 530 displays information associated with the route from starting point search result pin 536-4 to ending point search result pin 522-4.

Figure 5W:
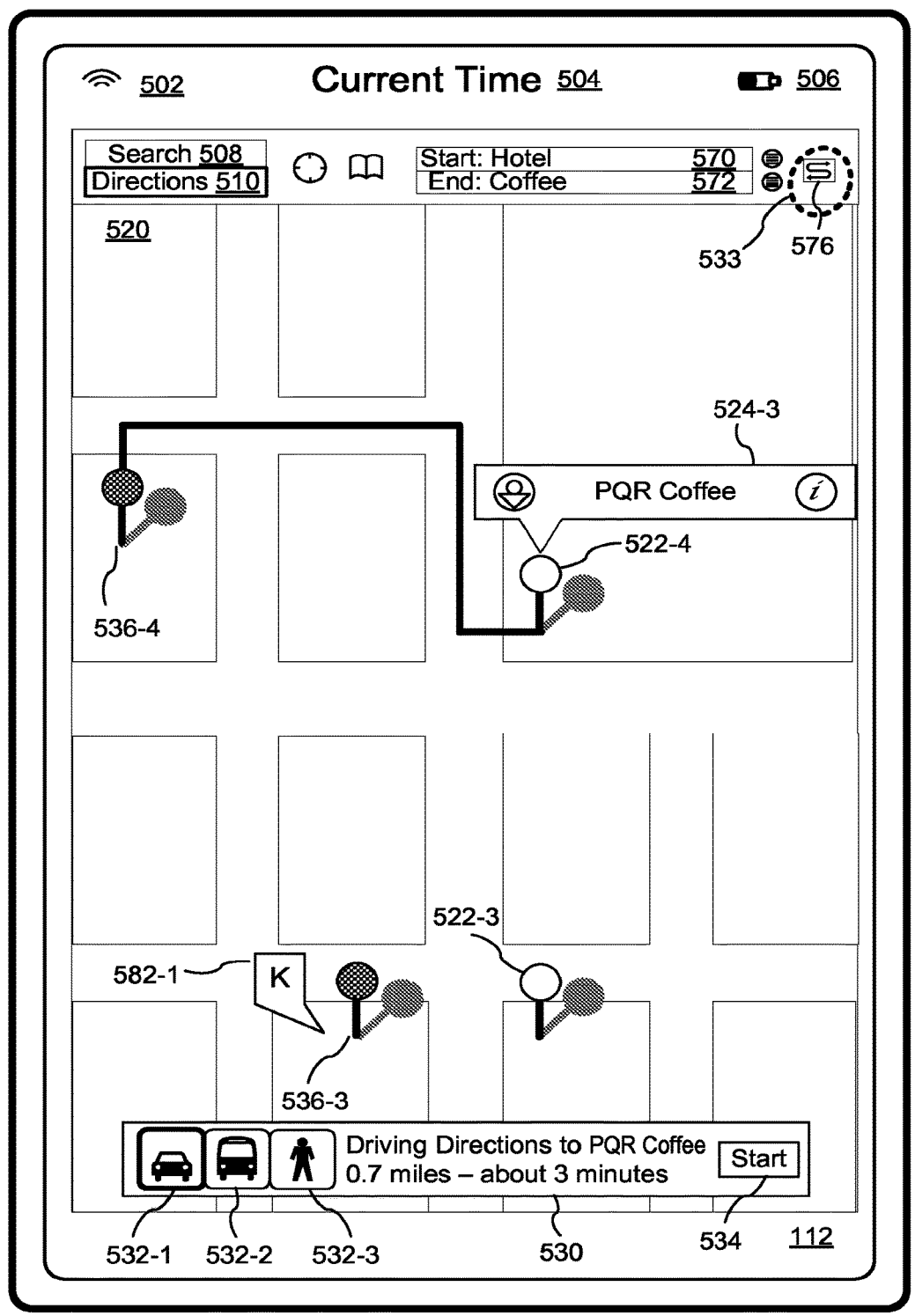

FIG. 5W illustrates detection of contact 533 at a location on touch screen 112 that corresponds to reverse-route icon 576. In response, the starting points and the ending points are switched back, as shown in FIG. 5X.

Figure 5X:
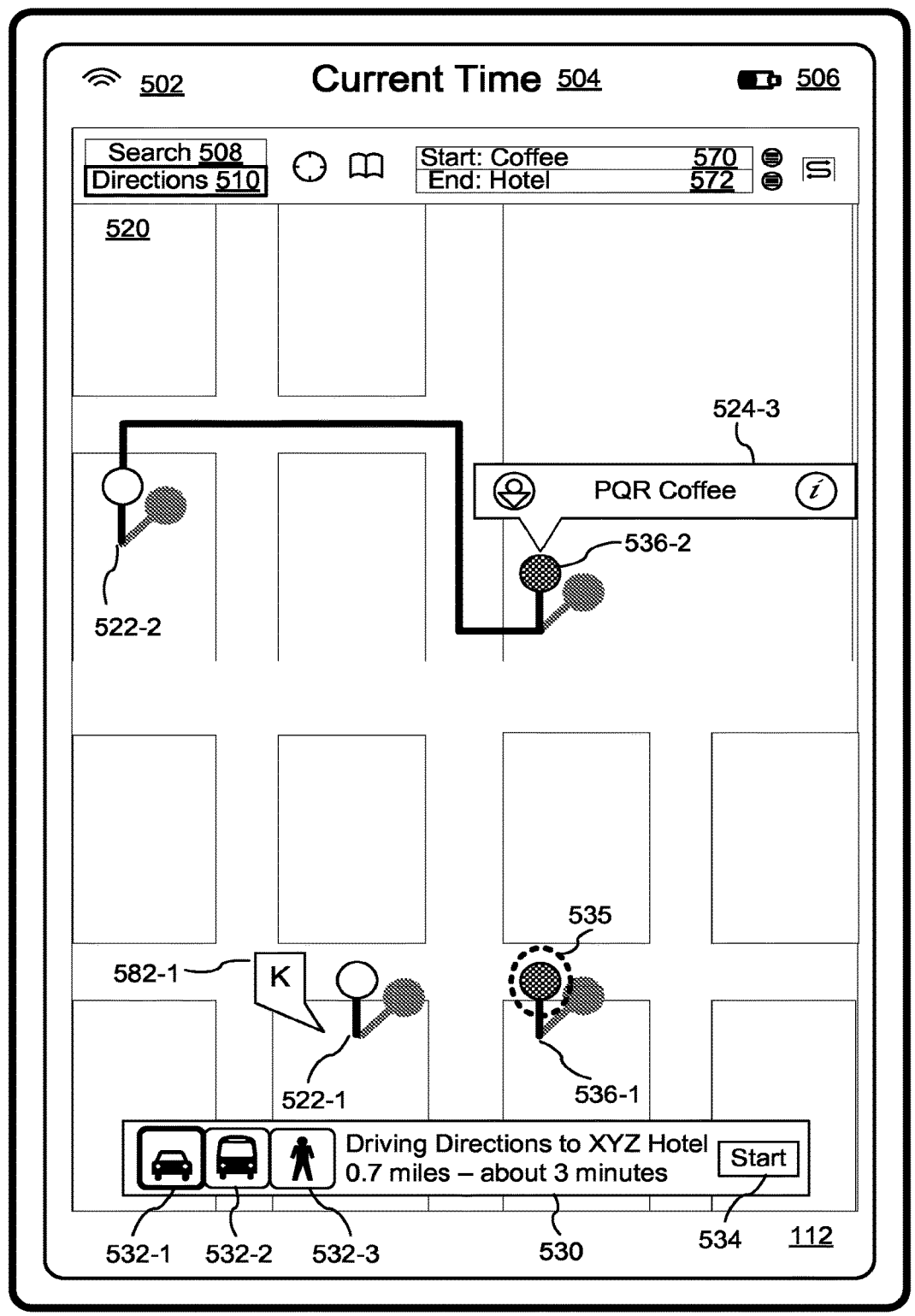
Figure 5Y:
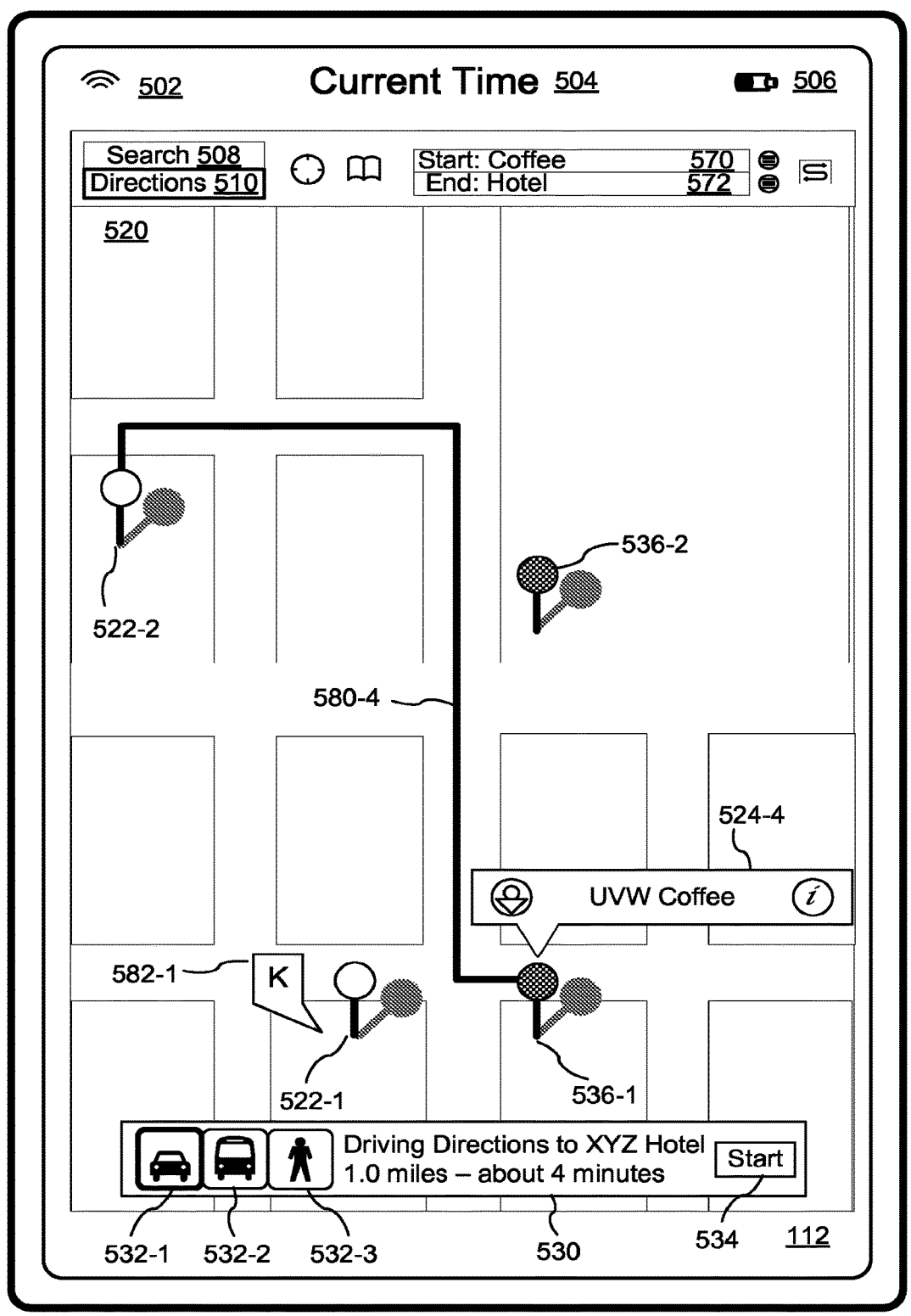

FIG. 5X also illustrates detection of contact 535 at a location on touch screen 112 that corresponds to starting point search result pin 536-1, thereby selecting starting point search result pin 536-1. In response, the map application ceases to display route 580-3, and instead displays route 580-4 from starting point search result pin 536-1 to ending point search result pin 522-2, as shown in FIG. 5Y. In addition, callout 524-4 (for starting point search result pin 536-1) is displayed.

Figure 5Z:
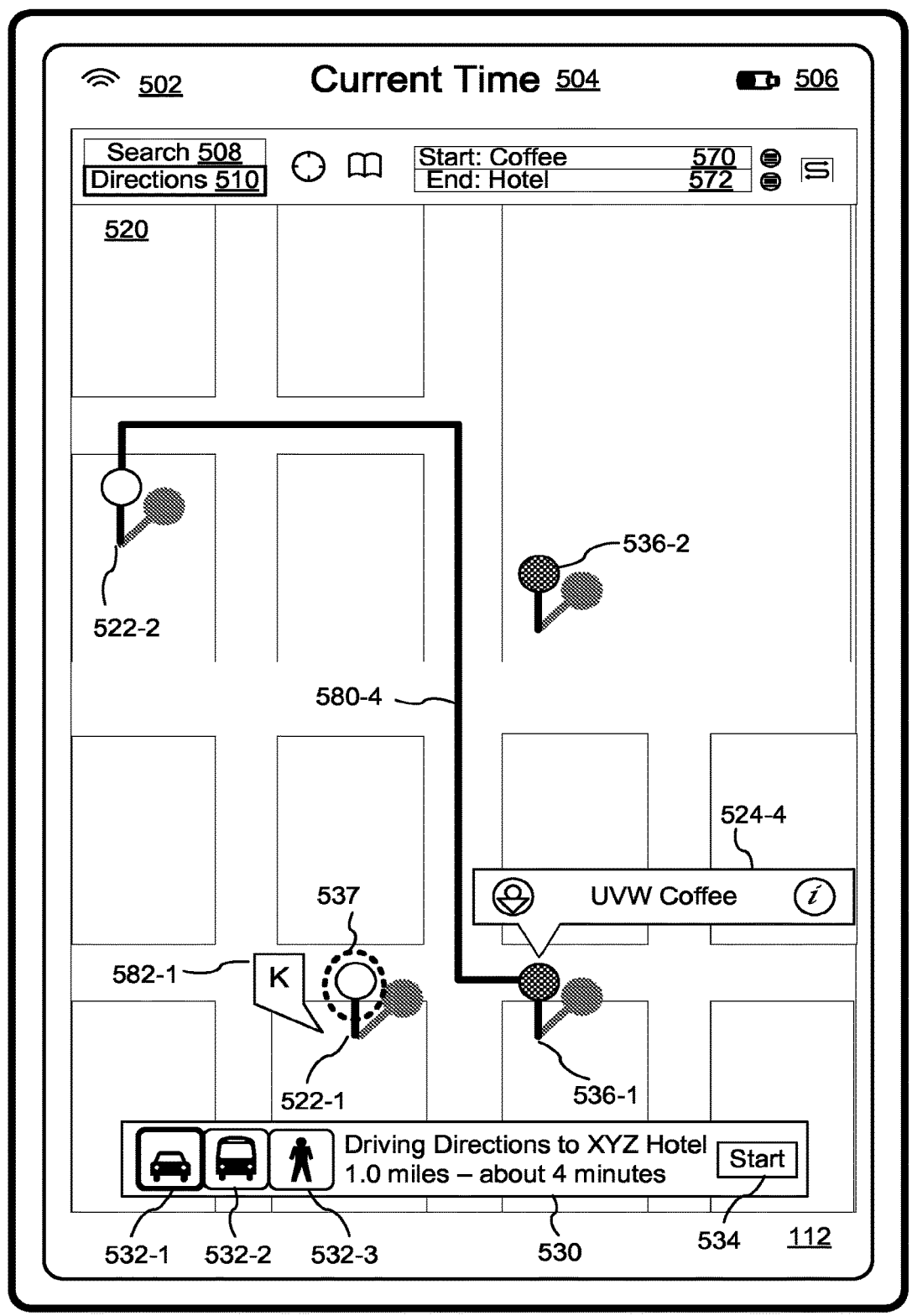
Figure 5A:
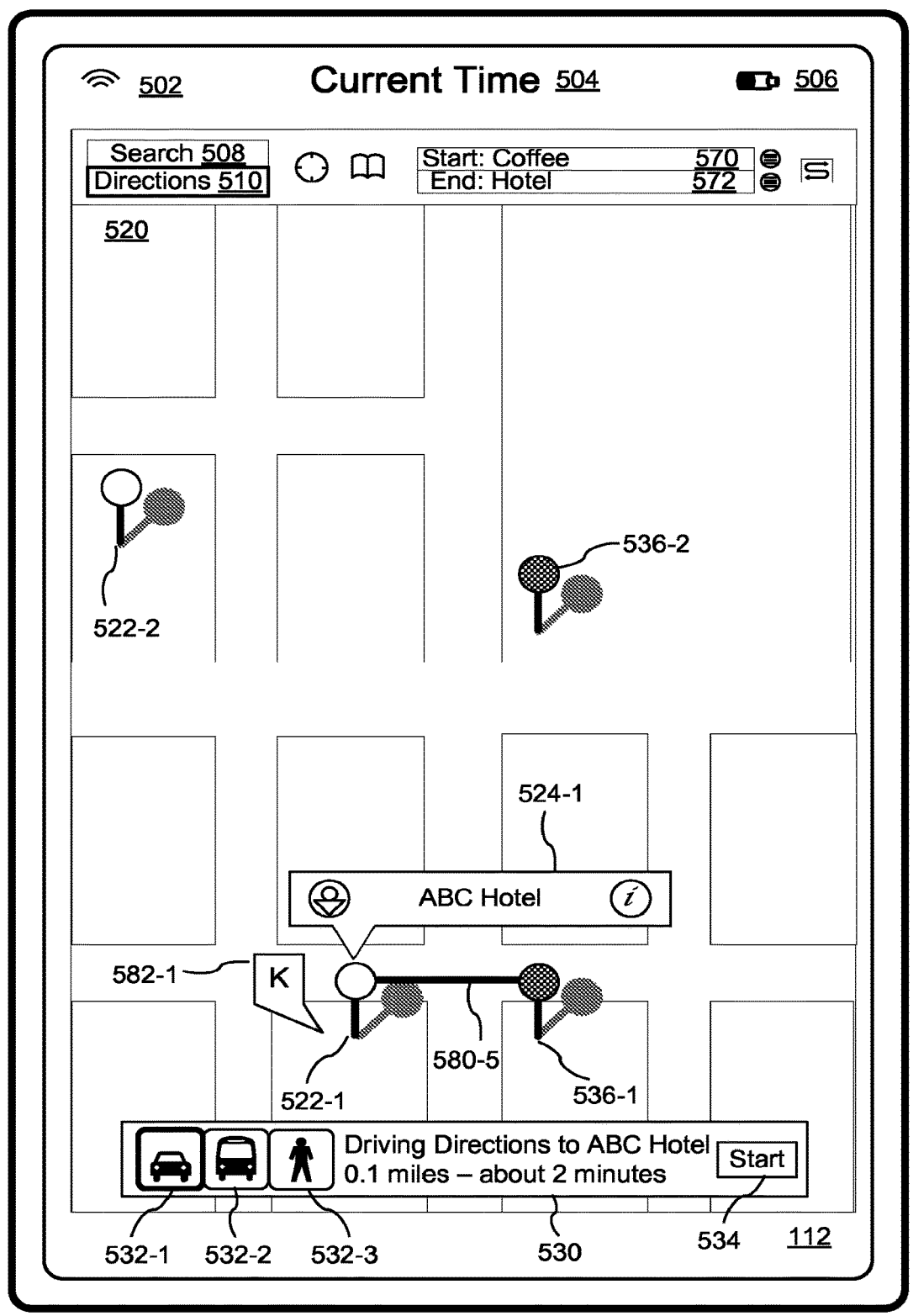
Figure 5B:
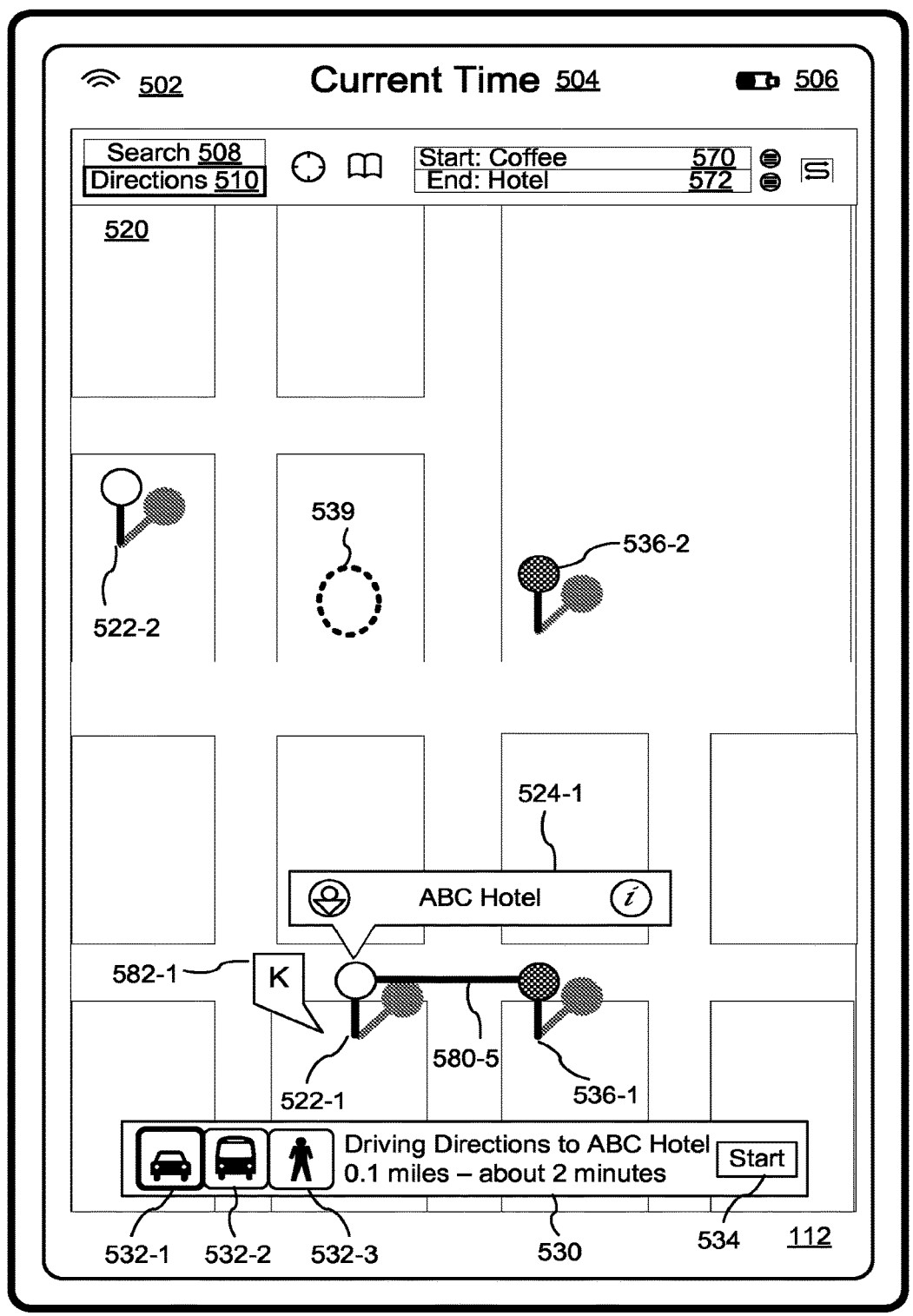
Figure 5C:
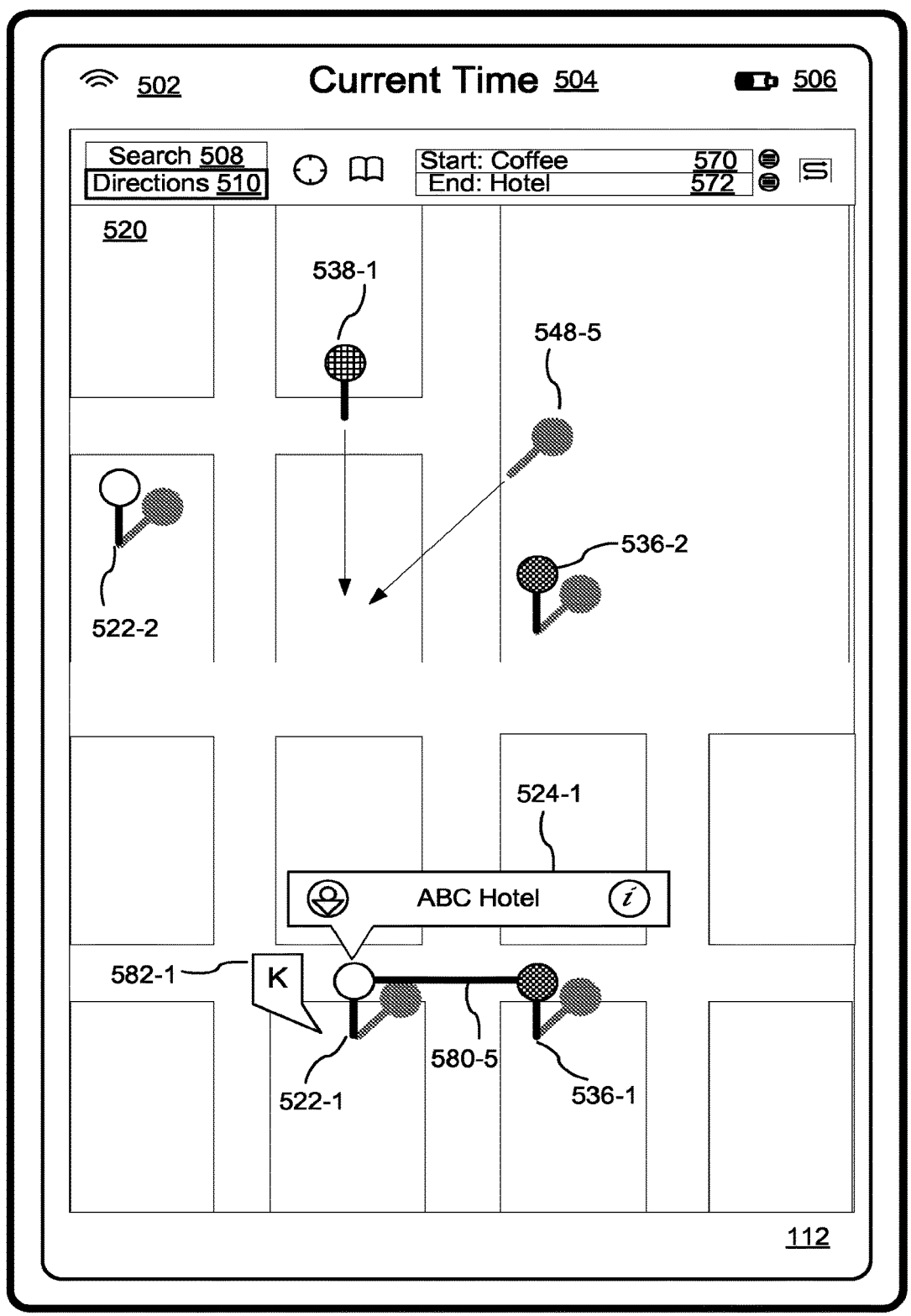
Figure 5D:
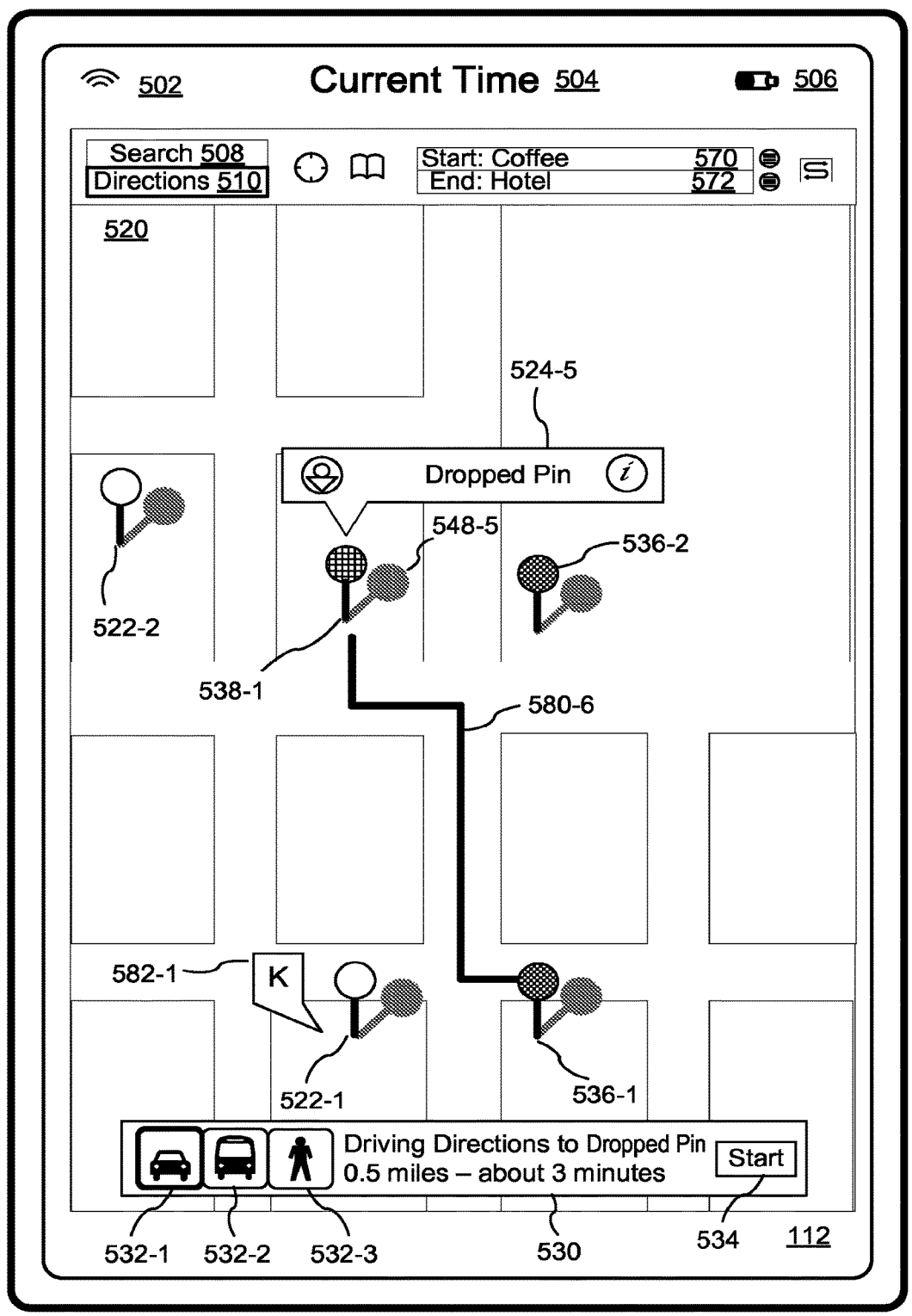
Figure 5E:
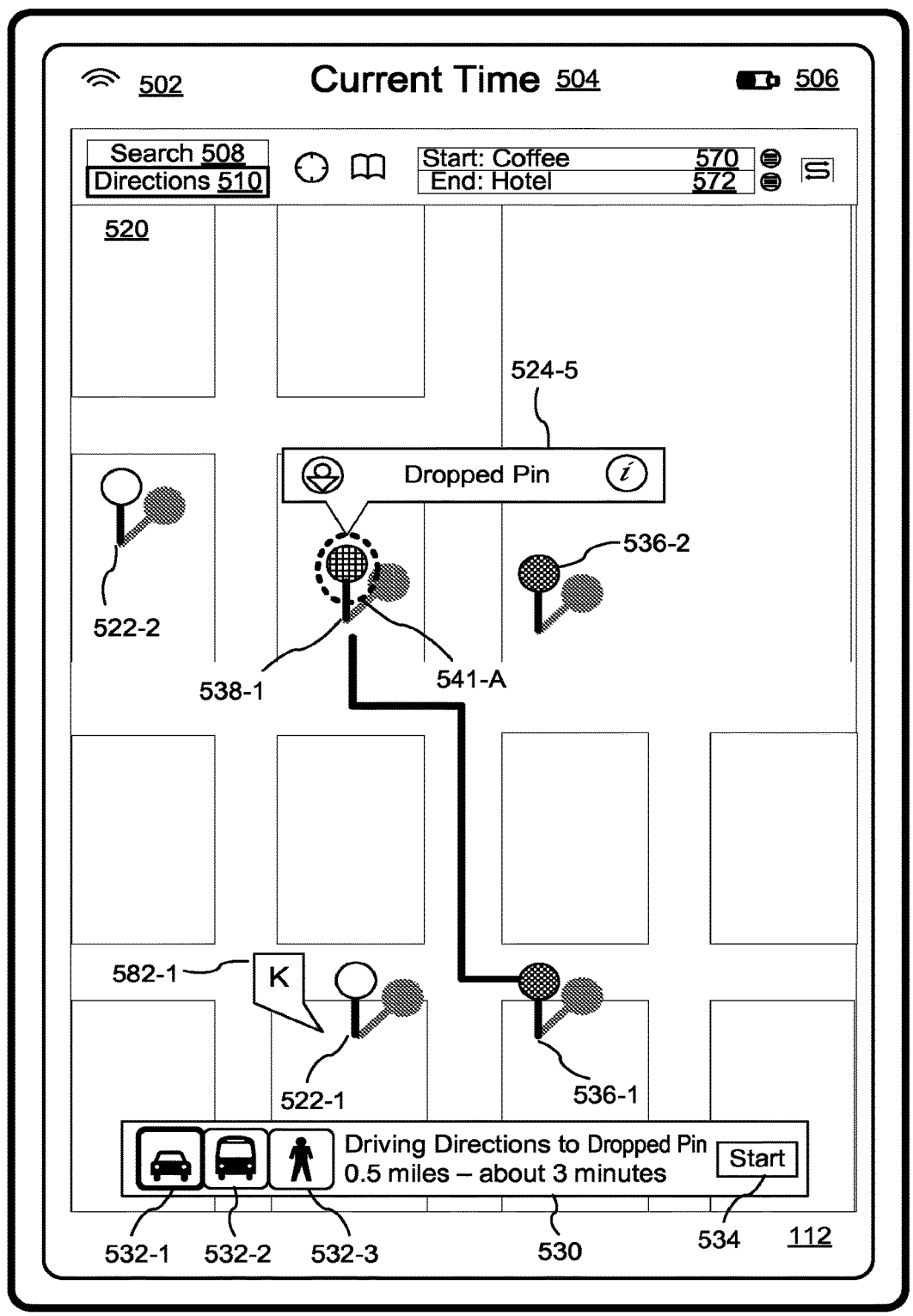
Figure 5F:
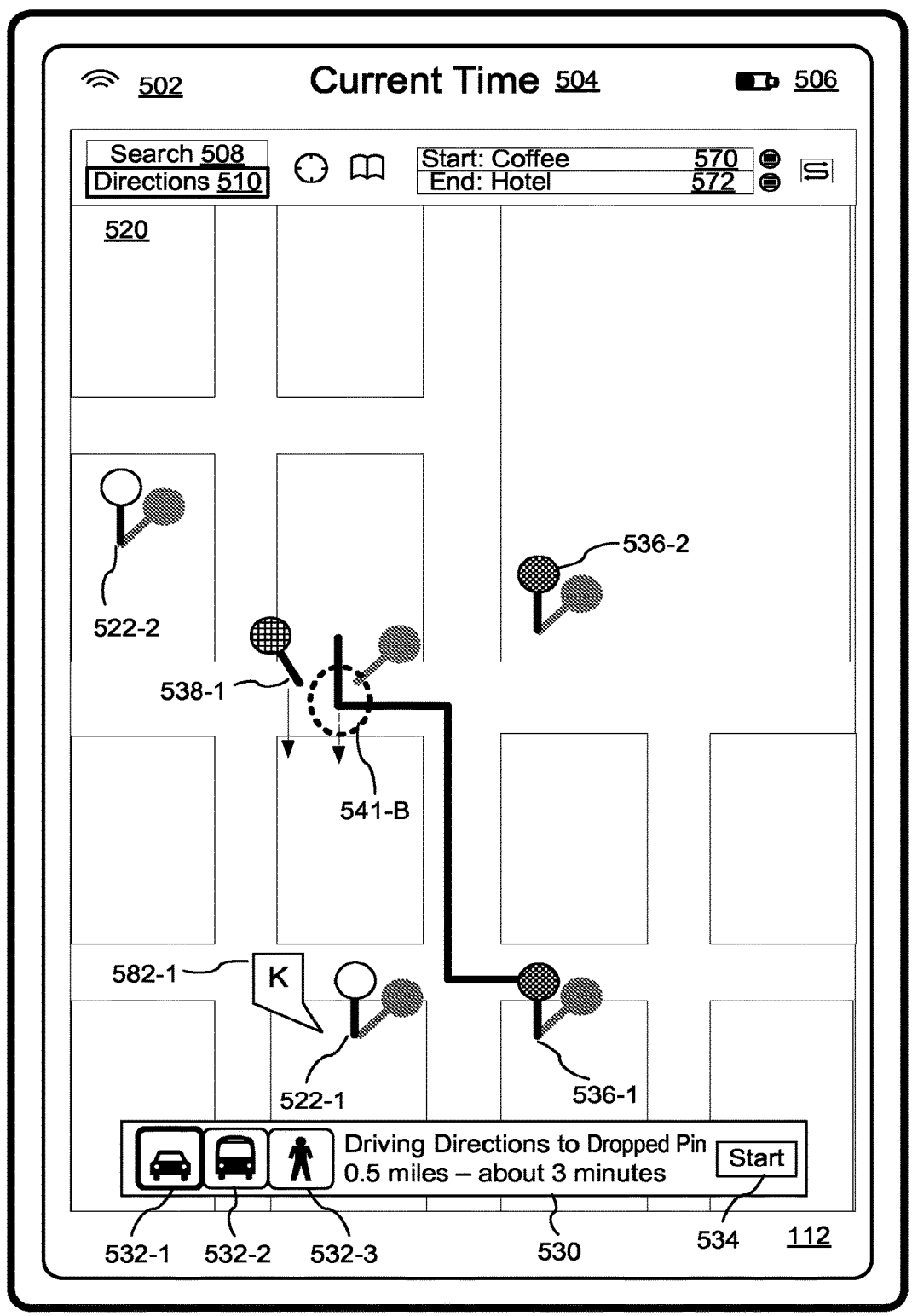
Figure 5G:
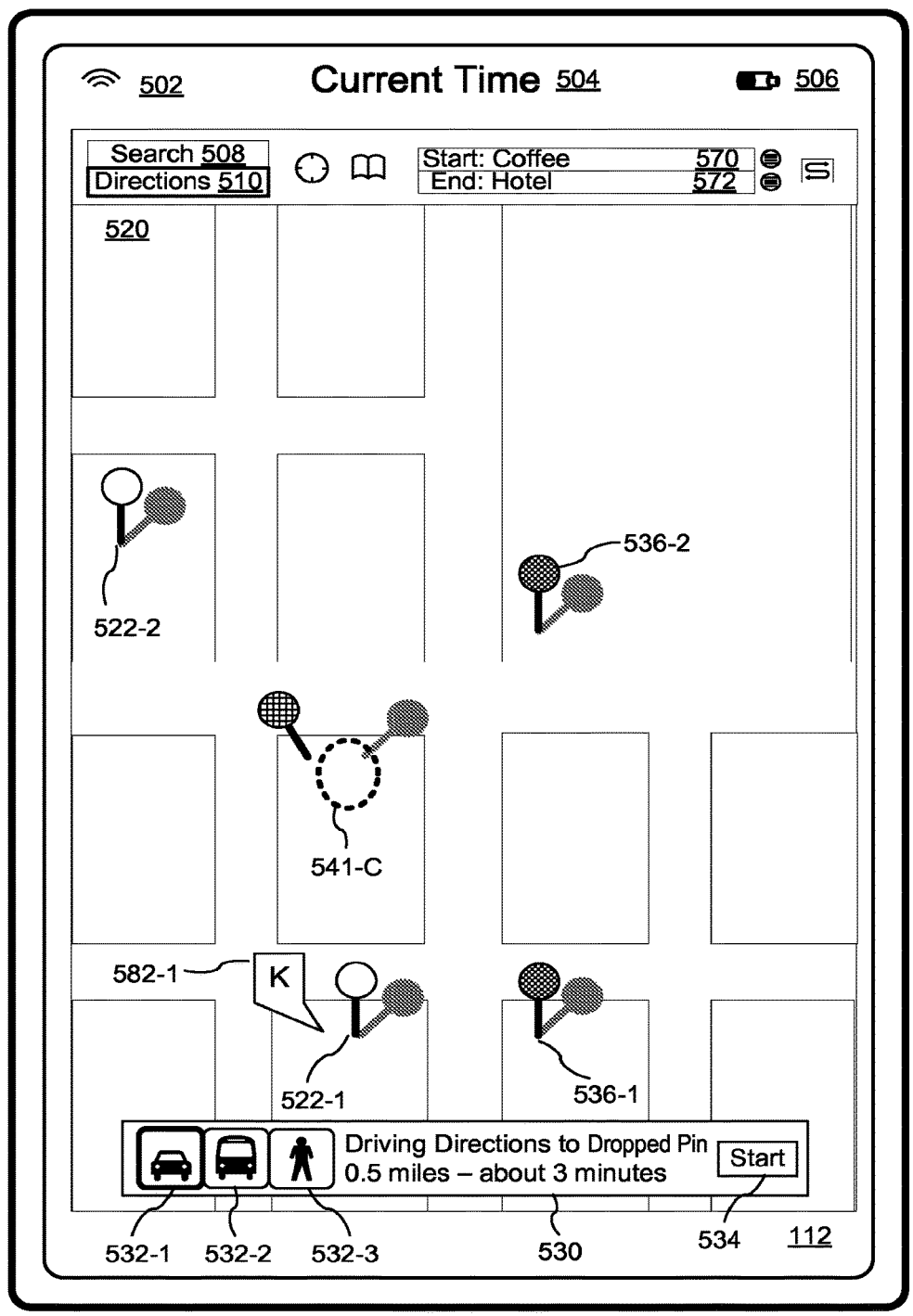
Figure 5H:
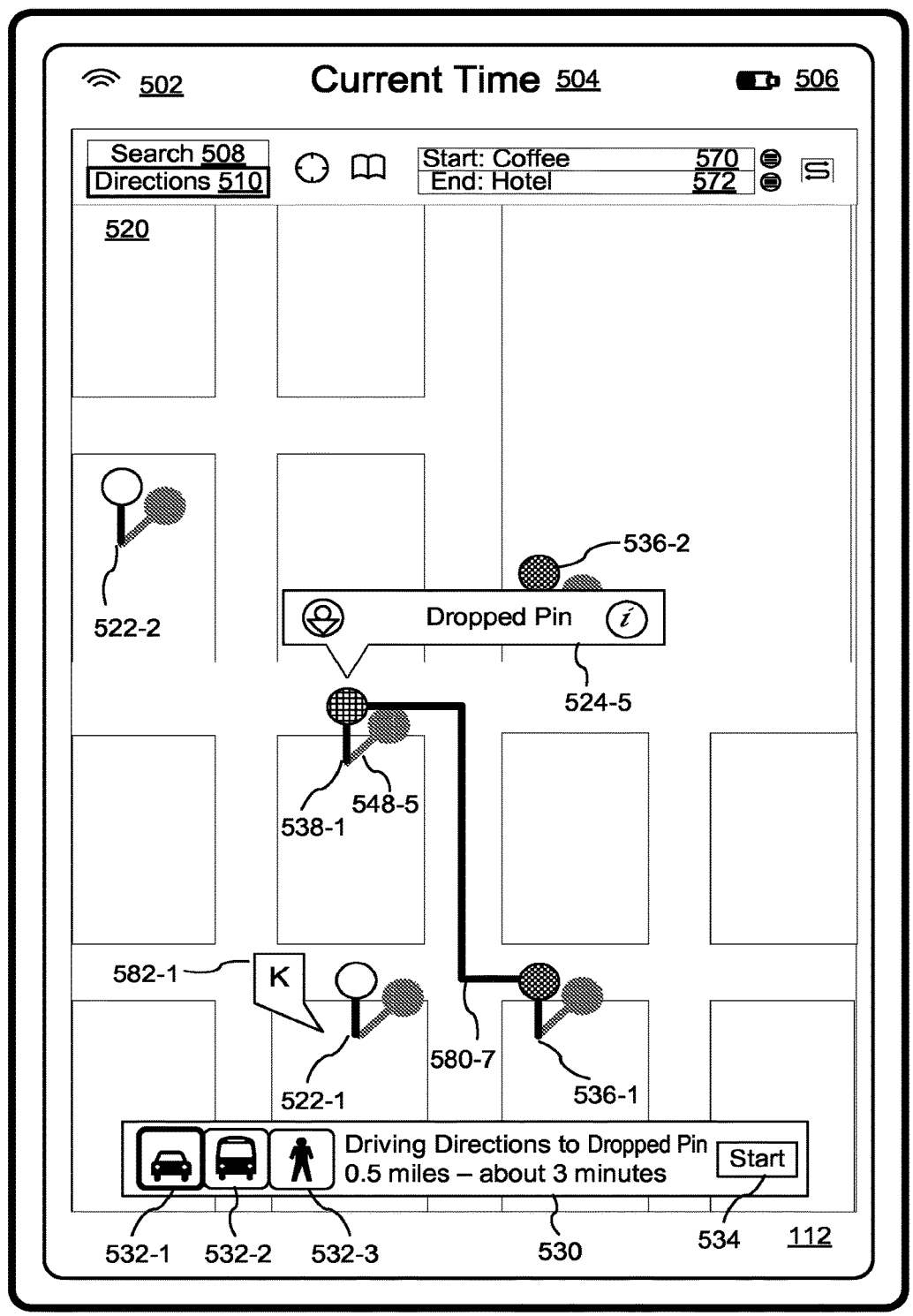
Figure 5I:
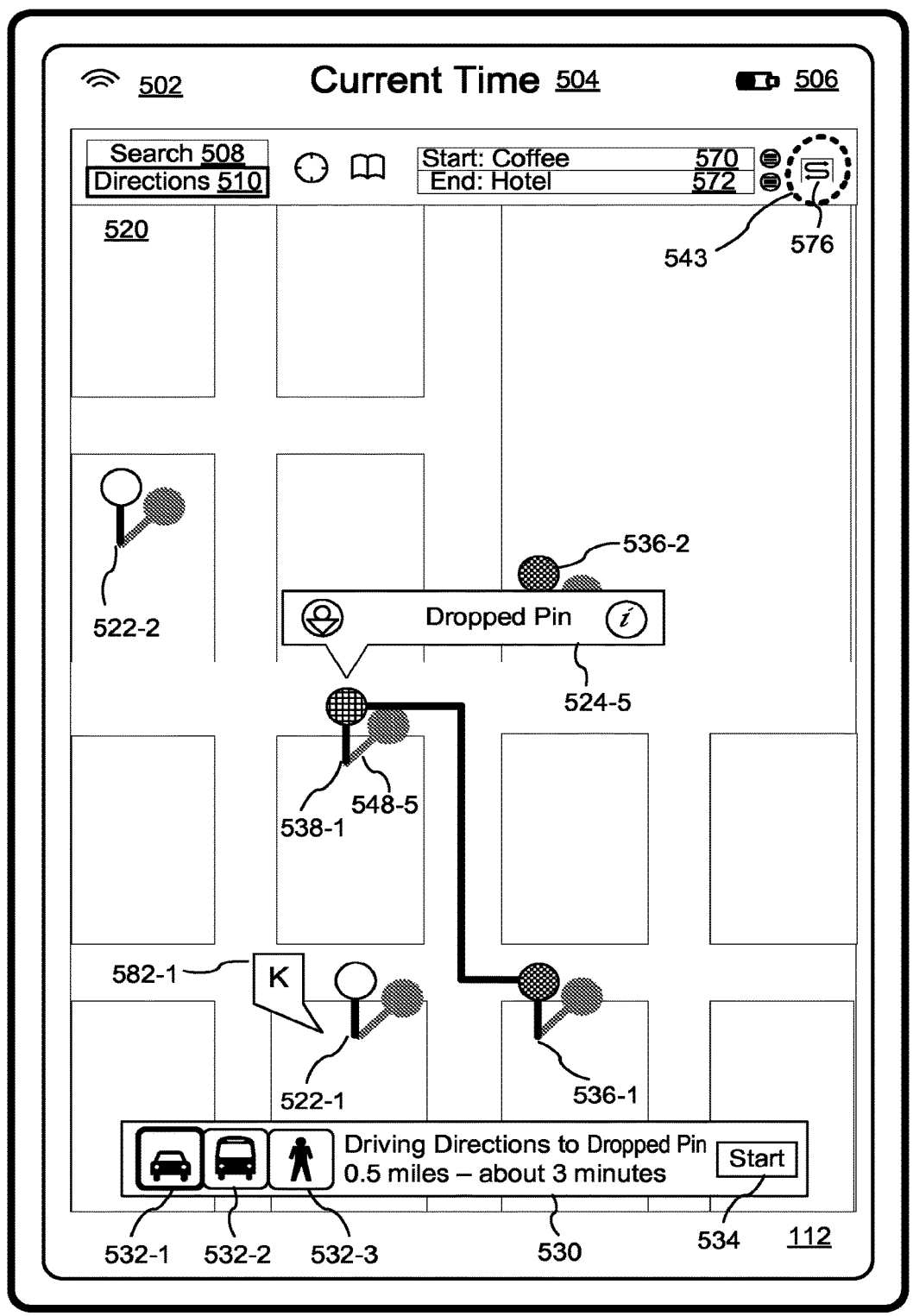
Figure 5J:
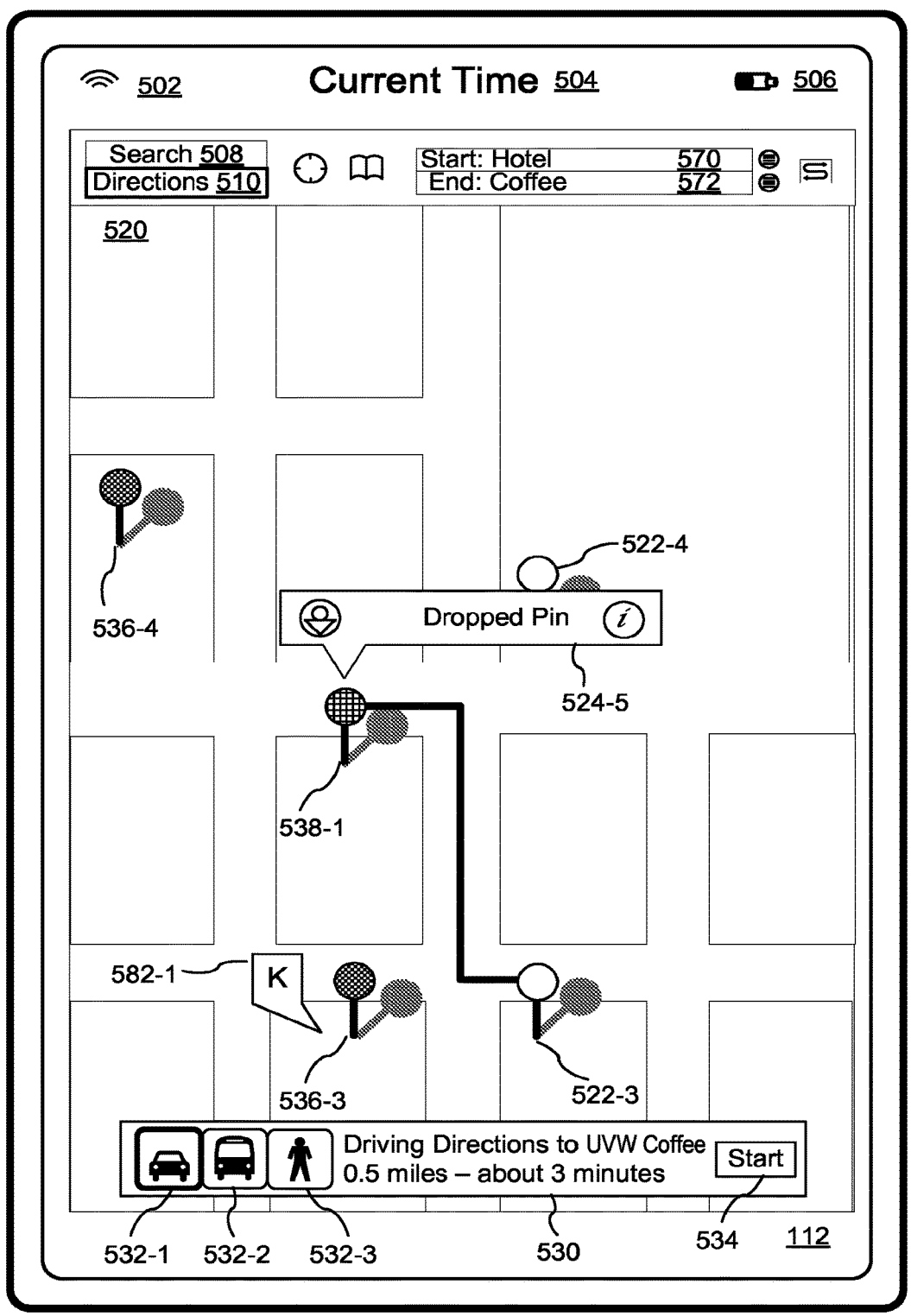
Figure 5K:
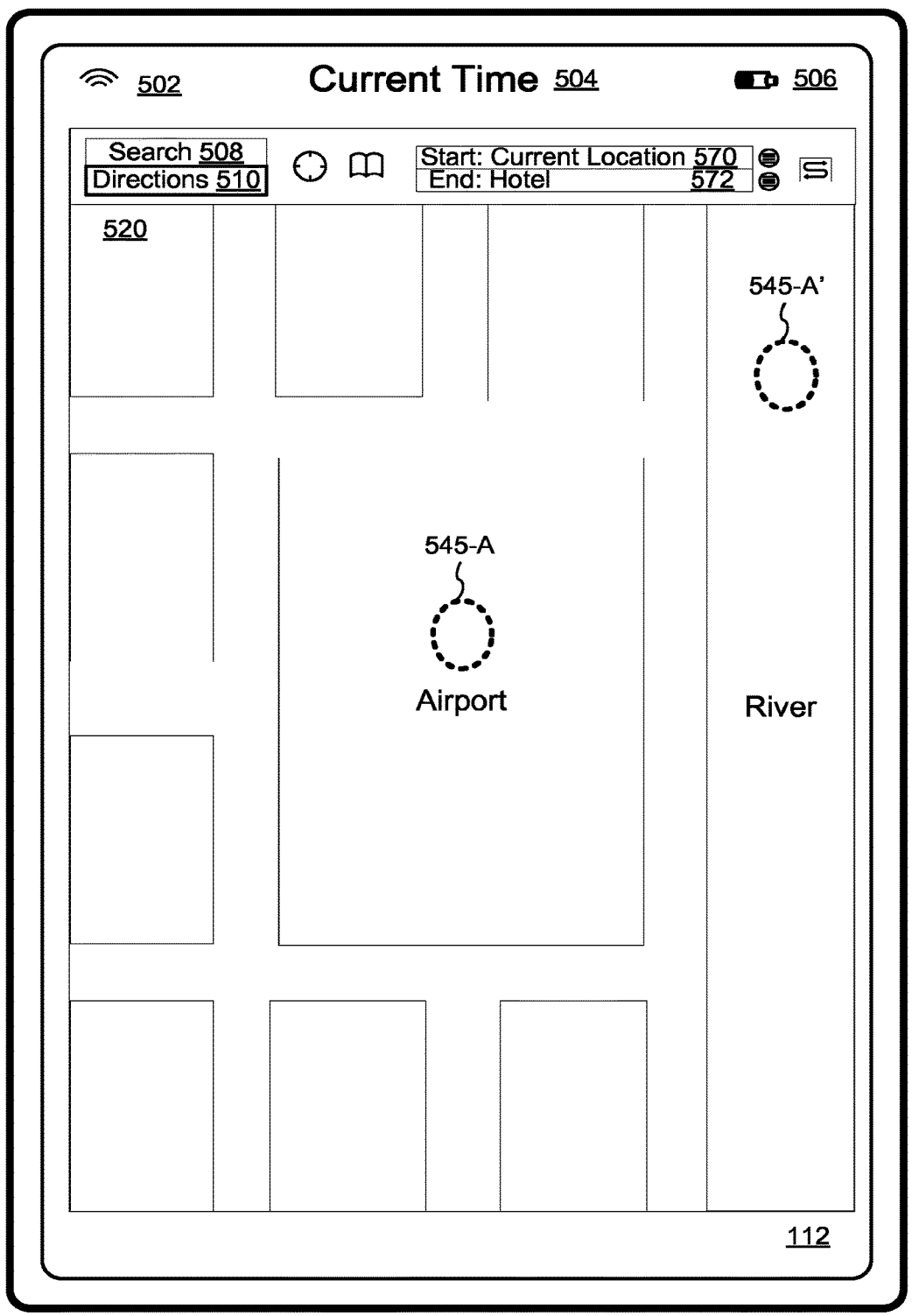
Figure 5L:
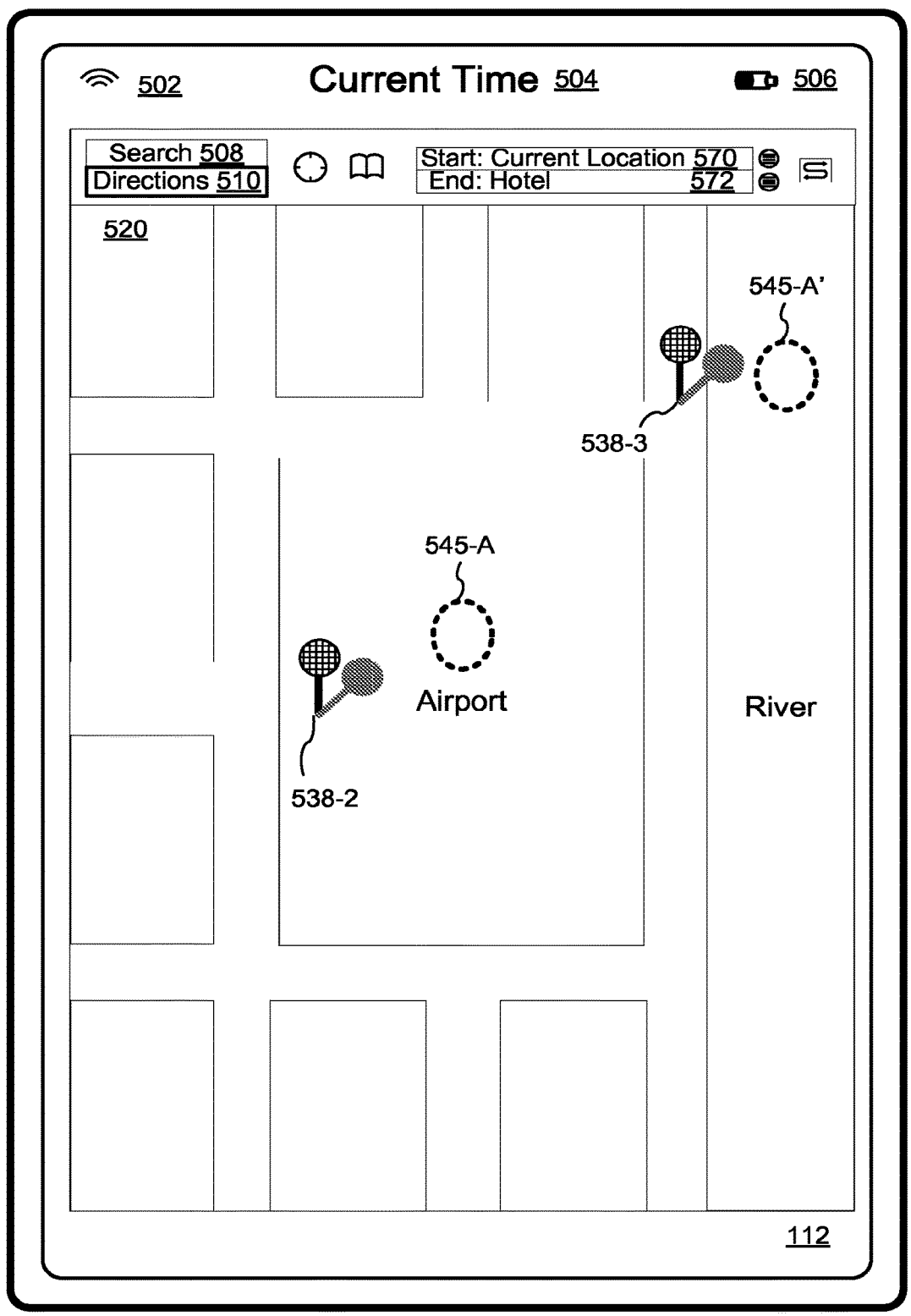
Figure 5M:
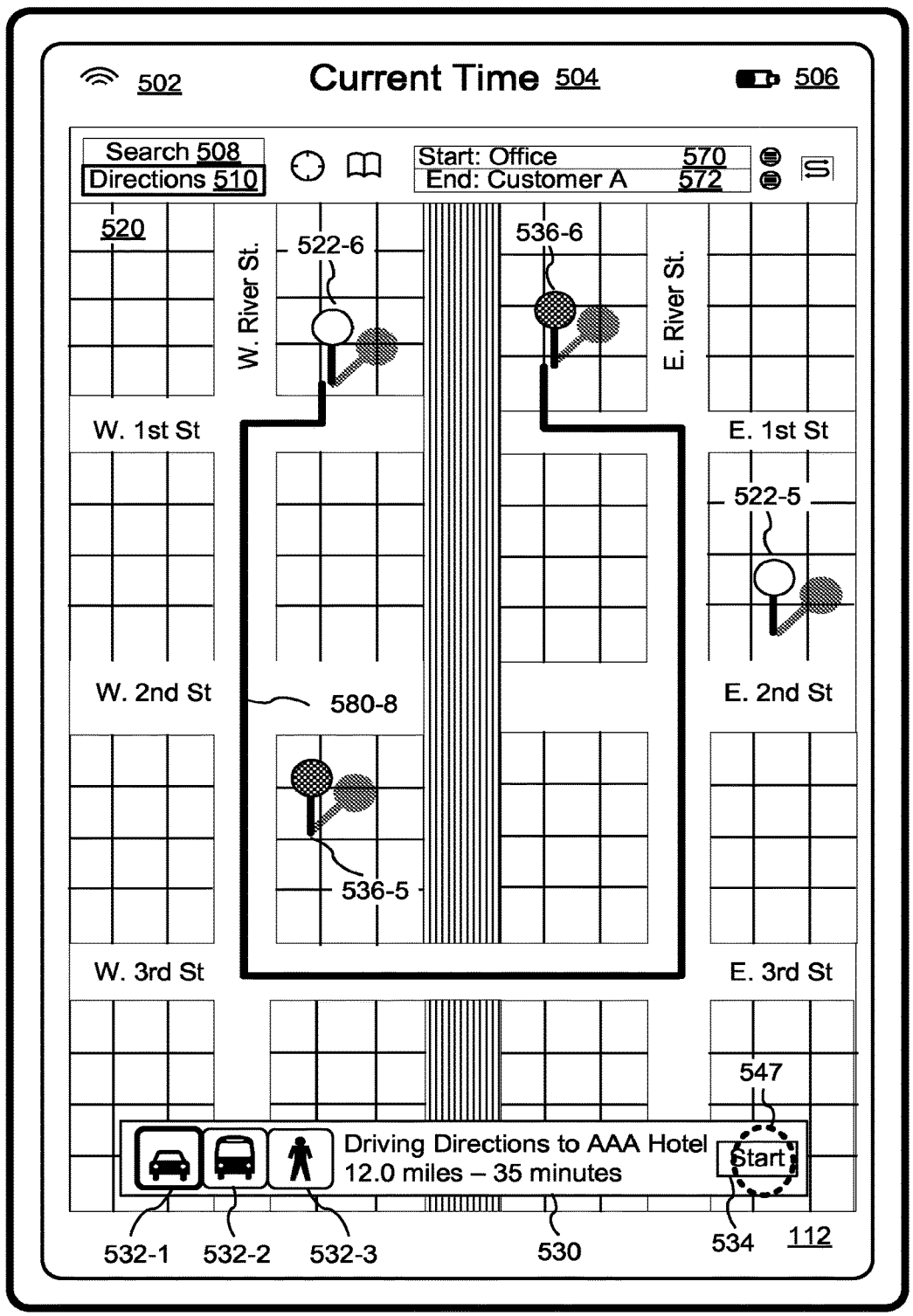
Figure 5N:
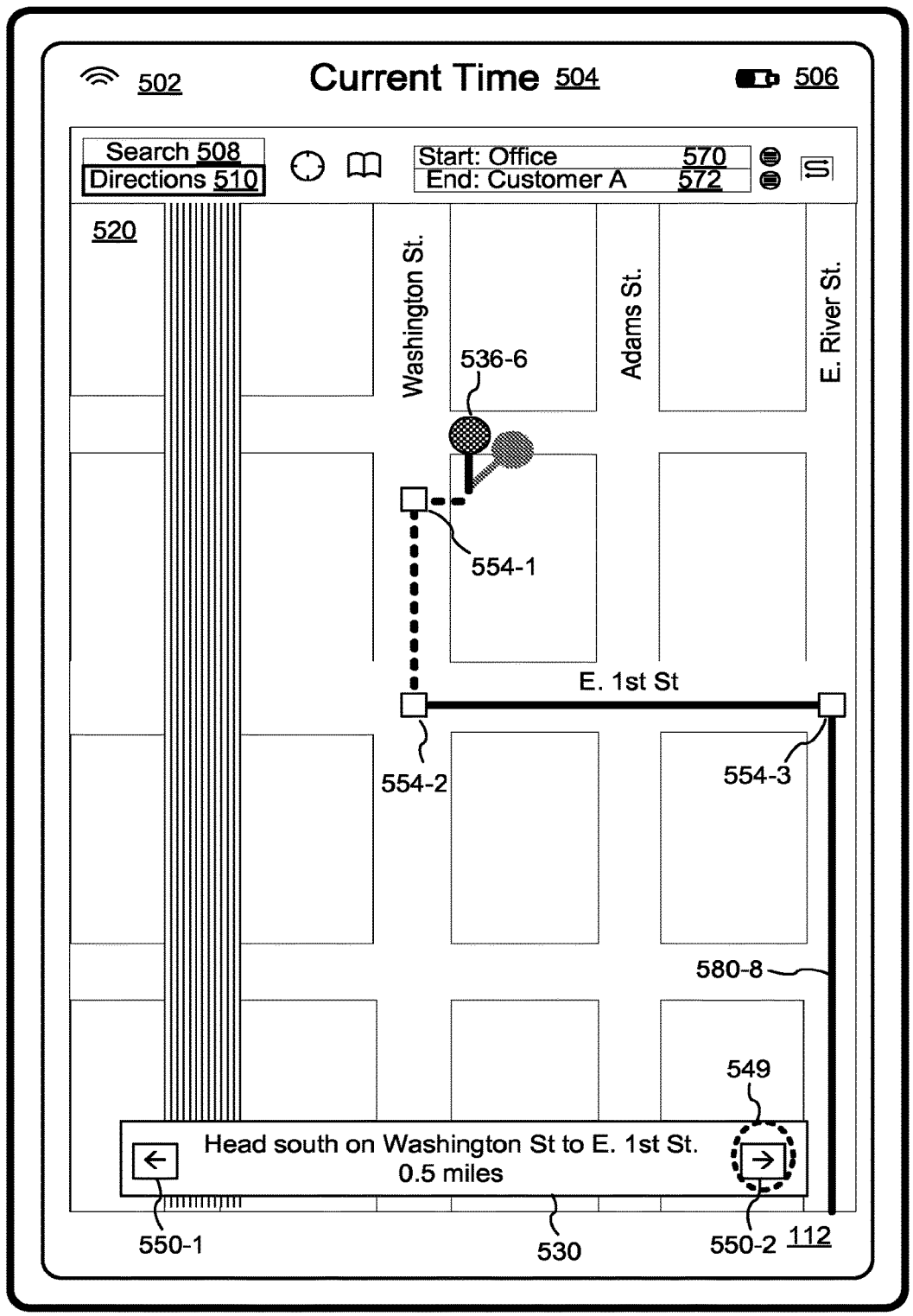
Figure 5O:
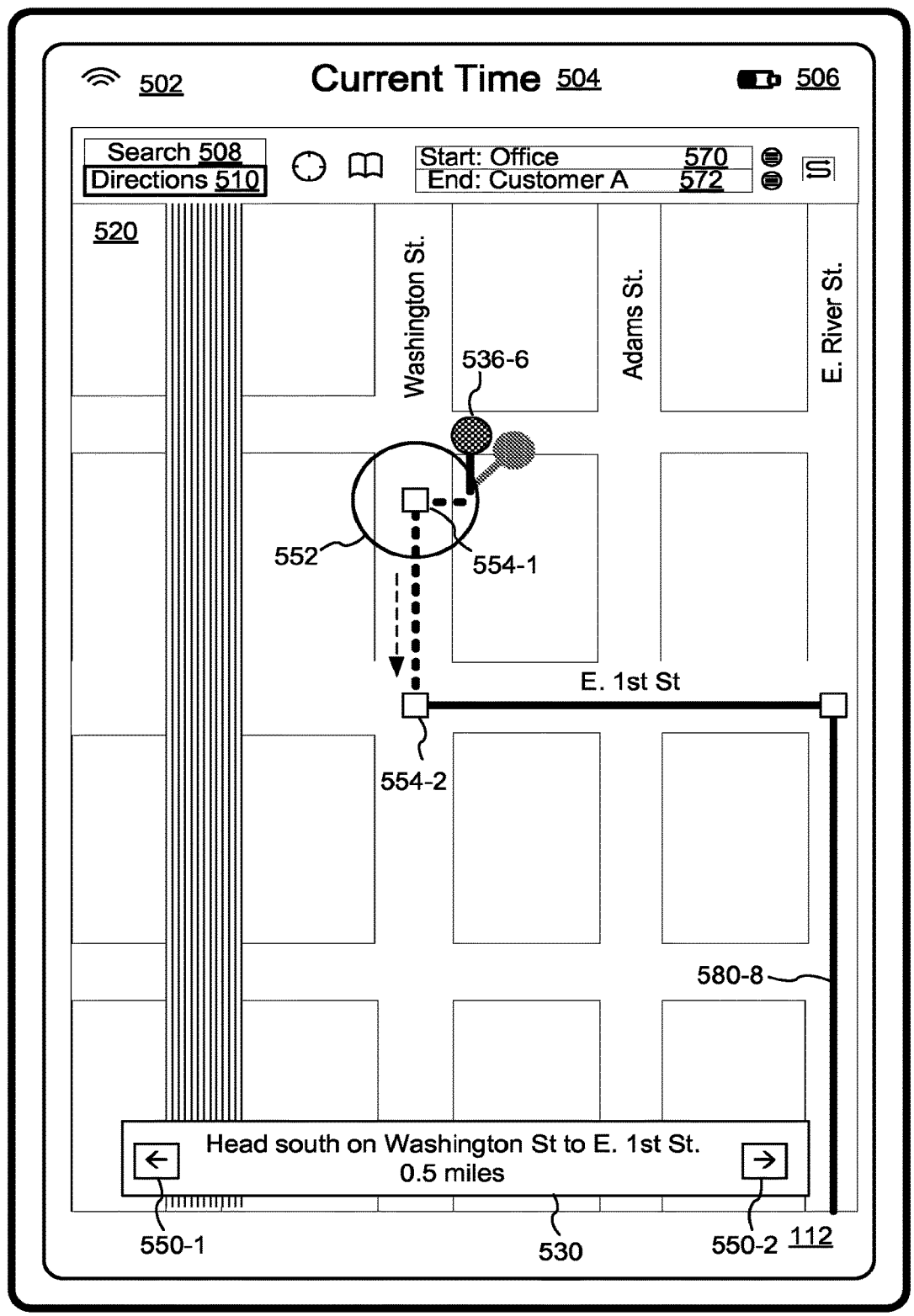
Figure 5P:
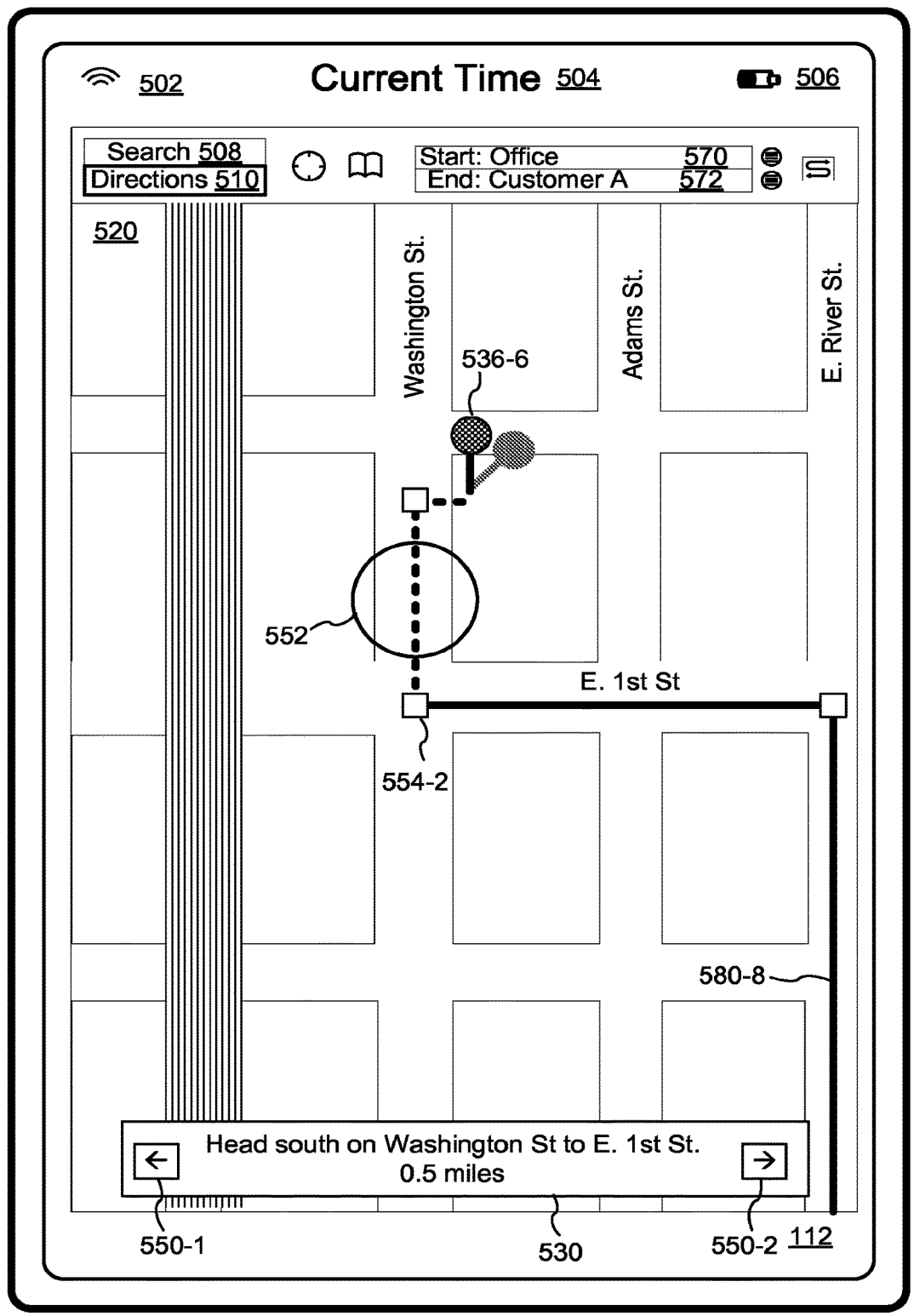
Figure 5Q:
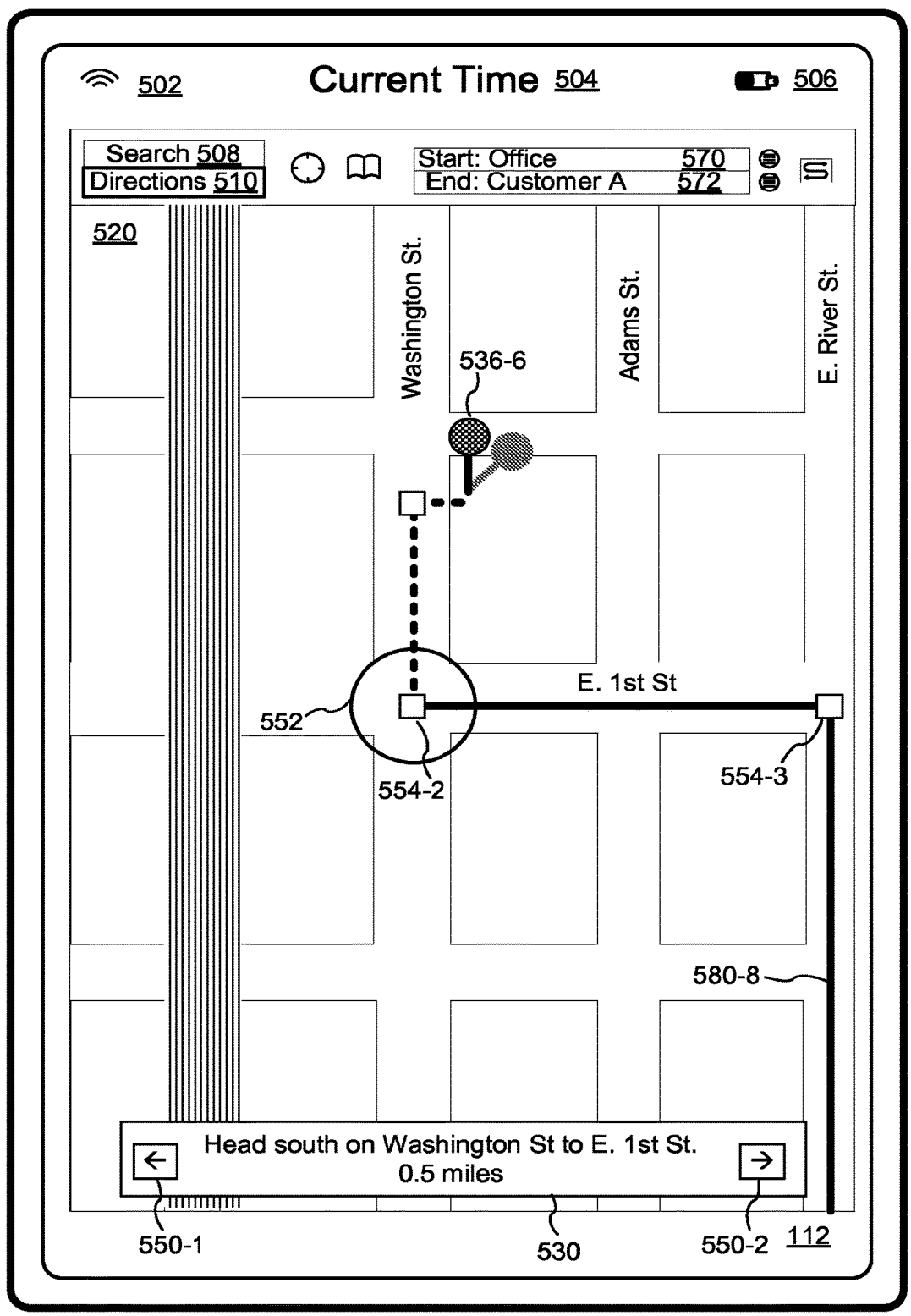
Figure 5R:
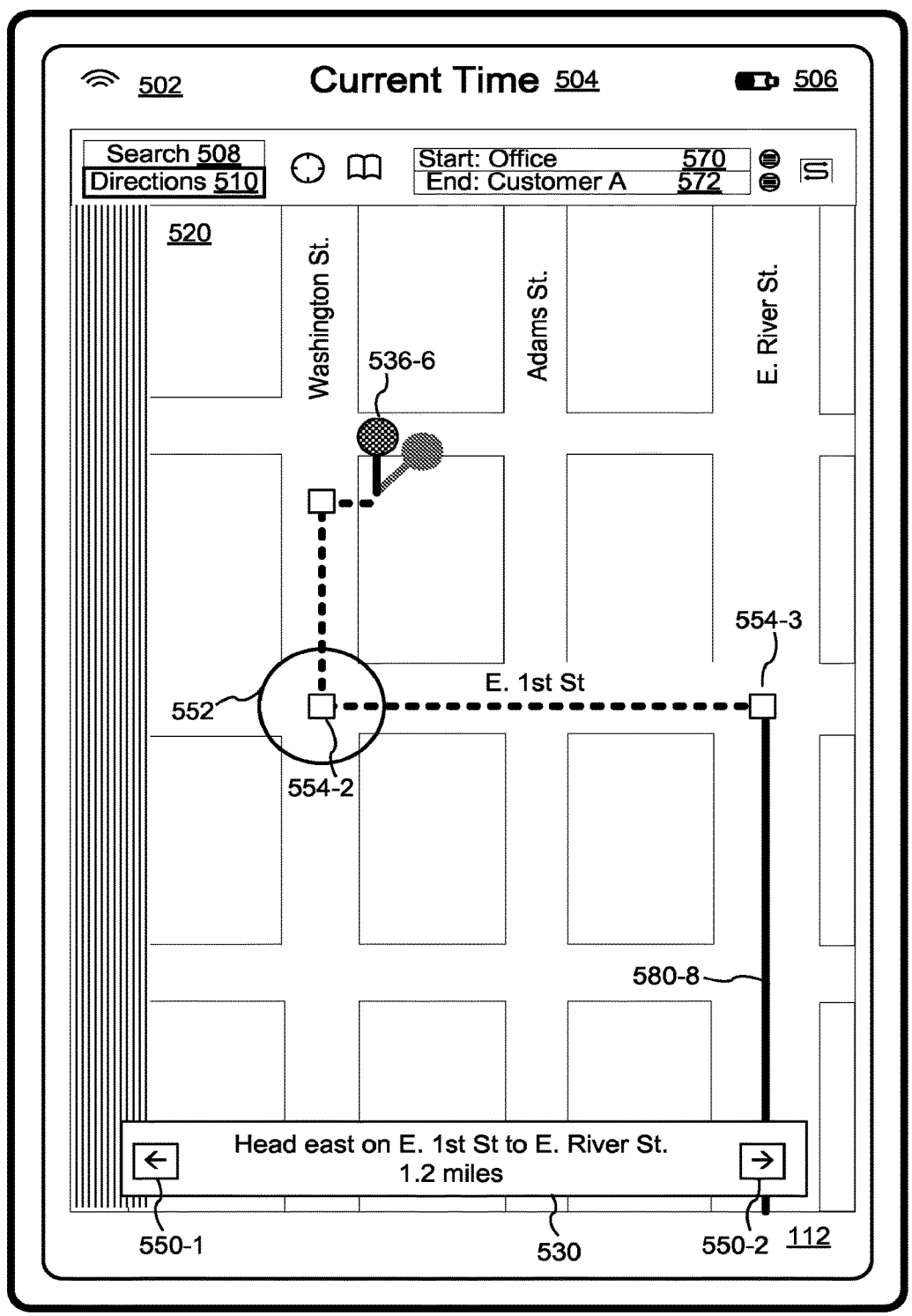
Figure 5S:
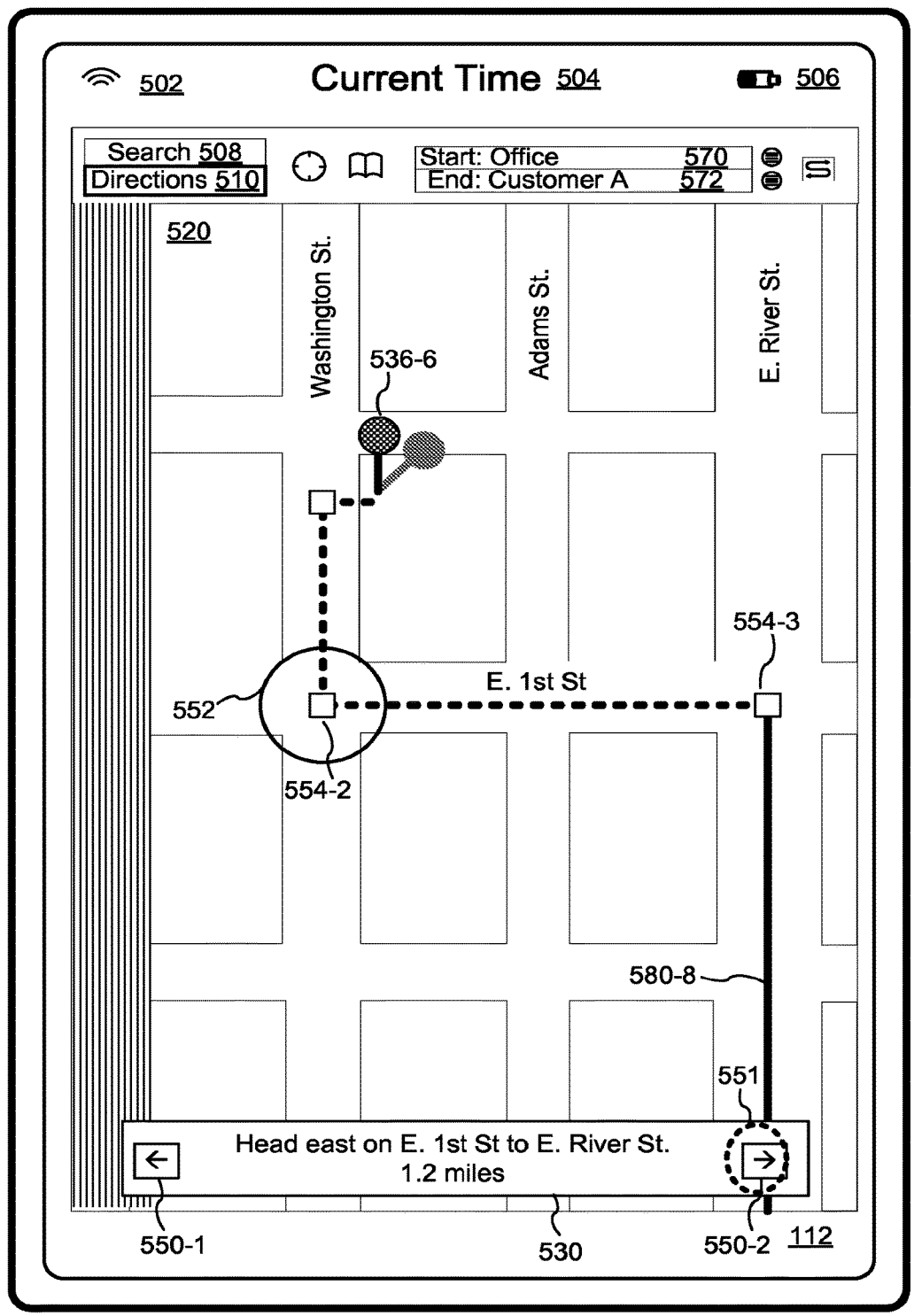
Figure 5T:
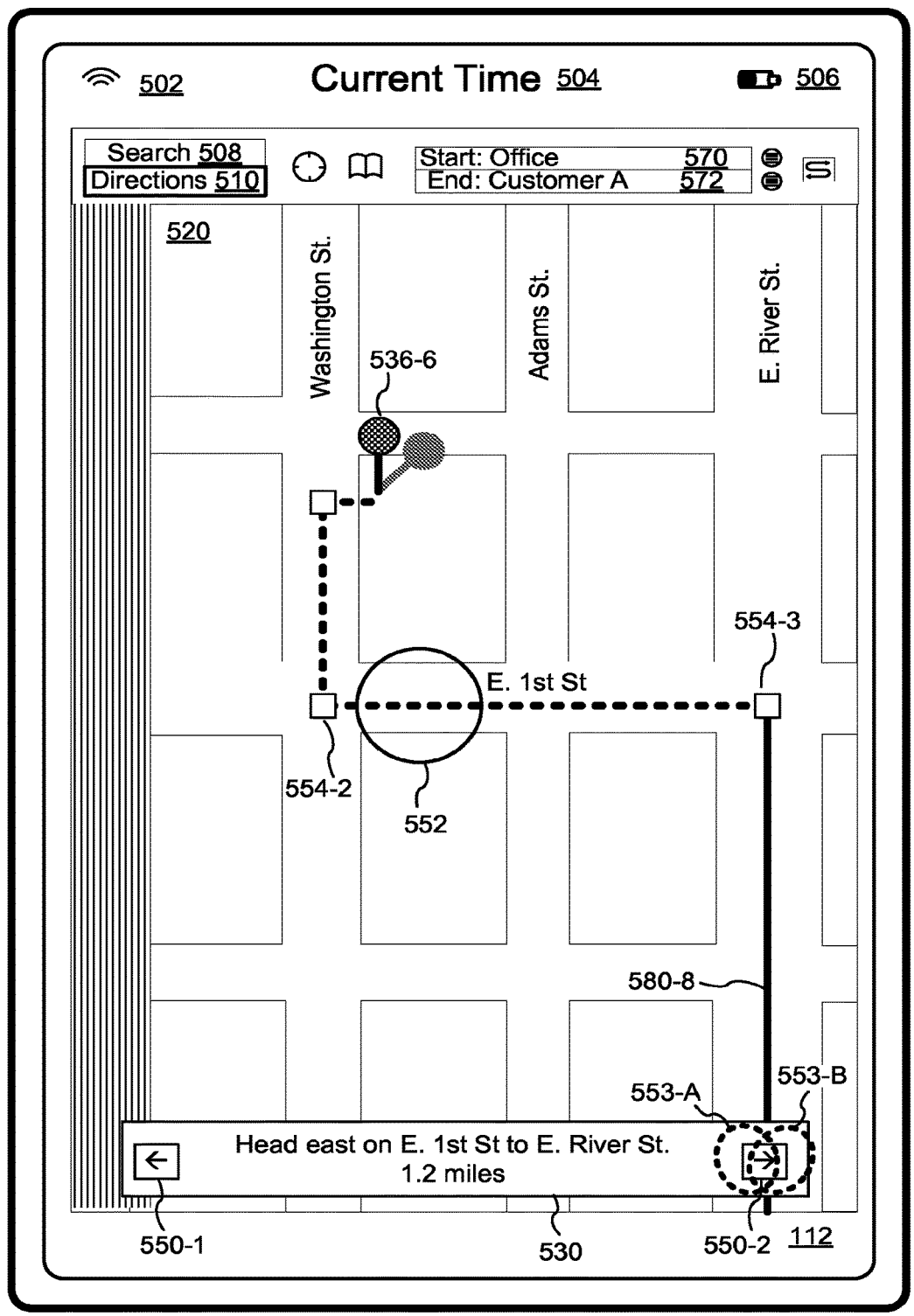
Figure 5U:
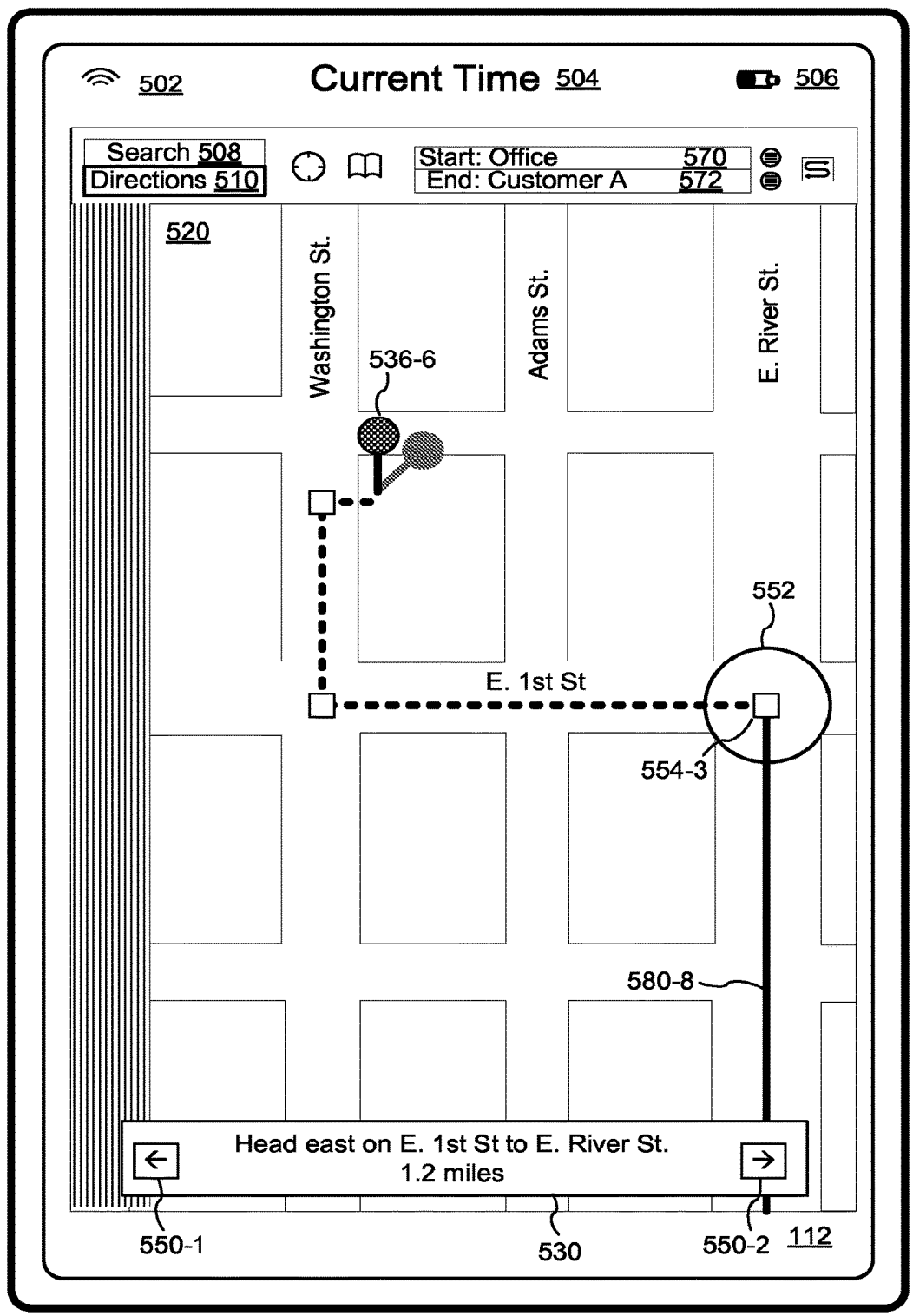
Figure 5V:
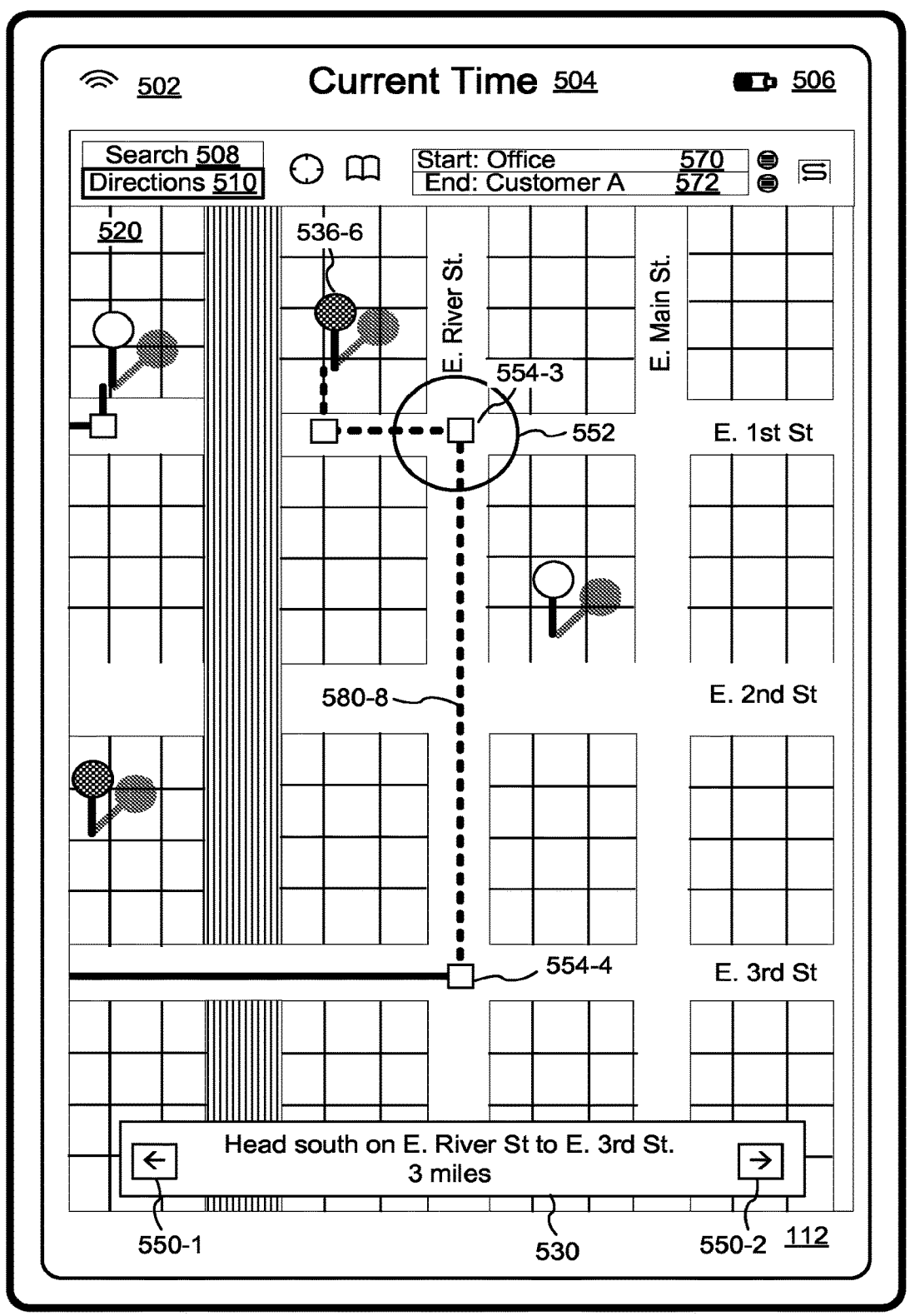
Figure 5W:
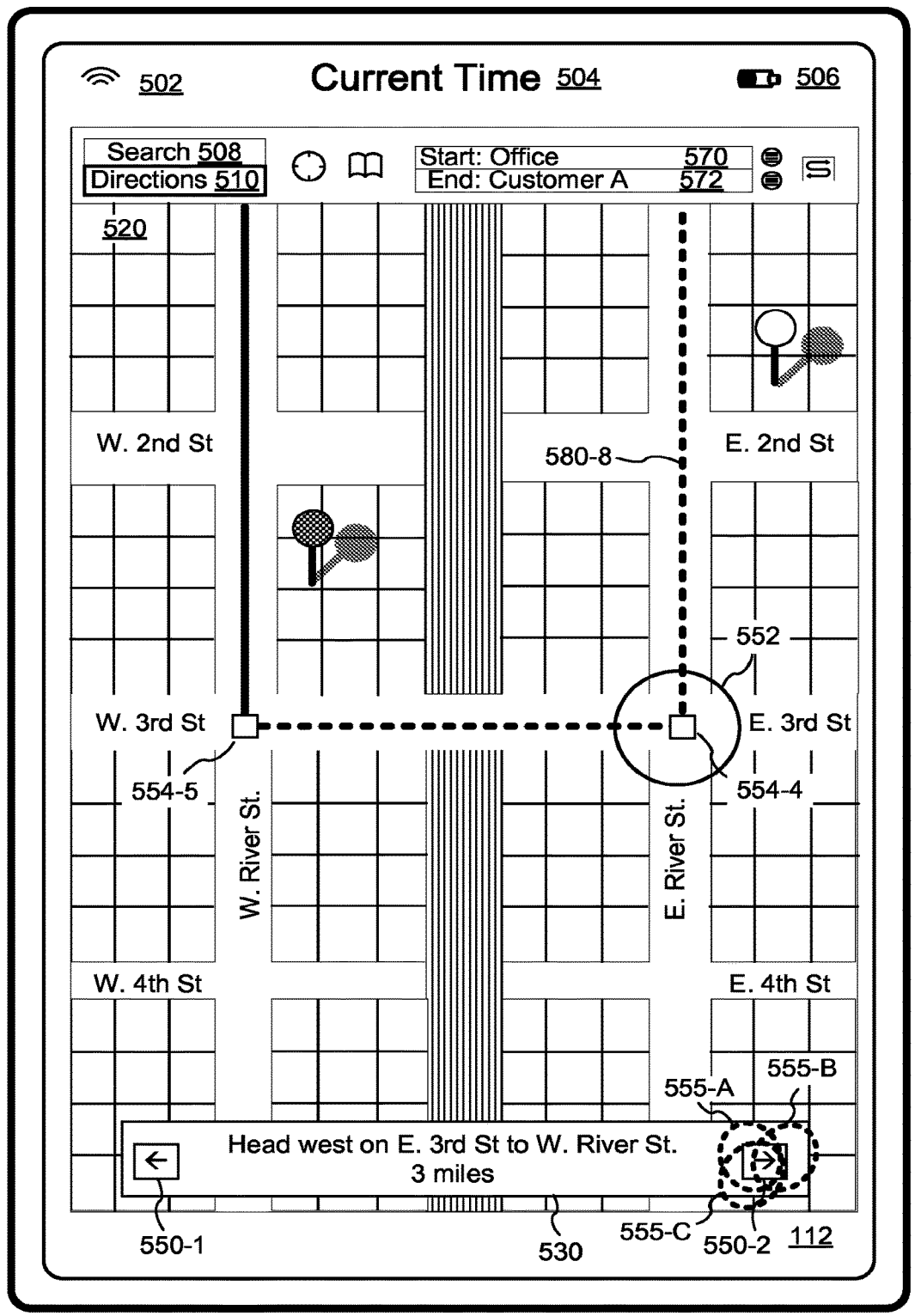
Figure 5X:
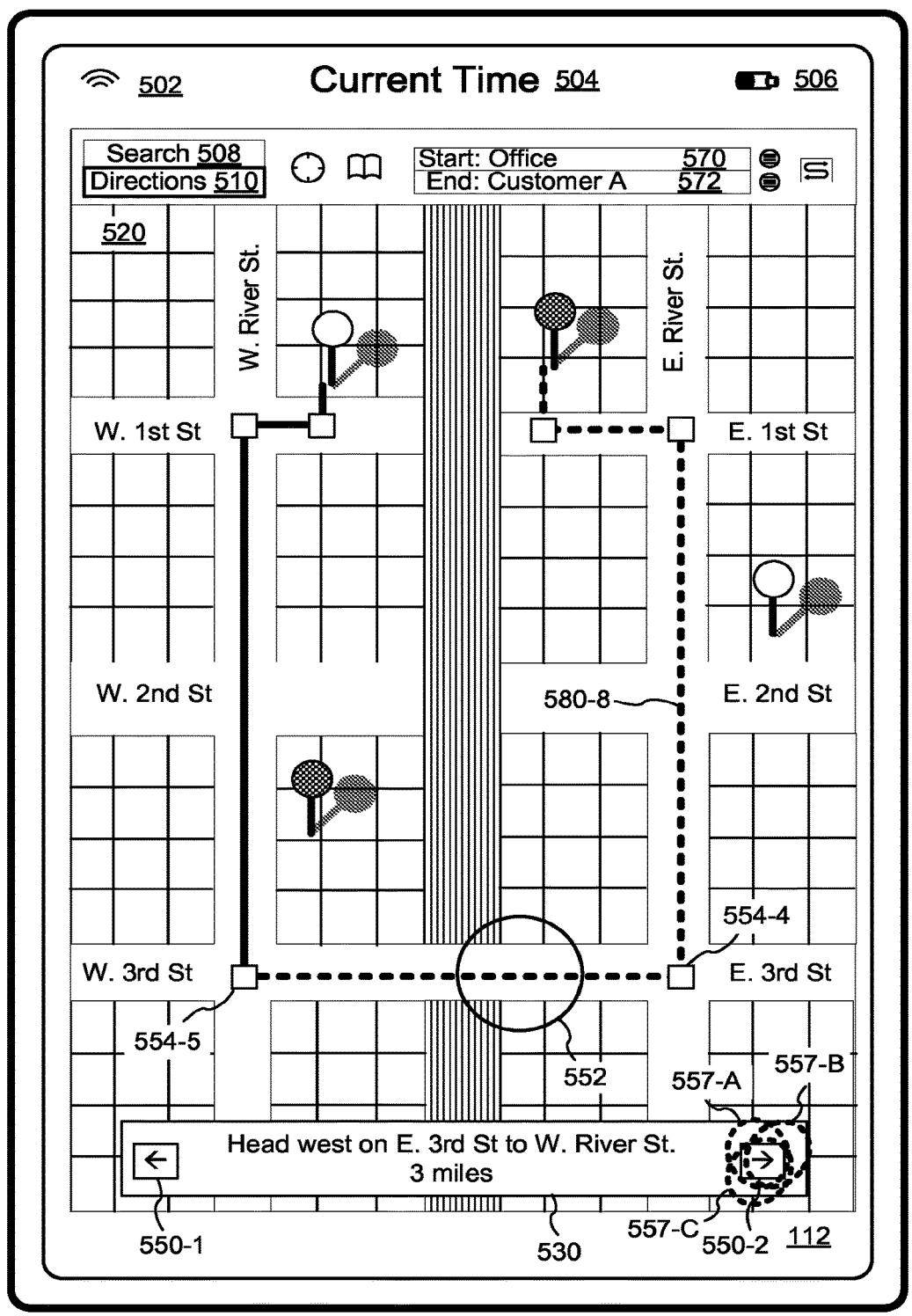
Figure 5Y:
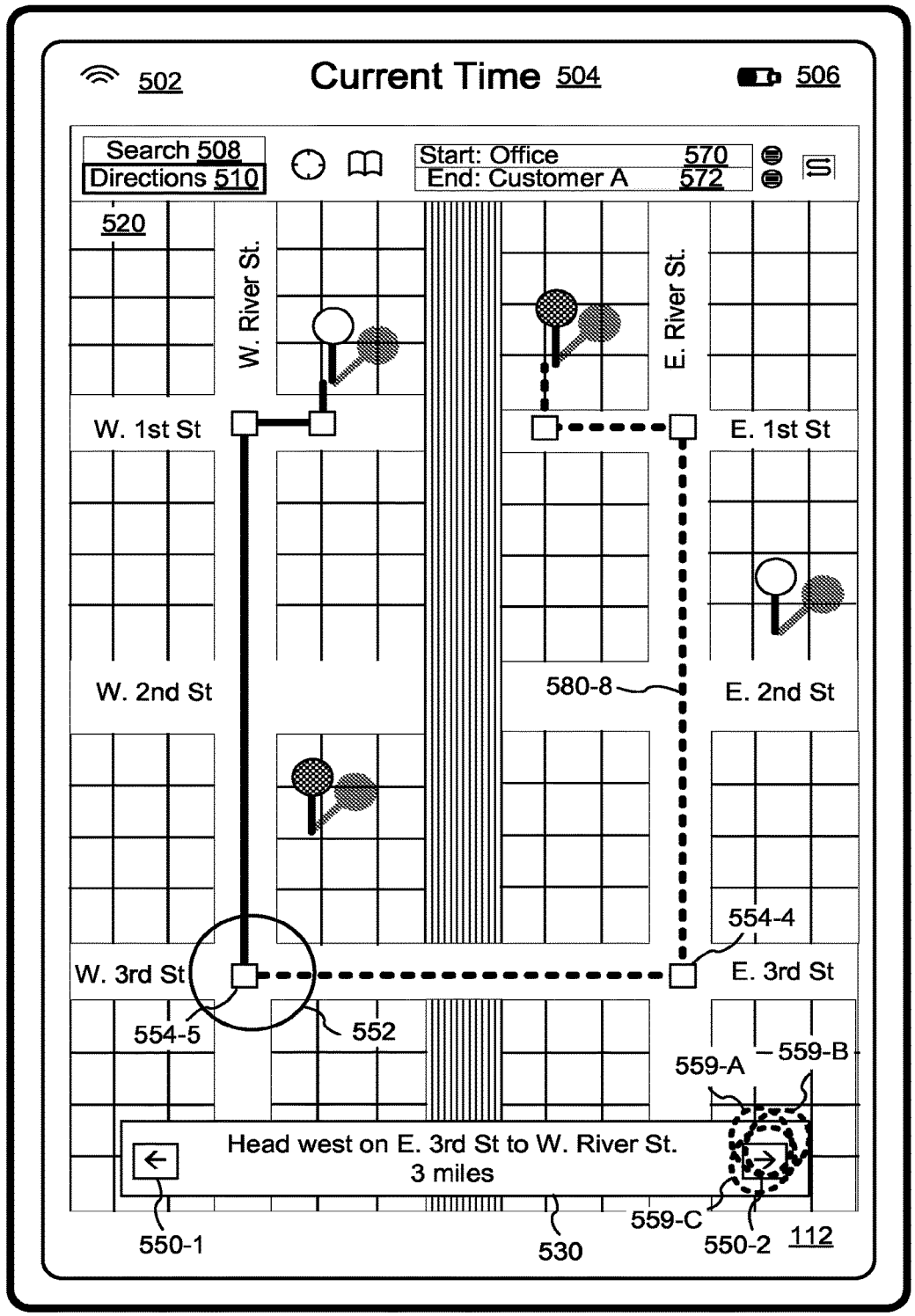
Figure 5Z:
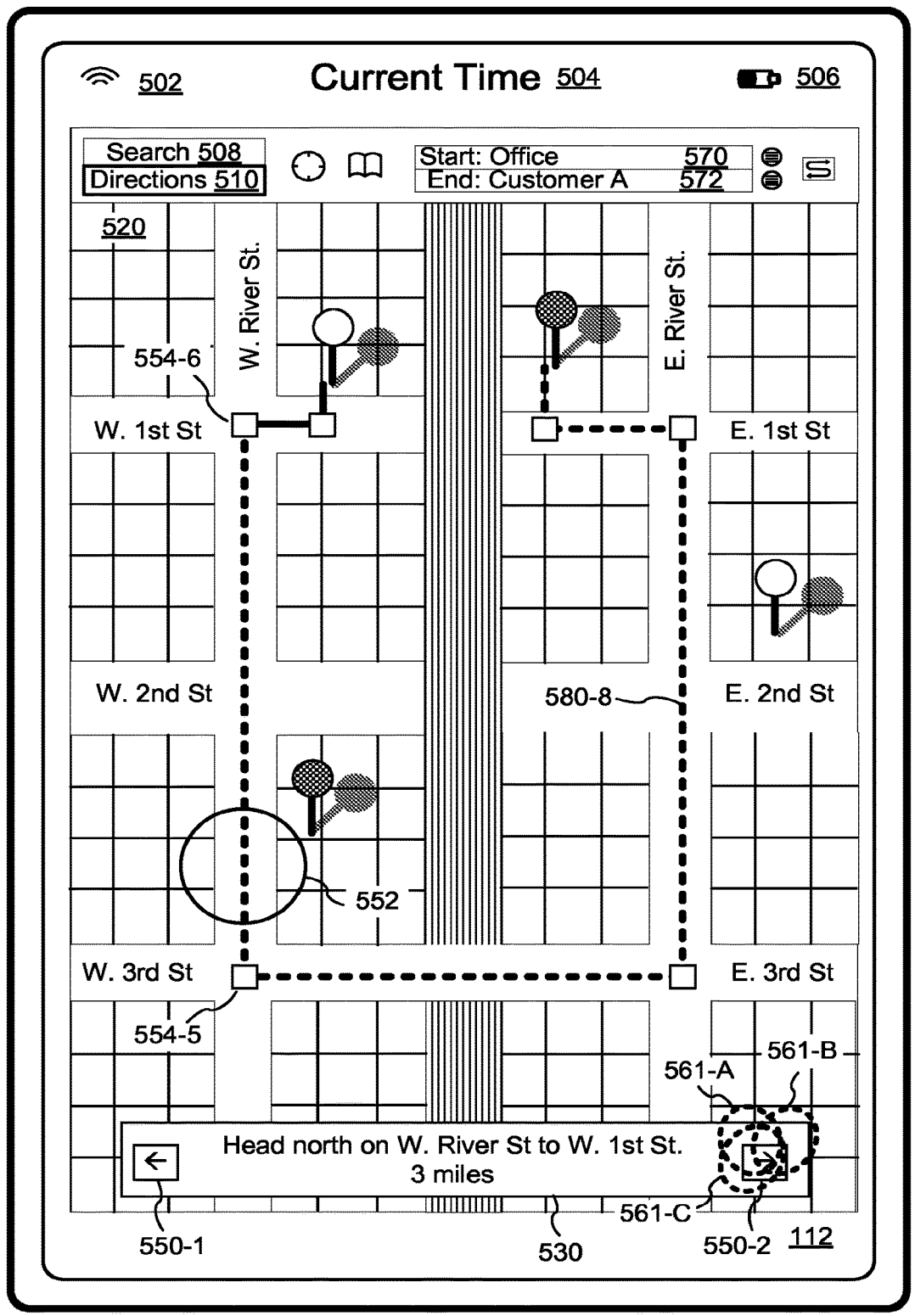

FIG. 5Z illustrates detection of contact 537 at a location on touch screen 112 that corresponds to ending point search result pin 522-1, thereby selecting ending point search result pin 522-1. In response, the map application ceases to display route 580-4, and instead displays route 580-5 from starting point search result pin 536-1 to ending point search result pin 522-1, as shown in FIG. 5AA In FIG. 5BB, contact 539 is detected at a location on touch screen 112 for a period longer than a predefined duration. In some embodiments, the predefined duration is a fixed length of time between 0.2 and 2 seconds (e.g., 1 second). In response, the map application adds a user-moveable marker, herein called a "dropped pin," to the map 520, as shown in FIGS. 5CC-5DD.

FIGS. 5CC-5DD illustrate an animation of displaying the user-movable location marker (dropped pin 538-1) being added to map 520. Dropped pin 538-1, pin shadow 548-5, and callout 524-5 appear as described above. In addition, the map application ceases to display route 580-5, and instead displays route 580-6 from starting point search result pin 536-1 to dropped pin 538-1, as shown in FIG. 5DD. Dropped pin 538-1 is visually distinguished from starting point search result pins 522 and ending point search result pins 536 by having different colors, patterns or shading. In some embodiments, pin shadow 548-5 for dropped pin 538-1 is visually distinguished from pin shadows for starting point search result pins and ending point search result pins. In FIG. 5DD, the "End" field 572 has not been updated with the location of the dropped pin, but in some embodiments a reverse lookup may be used to determine the address of the location of the dropped pin, and the address may be automatically entered in either the start or end field, as appropriate.

FIGS. 5EE-5HH illustrate an animation of moving dropped pin 538-1 in accordance with user-controlled movement of contact 541. In FIG. 5EE, contact 541-A is detected at a location on touch screen 112 corresponding to dropped pin 538-1. As contact 541 moves, dropped pin 538-1 appears unplugged (FIG. 5FF), follows contact 541 (FIG. 5GG), and drops (FIG. 5HH) to a location corresponding to the location of a last contact (541-C in FIG. 5GG). In some embodiments, the appearance of the dropped pin may not change while it is being manipulated or moved on the map. In addition, route 580-7 from a starting point search result pin 536-1 to a new location of dropped pin 538-1 is displayed.

In FIG. 5II, contact 543 is detected at a location on touch screen 112 corresponding to reverse-route icon 576. In response, the starting points and the ending points are switched, as described above and shown in FIG. 5JJ. Directions popup view 530 displays information about a route from dropped pin 538-1 to ending point search result pin 522-3.

FIGS. 5KK and 5LL illustrate a snapping process in the mapping application. In FIG. 5KK, contact 545 is detected, for a period longer than the predefined duration, at a location on touch screen 112 corresponding to a physical location to which an ordinary vehicle or an ordinary person cannot travel (e.g., a body of water such as an ocean, lake, or river, or a forested or mountainous area without roads). For example, contact 545-A is detected at a location corresponding to the middle of an airport (e.g., a runway). Similarly, contact 545-A' is detected at a location corresponding to a location in the middle of a river channel. Airport runways and river channels are not areas to which an ordinary vehicle or an ordinary person travels. FIG. 5LL illustrates that dropped pins 538-2 and 538-3 are deposited at locations corresponding to physical locations to which an ordinary vehicle or an ordinary person can travel (e.g., via public roads), adjacent to contacts 545-A and 545-A'. In some embodiments, when contact 545 is detected at an inaccessible location, the dropped pin is placed at an intersection, street, airport terminal, park, beach, or other publicly accessible point closest to contact 545.

FIG. 5MM-5EEE illustrate exemplary user interfaces for displaying portions of a route in accordance with some embodiments.

FIG. 5MM depicts an exemplary map application user interface displaying map 520 on touch screen 112. The user interface may include the following elements, or a subset or superset thereof:

starting point search result pins 536-5 and 536-6, as described above;

ending point search result pins 522-5 and 522-6, as described above;

directions popup view 530, as described above; and start directions icon 534, as described above.

FIG. 5MM illustrates route 580-8 from starting point search result pin 536-6 to ending point search result pin 522-6. FIG. 5MM also illustrates that contact 547 is detected at a location on touch screen 112 that corresponds to start directions icon 534. In response to contact 547, the map application displays portions of route 580-8 are displayed on map 520, as shown in FIG. 5NN. In addition, the map application displays waypoints 554-1, 554-2, and 554-3 on map 520. FIG. 5NN illustrates that directions popup view 530 displays a portion of the route from a current waypoint (e.g., 554-1) to a next waypoint (e.g., 554-2). Waypoints are points on the route. In some embodiments, waypoints are points on the route where the direction of travel changes or where the route transitions from one roadway or sub-route to another roadway or sub-route. Optionally, as shown in FIG. 5NN, directions popup view 530 includes:

previous step icon 550-1 that when activated (e.g., by a finger tap on the icon, or by a voice command) initiates the display of a previous portion of the route; and next step icon 550-2 that when activated (e.g., by a finger tap on the icon, or by a voice command) initiates the display of a next portion of the route.

FIG. 5NN also illustrates detection of contact 549 at a location on touch screen 112 that corresponds to next step icon 550-2. In some embodiments, the map application responds to contact 549 at a location on touch screen 112 that corresponds to next step icon 550-2 by displaying an animation that moves from a current waypoint (e.g., 554-1) to the next waypoint (e.g., 554-2), as shown in FIGS. 500-5RR. In FIGS. 500-5RR, location indicator 552 is used to indicate advancement from the current waypoint to the next waypoint.

In FIG. 5RR, the next portion of the route (e.g., a portion of route from waypoint 554-2 to waypoint 554-3) is displayed. In some embodiments, displaying the next portion of the route includes visually distinguishing the next portion of the route from a remainder of the untraveled route. In this example, the next portion of the route is visually distinguished by having difference color, pattern, and/or line width. FIG. 5RR also illustrates that directions popup view 530 displays directions for the next portion of the route.

In FIG. 5SS, contact 551 is detected at a location on touch screen 112 that corresponds to next step icon 550-2. In some embodiments, in response to contact 551 at a location on touch screen 112 that corresponds to next step icon 550-2, the map application displays an animation of location indicator 552 that moves from waypoint 554-2 to waypoint 554-3, as shown in FIG. 5TT.

In FIG. 5TT, while the animation is displayed, contacts 553-A and 553-B are detected at a location on touch screen 112 that corresponds to next step icon 550-2. In some embodiments, in response to contacts 553-A and 553-B at a location on touch screen 112 that corresponds to next step icon 550-2, the animation of location indicator 552 that moves from waypoint 554-2 to waypoint 554-3 is ceased (or terminated), and location indicator 552 is displayed at waypoint 554-3, as shown in FIG. 5UU.

In FIG. 5VV, a portion of the route from waypoint 554-3 to waypoint 554-4 is displayed (and/or visually distinguished from other portions of route 580-8). Location indicator 552 is displayed at a location corresponding to waypoint 554-3. The map application transitions from the view in FIG. 5VV to the view in FIG. 5WW in accordance with predefined criteria, as discussed below with reference to operation 706, shown in FIG. 7A.

In FIG. 5WW, a portion of the route from waypoint 554-4 to waypoint 554-5 is displayed. Location indicator 552 is displayed at a location corresponding to waypoint 554-4 (i.e., at the next waypoint along the route after the waypoint identified by location indicator 552 in FIG. 5VV). FIG. 5WW also illustrates detection of contacts 555-A, 555-B, and 555-C at a location on touch screen 112 that corresponds to next step icon 550-2.

FIGS. 5XX-5YY illustrate an exemplary user interface with an animation in an entire route view. In FIGS. 5XX-5YY, the entire route of route 580-8 is displayed. Location indictor 552 is displayed on a portion of the route from waypoint 554-4 to waypoint 554-5. In some embodiments, location indicator 552 is displayed with an animation visually indicating advancement from waypoint 554-4 to waypoint 554-5. FIG. 5XX also illustrates detection of contacts 557-A, 557-B, and 557-C at a location on touch screen 112 that corresponds to next step icon 550-2. Similarly, FIG. 5YY also illustrates detection of contacts 559-A, 559-B, and 559-C at a location on touch screen 112 that corresponds to next step icon 550-2.

FIG. 5ZZ-5AAA depict a similar animation in the entire route view. In FIG. 5ZZ, contacts 561-A, 561-B, and 561-C are detected at a location on touch screen 112 that corresponds to next step icon 550-2. In FIG. 5AAA, contacts 563-A and 563-B are detected at a location on touch screen 112 that corresponds to next step icon 550-2. The map application determines how to update the user interface in accordance with a rate of (or time difference between) contacts 563-A and 563-B, as explained below with reference to FIG. 7A.

In FIG. 5BBB, a portion of the route from waypoint 554-6 to waypoint 554-7 is displayed (and/or visually distinguished from other options of route 580-8). FIGS. 5BBB-5CCC also illustrate an animation of location indicator 552 moving from waypoint 554-6 to waypoint 554-7. In FIG. 5CCC, contact 565 is detected at a location on touch screen 112 that corresponds to next step icon 550-2.

Similarly, in FIGS. 5DDD-5EEE, a portion of the route from waypoint 554-7 to waypoint 554-8 is displayed (and/or visually distinguished from other options of route 580-8). FIGS. 5DDD-5EEE also illustrate an animation of location indicator 552 moving from waypoint 554-7 to waypoint 554-8. FIG. 5EEE illustrates a completion of the animation.

Figure 6A:
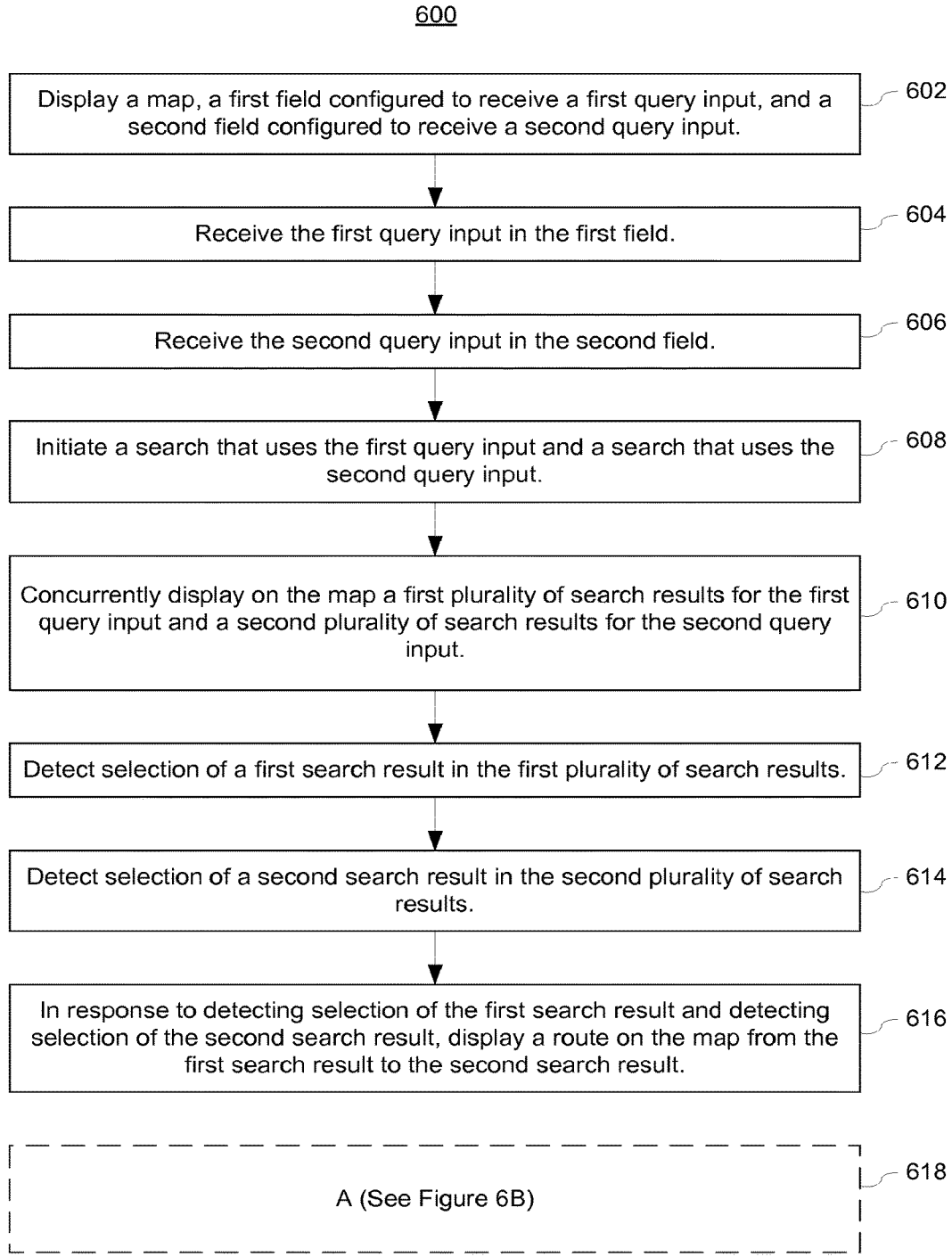
FIGS. 6A-6B are flow diagrams illustrating a method of mapping directions between search results in accordance with some embodiments.
Figure 6B:
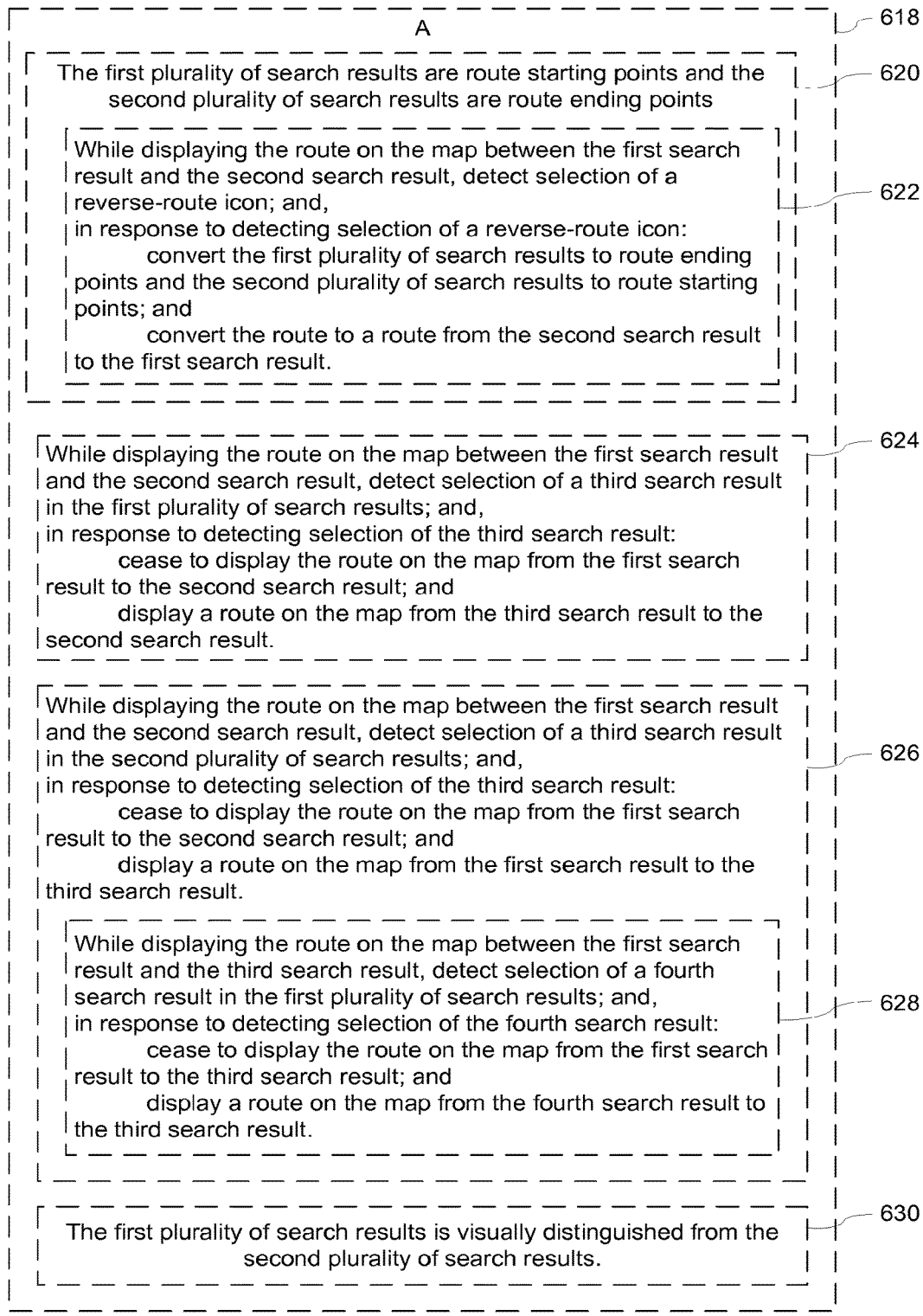

FIGS. 6A-6B are flow diagrams illustrating method 600 of mapping directions between search results in accordance with some embodiments. Method 600 is performed at a computing device (e.g., device 300, FIG. 3, or portable multifunction device 100, FIG. 1) having a display. In some embodiments, the device has a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to map directions between search results. The method reduces the cognitive burden on a user when mapping directions between search results, thereby creating a more efficient human-machine interface. For example, when a user searches for both starting points and ending points, conventional methods require that the user perform searches respectively for the starting points and the ending points.

Such multiple searches are tedious. In comparison, simultaneous display of search results for both starting points and ending points enables faster and more optimal selection of a starting point and an ending point (e.g., simultaneous display of hotels and coffee shops allows selection of a hotel that is most closely located to a coffee shop). For battery-operated computing devices, enabling a user to map directions between search results faster and more efficiently conserves power and increases the time between battery charges.

Device 100 displays (602) a map, a first field configured to receive a first query input, and a second field configured to receive a second query input (e.g., in a browser 147 or a dedicated mapping application 154). For example, in FIG. 5J, touch screen 112 displays map 520, a first field configured to receive a first query input (e.g., starting query input area 570), and a second field configured to receive a second query input (e.g., ending point input area 572). The first field is distinct from the second field (e.g., starting point input area 570 is distinct from ending point input area 572). The map, first field, and second field are typically displayed concurrently (e.g., FIG. 5J).

Device 100 receives (604) the first query input in the first field (e.g., via a physical keyboard, finger or stylus gestures on a soft keyboard, or speech recognition of audio input). For example, the first query input in starting point input area 570 is provided by contact 525 on a prior query input listed in recents popup view 540-5 (FIG. 5Q). Device 100 receives (606) the second query input in the second field, in a similar manner (e.g., recents popup view 540-6 in FIG. 5T can be used to provide the second query input in the second field).

In some embodiments, the second query input in the second field corresponds to a query input received in a third field. For example, a query input in the ending point input area 572 corresponds to a query input received in search term input area 516 (FIGS. 5I-5J).

Device 100 initiates (608) a search that uses the first query input and a search that uses the second query input. The search(es) may be performed at the computing device and/or at a remote server that can communicate with the computing device (e.g., a search engine server).

Device 100 concurrently displays (610) on the map a first plurality of search results for the first query input and a second plurality of search results for the second query input (e.g., starting point search result pins 522-1 and 522-2 and ending point search result pins 536-1 and 536-2 on map 520 in FIG. 5S).

Device 100 detects (612) selection (by a user) of a first search result in the first plurality of search results (e.g., via detecting a finger or stylus gesture on the first search result, detecting a mouse click when a cursor is positioned over the first search result, or speech recognition of audio input; for example, contact 535 on starting point search result pin 536-1 in FIG. 5X). In some embodiments, selection of a first search result in the first plurality of search results includes selection of the first search result in accordance with a first predefined criteria without a user's individual selection. For example, starting point search result pin 536-2 is selected without a user's individual selection (e.g., a contact) in FIG. 5S. The predefined criteria includes one or more of the following elements: proximity to a current location, proximity to a major road, proximity to the center of the map; and the sequence or ranking of the search results.

Device 100 detects (614) selection (by the user) of a second search result in the second plurality of search results (e.g., via detecting a finger or stylus gesture on the second search result, detecting a mouse click when a cursor is positioned over the second search result, or speech recognition of audio input); for example, contact 537 on ending point search result pin 522-1 in FIG. 5Z). In some embodiments, selection of a second search result in the second plurality of search results includes selection of the second search result in accordance with a second predefined criteria without a user's individual selection. For example, ending point search result pin 522-1 is selected without a user's individual selection (e.g., a contact) in FIG. 5J. The second predefined criteria is as described above. In some embodiments, the first predefined criteria is distinct from the second predefined criteria. In other embodiments, the first predefined criteria and the second criteria are identical.

In response to detecting selection of the first search result and detecting selection of the second search result, device 100 displays (616) a route on the map from the first search result to the second search result (e.g., route 580-5 in FIG. 5AA). The route may include directions for a car, a bus, or a walker (e.g., directions popup view 530 in FIG. 5AA may include directions).

In various embodiments, additional steps and/or limitations can be implemented (e.g., sec 618 in FIG. 6B).

In some embodiments, the first plurality of search results are route starting points and the second plurality of search results are route ending points (620). For example, the first plurality of search results for the first query input (e.g., query input in starting point input area 570) are route starting points (e.g., starting point search result pins 522) in FIG. 5S. Similarly, the second plurality of search results for the second query input (e.g., query input in ending point input area 572) are route ending points (e.g., ending point search result pins 536) in FIG. 5S.

In some embodiments, while displaying the route on the map between the first search result and the second search result, device 100 detects (622) selection of a reverse-route icon (e.g., via detecting a finger or stylus gesture on the reverse-route icon, detecting a mouse click when a cursor is positioned over the reverse-route icon, or speech recognition of audio input; for example, contact 531 on reverse-route icon 576 in FIG. 5U). In response to detecting selection of a reverse-route icon: device 100 converts the first plurality of search results to route ending points and the second plurality of search results to route starting points (e.g., starting point search result pins 536-1 and 536-2 are converted to ending point search result pins 522-3 and 522-4, and ending point search result pins 522-1 and 522-2 are converted to starting point search result pins 536-3 and 536-4 in FIGS. 5U-5V), and converts the route to a route from the second query result to the first query result (e.g., directions popup view 530 indicates the reversal of the route in FIGS. 5U-5V).

In some embodiments, while displaying the route on the map between the first search result and the second search result, device 100 detects (624) selection (by a user) of a third search result in the first plurality of search results (e.g., via detecting a finger or stylus gesture on the third search result, detecting a mouse click when a cursor is positioned over the third search result, or speech recognition of audio input). In response to detecting selection of the third search result, the device ceases to display the route on the map from the first search result to the second search result, and displays a route on the map from the third search result to the second search result (e.g., in response to detecting contact 535 on starting point search result pin 536-1 in FIG. 5X, route 580-4 from starting point search result pin 536-1 to ending point search result pin 522-2 is displayed in FIG. 5Y).

In some embodiments, while displaying the route on the map between the first search result and the second search result, device 100 detects (626) selection (by a user) of a third search result in the second plurality of search results (e.g., via detecting a finger or stylus gesture on the third search result, detecting a mouse click when a cursor is positioned over the third search result, or speech recognition of audio input). In response to detecting selection of the third search result, device 100 ceases to display the route on the map from the first search result to the second search result, and displays a route on the map from the first search result to the third search result (e.g., in response to detecting contact 537 on ending point search result pin 522-1 in FIG. 5Z, route 580-5 from starting point search result pin 536-1 to ending point search result pin 522-1 is displayed in FIG. 5AA).

In some embodiments, while displaying the route on the map between the first search result and the third search result, device 100 detects (628) selection (by a user) of a fourth search result in the first plurality of search results (e.g., via detecting a finger or stylus gesture on the fourth search result, detecting a mouse click when a cursor is positioned over the fourth search result, or speech recognition of audio input). In response to detecting selection of the fourth search result, device 100 ceases to display the route on the map from the first search result to the third search result, and displays a route on the map from the fourth search result to the third search result (e.g., in response to detecting contact 537 on ending point search result pin 522-1 in FIG. 5Z, route 580-5 from starting point search result pin 536-1 to ending point search result pin 522-1 is displayed in FIG. 5AA).

In some embodiments, the first plurality of search results is visually distinguished (630) from the second plurality of search results (e.g., by having different colors, patterns or shading, such as green pins for the first plurality when the first plurality are candidate route starting points and red pins for the second plurality when the second plurality are candidate route ending points). For example, starting point search result pins 536 are visually distinguished from ending point search result pins 522 in FIGS. 5S-5AA.

Figure 7A:
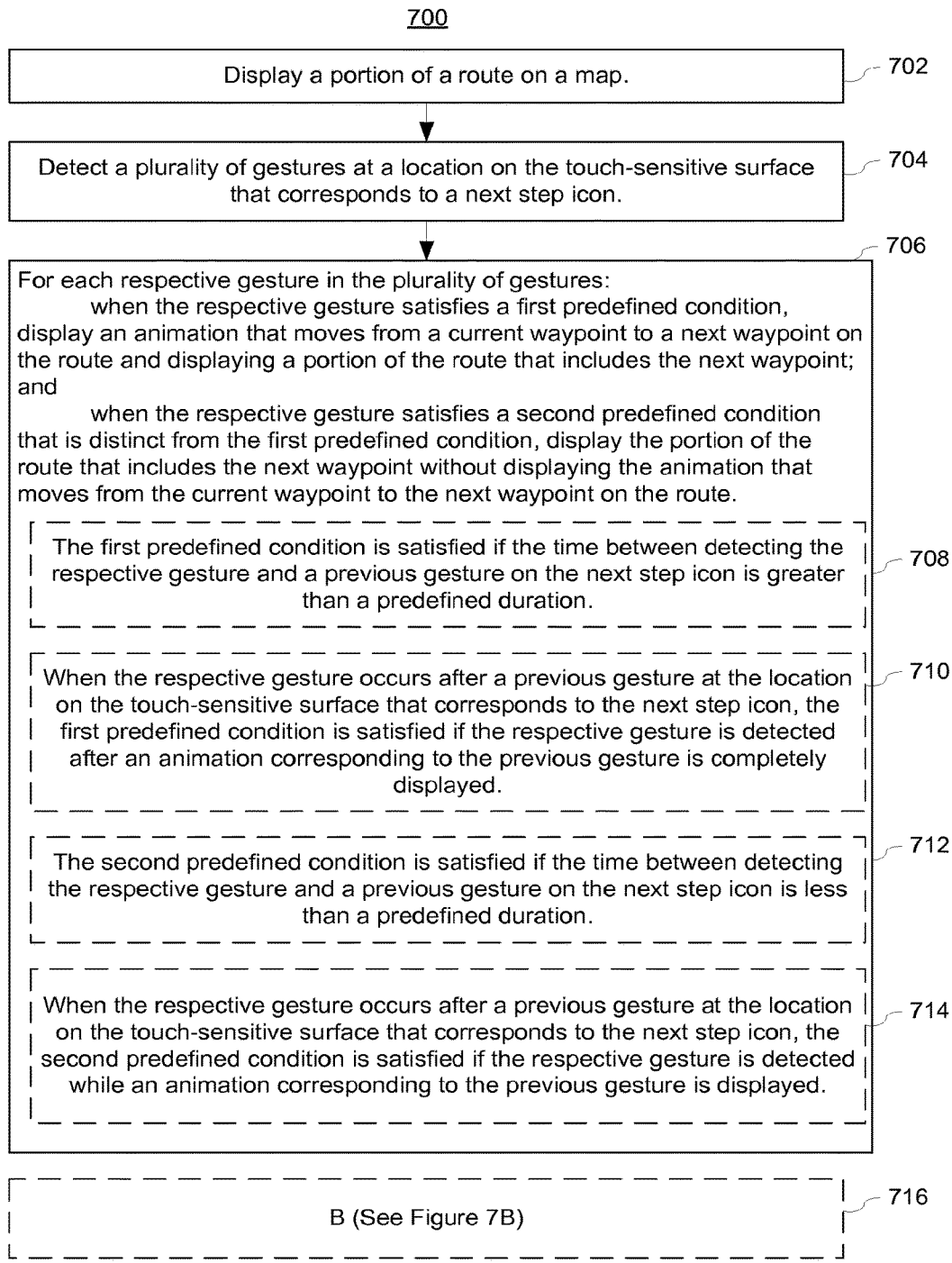
FIG. 7A-7B are flow diagrams illustrating a method of mapping portions of a route in accordance with some embodiments.
Figure 7B:
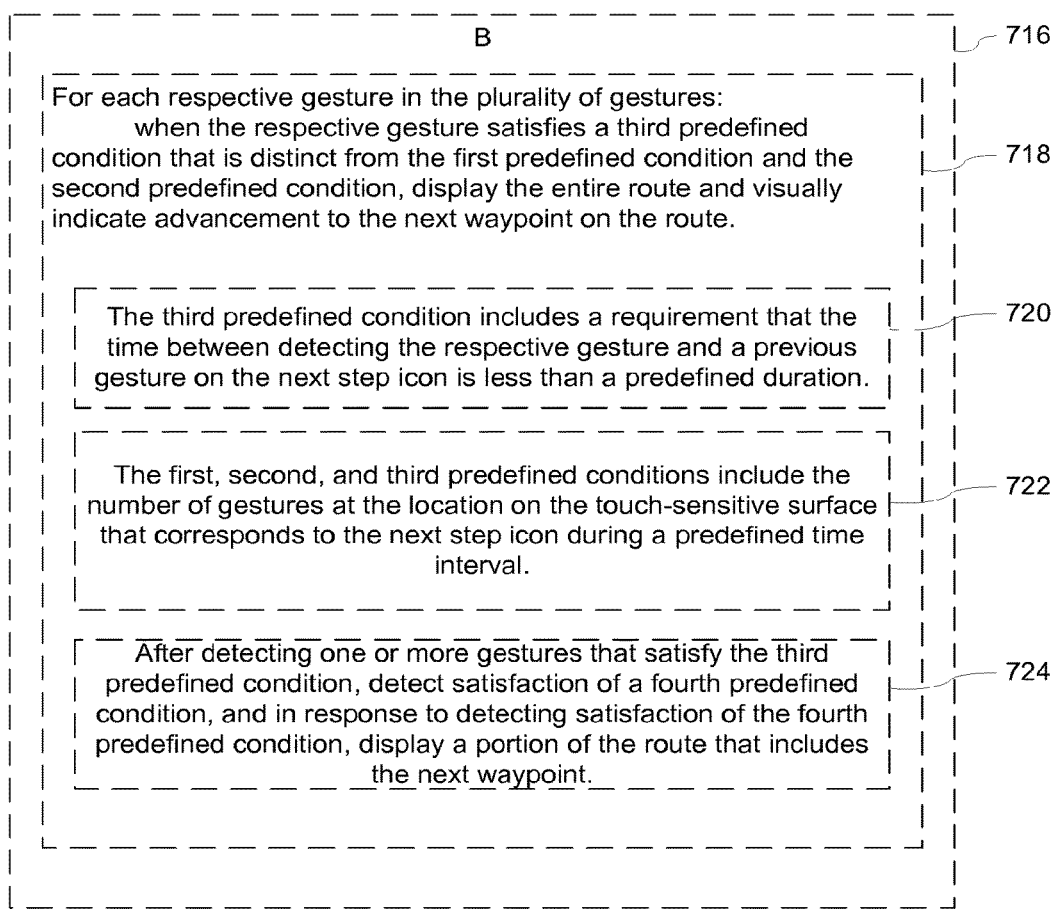

FIGS. 7A-7B are flow diagrams illustrating method 700 of mapping portions of a route in accordance with some embodiments. Method 700 is performed at a computing device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 provides an intuitive way to display portions of a route. The method reduces the cognitive burden on a user when displaying portions of a route, thereby creating a more efficient human-machine interface. For example, the method allows a user to see a relationship between a portion of a route and the entire route, thereby allowing a better comprehension of the route. In addition, the method enables accelerated display of portions of a route, thereby reducing the presentation time. For battery-operated computing devices, enabling a user to display portions of a route faster and more efficiently conserves power and increases the time between battery charges.

Device 100 displays (702) a portion of a route on a map (e.g., in a browser 147 or a dedicated mapping application 154). For example, a portion of a route (e.g., route 580-8) is displayed on map 520 in FIG. 5NN. The route is from a starting waypoint to an ending waypoint (e.g., route 580-8 in FIG. 5MM from starting point search result pin 536-6 to ending point search result pin 522-6).

Device 100 detects (704) a plurality of gestures (e.g., tap gestures made with a finger or a stylus; contacts 549, 551, 553, 555, 557, 559, 561, 563, and 565 in FIGS. 5NN-5CCC) at a location on the touch-sensitive surface that corresponds to a next step (or next waypoint) icon (e.g., next step icon 550-2).

For each respective gesture in the plurality of gestures, when the respective gesture satisfies a first predefined condition (e.g., the respective gesture is detected after displaying the animation; the time between detecting the respective gesture and a previous gesture on the next step icon is greater than a predefined duration; or the rate of gestures detected on the next step icon increases less than a predefined threshold), device 100 displays (706) an animation that moves from a current waypoint to a next waypoint on the route and displays a portion of the route that includes the next waypoint (e.g., FIGS. 5NN-5QQ), and when the respective gesture satisfies a second predefined condition that is distinct from the first predefined condition (e.g., the respective gesture is detected while displaying the animation; the time between detecting the respective gesture and a previous gesture on the next step icon is less than a predefined duration; or the rate of gestures detected on the next step icon increases more than a predefined threshold), device 100 displays the portion of the route that includes the next waypoint without displaying the animation that moves from the current waypoint to the next waypoint on the route (e.g., FIGS. 5VV-5WW). In some embodiments, when the respective gesture satisfies the second predefined condition that is distinct from the first predefined condition, device 100 displays a shorter animation that moves from the current waypoint to the next waypoint on the route and display the portion of the route that includes the next waypoint.

In some embodiments, the first predefined condition is satisfied (708) if the time between detecting the respective gesture and a previous gesture on the next step icon is greater than a predefined duration. In some embodiments, the predefined duration is between 0.1 and 2 seconds (e.g., 0.5 seconds).

In some embodiments, when the respective gesture occurs after a previous gesture at the location on the touch-sensitive surface that corresponds to the next step icon, the first predefined condition is satisfied (710) if the respective gesture is detected after an animation corresponding to the previous gesture is completely displayed (e.g., contact 551 in FIG. 5SS). Stated in another way that is logically equivalent, the first predefined condition is satisfied (710) when the respective gesture occurs after a previous gesture at the location on the touch-sensitive surface that corresponds to the next step icon and the respective gesture is detected after an animation corresponding to the previous gesture is completely displayed.

In some embodiments, the second predefined condition is satisfied (712) if the time between detecting the respective gesture and a previous gesture on the next step icon is less than a predefined duration. In some embodiments, the predefined duration is between 0.1 and 2 seconds (e.g., 0.5 seconds).

In some embodiments, when the respective gesture occurs after a previous gesture at the location on the touch-sensitive surface that corresponds to the next step icon, the second predefined condition is satisfied (714) if the respective gesture is detected while an animation corresponding to the previous gesture is displayed (contact 553-A or contact 553-B in FIG. 5TT). Stated in another way that is logically equivalent, the second predefined condition is satisfied (714) when the respective gesture occurs after a previous gesture at the location on the touch-sensitive surface that corresponds to the next step icon and the respective gesture is detected while an animation corresponding to the previous gesture is displayed.

In various embodiments, additional steps and/or limitations can be implemented (e.g., see 716 in FIG. 7B).

In some embodiments, for each respective gesture in the plurality of gestures, when the respective gesture satisfies a third predefined condition that is distinct from the first predefined condition and the second predefined condition (e.g., the time between detecting the respective gesture and a previous gesture on the next step icon is less than a predefined duration; the rate of gesture is more than a predefined rate), device 100 displays (718) the entire route and visually indicates advancement to the next waypoint on the route. For example, in response to contacts 555-A, 555-B, and 555-C in FIG. 5WW, the entire route is displayed and visual indication of advancement to the next waypoint is displayed in FIGS. 5WW-5YY.

In some embodiments, the third predefined condition is satisfied (720) if the time between detecting the respective gesture and a previous gesture on the next step icon is less than a predefined duration. In some embodiments, the predefined duration is between 0.1 and 2 seconds (e.g., 0.3 seconds).

In some embodiments, the first, second, and third predefined conditions include (722) the number of gestures at the location on the touch-sensitive surface that corresponds to the next step icon during a predefined time interval. In some embodiments, the predefined time interval is between 0.2 and 2 seconds (e.g., 1 second). In some embodiments, the number of gestures that satisfy the third predefined condition is one to five gestures within one second (e.g., three gestures in one second), or a corresponding number of gestures at the same rate of gestures for the predefined time interval (e.g., 2 gestures in 0.67 seconds has substantially the same rate as three gestures in one second).

In some embodiments, after detecting one or more gestures that satisfy the third predefined condition, device 100 detects (724) satisfaction of a fourth predefined condition (e.g., ceasing to detect another gesture on the next step icon for a predefined time period; the rate of the gestures on the next step icon is less than a predefined rate, wherein the predefined rate is between one and four taps per second; or the rate of the gestures on the next step icon decreases by more than a predefined percentage). In response to detecting satisfaction of the fourth predefined condition, device 100 displays a portion of the route that includes the next waypoint. In other words, the display transitions from showing the entire route and the location of the next waypoint in this overall route view to displaying just a portion of the route that includes the next waypoint. In some embodiments, this transition is animated. For example, in FIGS. 5ZZ-5BBB, the number of gestures during a respective predefined time interval decreases from three gestures in FIG. 5ZZ to two gestures in FIG. 5AAA. In response, device 100 ceases to display the entire route and displays a portion of the route in FIG. 5BBB. In addition, in FIG. 5BBB, an animation of location indicator 552 moving from waypoint 554-6 to waypoint 554-7 is displayed.

Figure 8A:
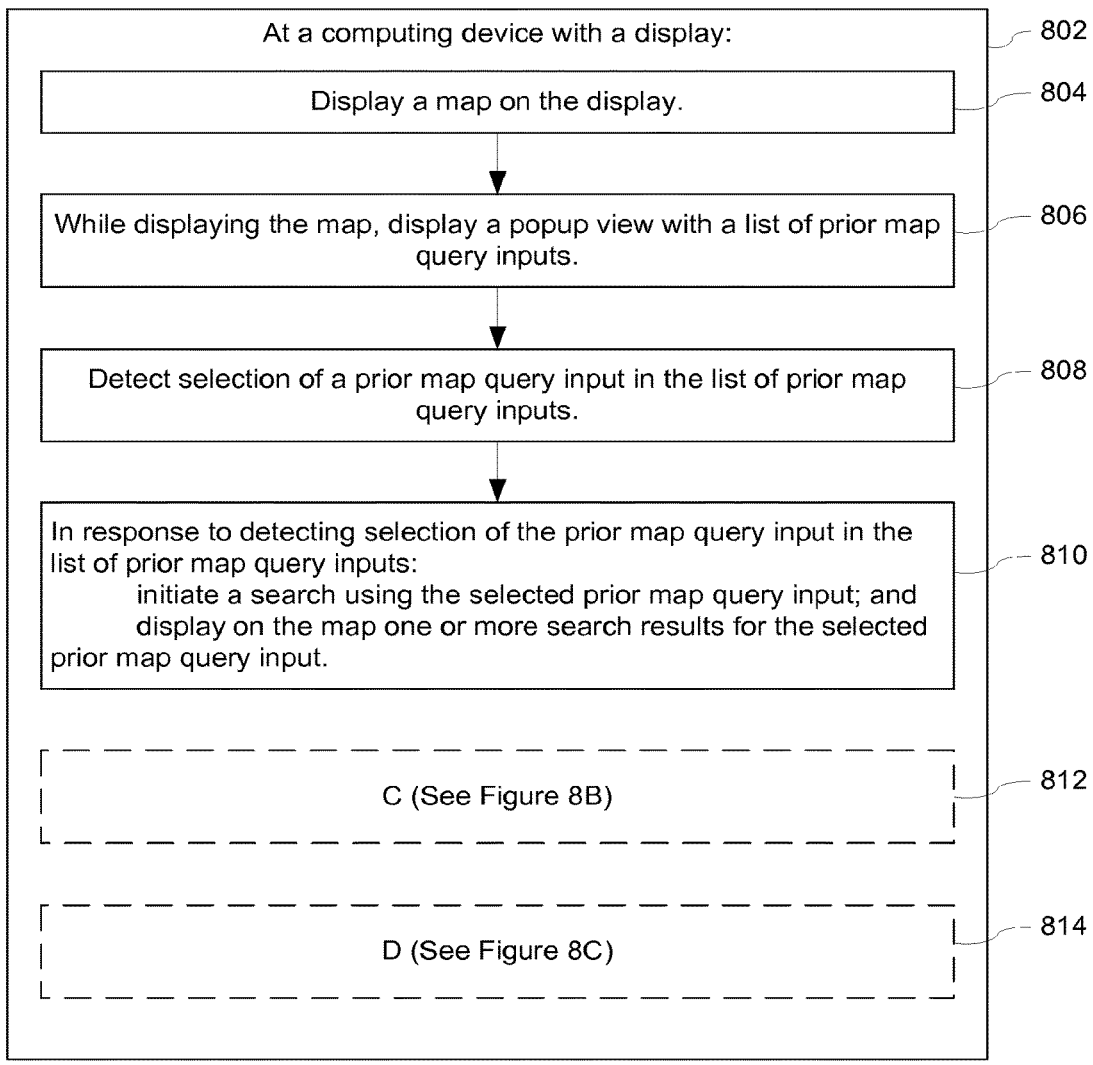
FIGS. 8A-8C are flow diagrams illustrating a method of displaying a popup view with a list of prior query inputs in accordance with some embodiments.
Figure 8B:
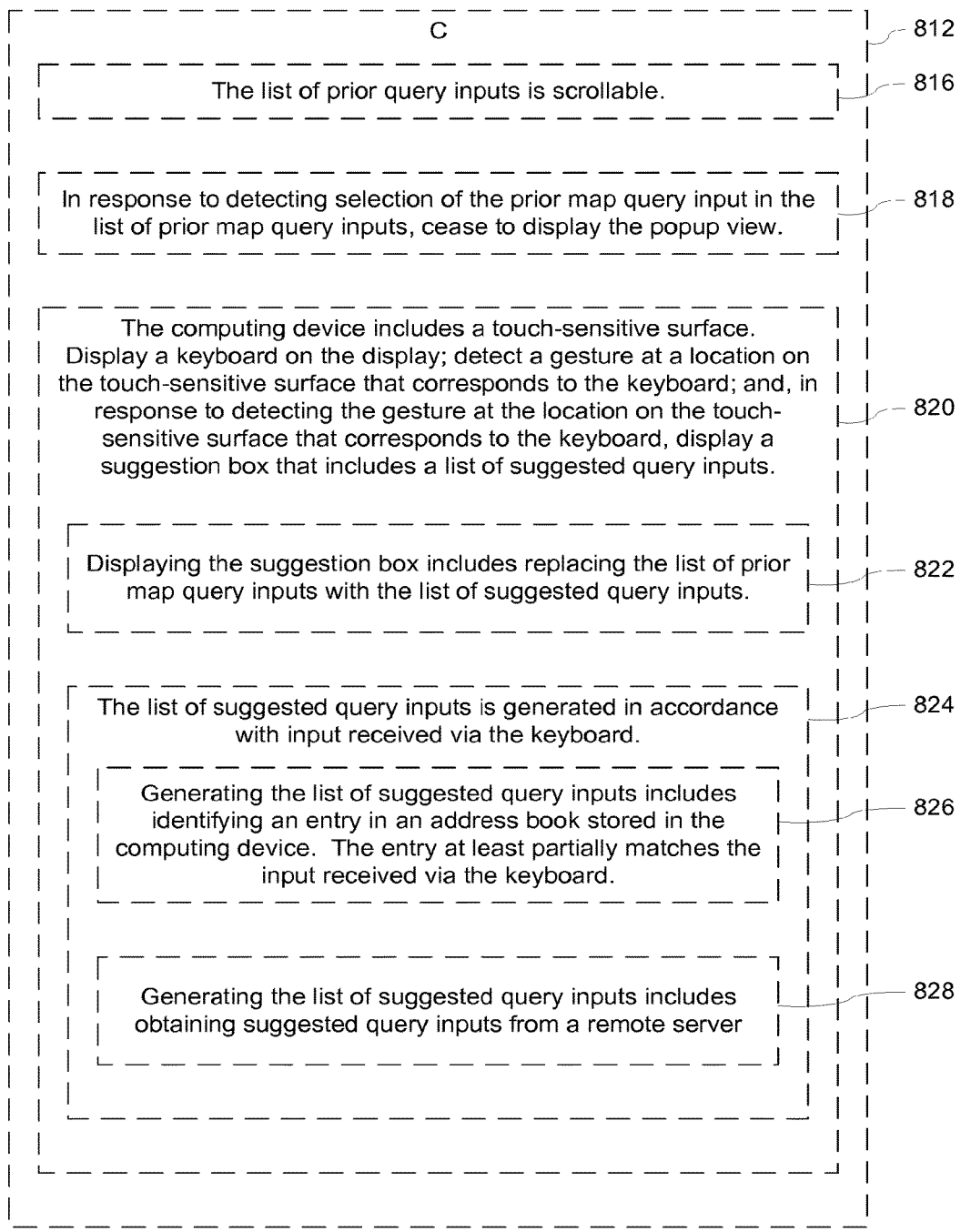
Figure 8C:
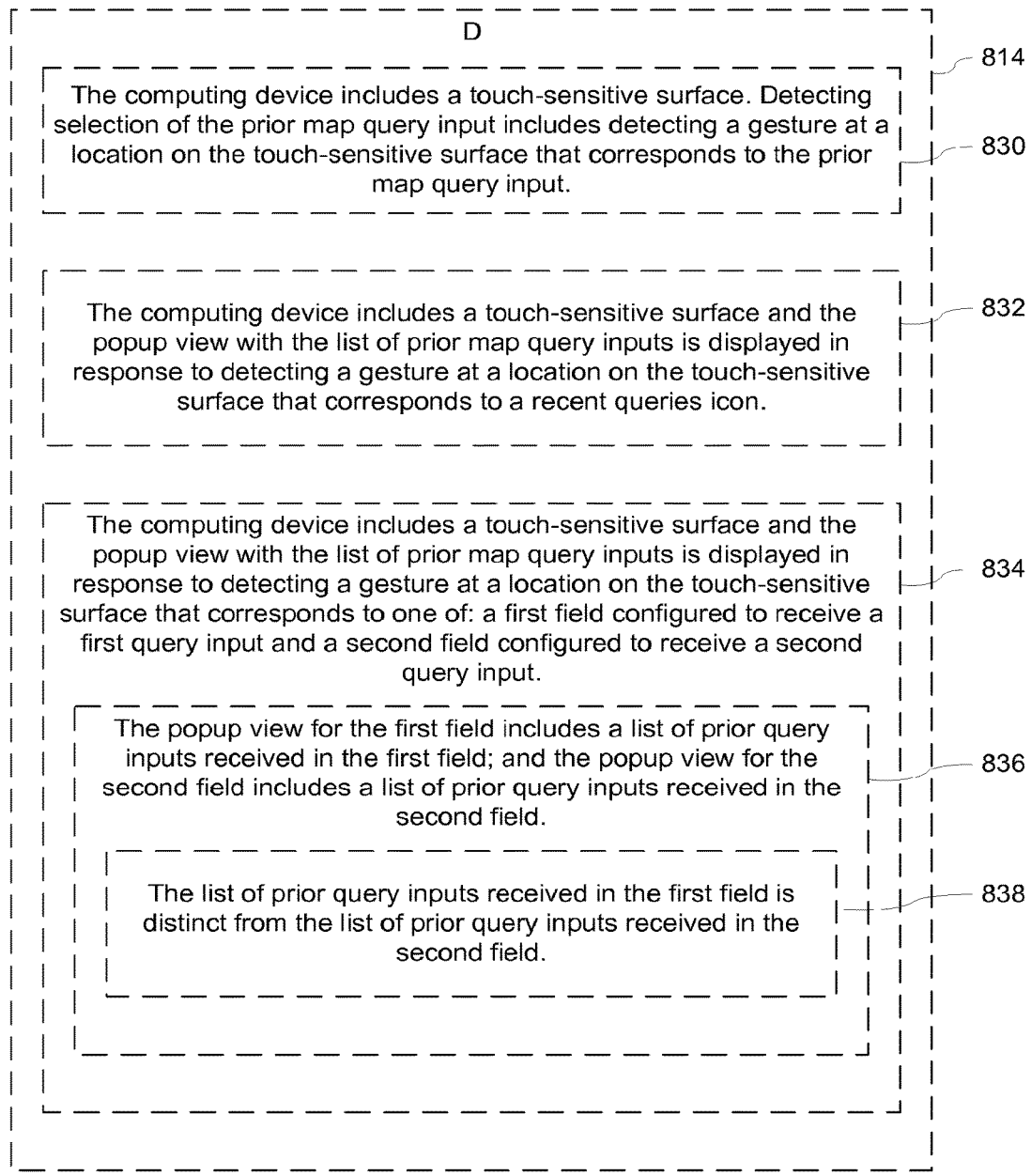

FIGS. 8A-8C are flow diagrams illustrating method 800 of displaying a popup view with a list of prior query inputs in accordance with some embodiments. Method 800 is performed at a computing device (e.g., device 300, FIG. 3, or portable multifunction device 100, FIG. 1) with a display. In some embodiments, the device has a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, method 800 provides an intuitive way to display a popup view with a list of prior query inputs. The method reduces the cognitive burden on a user when displaying a popup view with a list of prior query inputs, thereby creating a more efficient human-machine interface. For example, allowing a user to select a query input from the list of prior query inputs improves accuracy (e.g., by avoiding typographical errors associated with typing, and/or reducing errors associated with speech recognition of new query inputs) and efficiency (e.g., by avoiding having to provide a query input again). Concurrent display of the list of prior query inputs and a portion of a map reminds the user of the area of the map for which a search is to be initiated, thereby reducing the cognitive burden on the user. For battery-operated computing devices, enabling a user to display a popup view with a list of prior query inputs faster and more efficiently conserves power and increases the time between battery charges.

Device 100 includes a computing device with a display (802). Device 100 displays (804) a map on the display (e.g., in a browser 147 or a dedicated mapping application 154). For example, device 100 displays map 520 on touch screen 112 in FIG. 5A.

While displaying the map, device 100 displays (806) a popup view with a list of prior query inputs (e.g., recents popup views 540-1 in FIG. 5B, 540-5 in FIG. 5P, and 540-6 in FIG. 5T).

Device 100 detects (808) selection of a prior query input in the list of prior query inputs (e.g., via detecting a gesture on the prior query input, detecting a mouse click when a cursor is positioned over the prior query input, or speech recognition of audio input). For example, contact 525 is detected on prior query input 546-7 in FIG. 5Q.

In response to detecting selection of the prior query input in the list of prior query inputs, device 100 initiates (810) a search using the selected prior query input, and displays on the map one or more search results for the selected prior query input (e.g., starting point search result pins 536 in FIGS. 5R-5S).

In some embodiments, initiating a search using the selected prior query input includes retrieving search results from a previous search using the selected prior query input. In some embodiments, retrieving search results from a previous search using the selected prior query input includes retrieving a subset of search results stored in device 100. In other embodiments, retrieving search results from a previous search using the selected prior query input includes retrieving a subset of search results stored in a remote server (e.g., a server providing map information retrieval services).

In various embodiments, additional steps and/or limitations (e.g., see 812 in FIG. 8B and 814 in FIG. 8C) may be implemented.

In some embodiments, the list of prior query inputs is scrollable (816) (e.g., recents popup view 540-1 is scrollable, as illustrated in FIGS. 5B-5C).

In some embodiments, in response to detecting selection of the prior query input in the list of prior query inputs, device 100 ceases to display the popup view (818) (e.g., in FIGS. 5Q-5R, after detecting contact 525 on prior query input 546-7, the map application ceases to display recents popup view 540-5 on touch screen 112).

In some embodiments, the computing device includes (820) a touch-sensitive surface (e.g., a track pad or a touch-sensitive display). Device 100 displays a keyboard on the display, detects a gesture at a location on the touch-sensitive surface that corresponds to the keyboard (e.g., a tap gesture on a key in the keyboard). In response to detecting the gesture at the location on the touch-sensitive surface that corresponds to the keyboard, device 100 displays a suggestion box that includes a list of suggested query inputs (e.g., suggestions popup view 540-2 in FIG. 5D).

In some embodiments, displaying the suggestion box includes replacing the list of prior query inputs with the list of suggested query inputs (822) (e.g., suggestions pop up view 540-2 replaces recents popup view 540-1 in FIGS. 5C-5D).

In some embodiments, the list of suggested query inputs is generated (824) in accordance with input (e.g., input in a search field) received via the keyboard (e.g., the respective list of suggested query inputs in FIGS. 5D-5E is generated in accordance with a query input in search term input area 516).

In some embodiments, generating the list of suggested query inputs includes (826) identifying an entry in an address book stored in the computing device (e.g., "Henry Doe" and "Thomas Holmes" in suggestions popup view 540-2 may be entries in an address book stored in device 100). The entry at least partially matches the input received via the keyboard (e.g., "Henry Doe" starts with the character "h" received in search term input area 516; similarly, the last name of "Thomas Holmes" starts with the character "h").

In some embodiments, generating the list of suggested query inputs includes (828) obtaining suggested query inputs from a remote server. In some embodiments, the remote server is a search engine or a server providing map information retrieval services. In some embodiments, the remote server includes a map database.

In some embodiments, the computing device includes (830) a touch-sensitive surface (e.g., a track pad or a touch-sensitive display), and device 100 detects selection of the prior query input by detecting a gesture (e.g., a tap gesture made with a finger or a stylus) at a location on the touch-sensitive surface that corresponds to the prior query input (e.g., contact 525 at a location that corresponds to prior query input 546-7 in FIG. 5Q).

In some embodiments, the computing device includes (832) a touch-sensitive surface (e.g., a track pad or a touch-sensitive display), and the popup view with the list of prior query inputs is displayed in response to detecting a gesture (e.g., a tap gesture made with a finger or a stylus) at a location on the touch-sensitive surface that corresponds to a recent queries icon. For example, in some embodiments, list icon 574 in FIG. 5K when activated initiates the display of the list of prior query inputs, such as recents popup view 540-4 in FIG. 5L.

In some embodiments, the computing device includes (834) a touch-sensitive surface (e.g., a track pad or a touch-sensitive display), and the popup view with the list of prior query inputs is displayed in response to detecting a gesture (e.g., a tap gesture made with a finger or a stylus) at a location on the touch-sensitive surface that corresponds to one of: a first field configured to receive a first query input and a second field configured to receive a second query input. For example, in response to contact 523 in FIG. 5O, recents popup view 540-5 is displayed in FIG. 5P. In some embodiments, the first field (e.g., starting point input area 570) is a start field configured to receive a starting location or a query (e.g., a query concerning the start location of a route), and the second field (e.g., ending point input area 572) is an end field configured to receive an ending location or a query (e.g., a query concerning the end location of the route).

In some embodiments, the popup view for the first field includes (836) a list of prior query inputs received in the first field (e.g., recents popup view 540-5 in FIG. 5P), and the popup view for the second field includes a list of prior query inputs received in the second field (e.g., recents popup view 540-6 in FIG. 5T).

In some embodiments, the list of prior query inputs received in the first field is distinct from the list of prior query inputs received in the second field (838). For example, in these embodiments, the list of prior query inputs in recents popup view 540-5 in FIG. 5P is distinct from the list of prior query inputs in recents popup view 540-6 in FIG. 5T. However, in some other embodiments, the same list of prior query inputs is provided for both the first field (e.g., for specifying a starting point) and the second field (e.g., for specifying an ending point).

The operations described above with reference to FIGS. 6A-6B, 7A-7B, and 8A-8C may be implemented by components depicted in FIGS. 1A-1C. For example, receiving operations 604 and 606, detecting operations 612 and 614, and displaying operation 616 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates event handler 180 associated with the detection of the event or sub-event. Event handler 180 may utilize or call data updater 176 or object updater 177 to update the internal state of application 136-1 data. In some embodiments, event handler 180 accesses respective GUI updater 178 to update what is displayed by the application. Similarly, it would be clear to a person having ordinary skill in the art how other processes can be implemented based on the components depicted in FIGS. 1A-1C.

The operations in the information processing methods described above may be implemented by running one or more functional modules in information processing apparatus such as general purpose processors or application specific chips. These modules, combinations of these modules, and/or their combination with information processing and storage hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a computing device with a display:
displaying a map on the display, wherein displaying a map on the display includes displaying on the map one or more search results for a prior search;
while displaying the map including displaying one or more search results for the prior search, displaying a popup view with a list of prior query inputs, wherein the list of prior query inputs is displayed concurrently with the one or more search results;
detecting selection of a prior query input in the list of prior query inputs; and
in response to detecting selection of the prior query input in the list of prior query inputs:
initiating a search using the selected prior query input; and
displaying on the map one or more search results for the selected prior query input, while maintaining the one more search results for the prior search on the map.

2. The method of claim 1, wherein the list of prior query inputs is scrollable.

3. The method of claim 1, including:
in response to detecting selection of the prior query input in the list of prior query inputs, ceasing to display the popup view.

4. The method of claim 1, wherein the computing device includes a touch-sensitive surface and detecting selection of the prior query input includes detecting a gesture at a location on the touch-sensitive surface that corresponds to the prior query input.

5. The method of claim 1, wherein the computing device includes a touch-sensitive surface, the method including:
displaying a keyboard on the display;
detecting a gesture at a location on the touch-sensitive surface that corresponds to the keyboard; and
in response to detecting the gesture at the location on the touch-sensitive surface that corresponds to the keyboard, displaying a suggestion box that includes a list of suggested query inputs.

6. The method of claim 5, wherein displaying the suggestion box includes replacing the list of prior query inputs with the list of suggested query inputs.

7. The method of claim 5, wherein the list of suggested query inputs is generated in accordance with input received via the keyboard.

8. The method of claim 7, wherein generating the list of suggested query inputs includes identifying an entry in an address book stored in the computing device, the entry at least partially matching the input received via the keyboard.

9. The method of claim 7, wherein generating the list of suggested query inputs includes obtaining suggested query inputs from a remote server.

10. The method of claim 9, wherein the computing device includes a touch-sensitive surface and the popup view with the list of prior query inputs is displayed in response to detecting a gesture at a location on the touch-sensitive surface that corresponds to a recent queries icon.

11. The method of claim 9, wherein the computing device includes a touch-sensitive surface and the popup view with the list of prior query inputs is displayed in response to detecting a gesture at a location on the touch-sensitive surface that corresponds to one of: a first field configured to receive a first query input and a second field configured to receive a second query input.

12. The method of claim 11, wherein the popup view for the first field includes a list of prior query inputs received in the first field; and the popup view for the second field includes a list of prior query inputs received in the second field.

13. The method of claim 12, wherein the list of prior query inputs received in the first field is distinct from the list of prior query inputs received in the second field.

14. A computing device, comprising:
a display;
one or more processors;
memory; and
one or more programs, wherein the one or more programs are stored in the memory and configured to be executed by the one or more processors, the one or more programs including instructions for:
displaying a map on the display, wherein displaying a map on the display includes displaying on the map one or more search results for a prior search;
while displaying the map including displaying one or more search results for the prior search, displaying a popup view with a list of prior query inputs, wherein the list of prior query inputs is displayed concurrently with the one or more search results;
detecting selection of a prior query input in the list of prior query inputs; and
in response to detecting selection of the prior query input in the list of prior query inputs:
initiating a search using the selected prior query input; and
displaying on the map one or more search results for the selected prior query input, while maintaining the one more search results for the prior search on the map.

15. The computing device of claim 14, wherein the list of prior query inputs is scrollable.

16. The computing device of claim 14, the one or more programs further including instructions for:
in response to detecting selection of the prior query input in the list of prior query inputs, ceasing to display the popup view.

17. The computing device of claim 14, wherein the computing device includes a touch-sensitive surface and detecting selection of the prior query input includes detecting a gesture at a location on the touch-sensitive surface that corresponds to the prior query input.

18. The computing device of claim 14, wherein the computing device includes a touch-sensitive surface, the one or more programs further including instructions for:
displaying a keyboard on the display;
detecting a gesture at a location on the touch-sensitive surface that corresponds to the keyboard; and
in response to detecting the gesture at the location on the touch-sensitive surface that corresponds to the keyboard, displaying a suggestion box that includes a list of suggested query inputs.

19. The computing device of claim 18, wherein displaying the suggestion box includes replacing the list of prior query inputs with the list of suggested query inputs.

20. The computing device of claim 18, wherein the list of suggested query inputs is generated in accordance with input received via the keyboard.

21. The computing device of claim 20, wherein generating the list of suggested query inputs includes identifying an entry in an address book stored in the computing device, the entry at least partially matching the input received via the keyboard.

22. The computing device of claim 20, wherein generating the list of suggested query inputs includes obtaining suggested query inputs from a remote server.

23. The computing device of claim 22, wherein the computing device includes a touch-sensitive surface and the popup view with the list of prior query inputs is displayed in response to detecting a gesture at a location on the touch-sensitive surface that corresponds to a recent queries icon.

24. The computing device of claim 22, wherein the computing device includes a touch-sensitive surface and the popup view with the list of prior query inputs is displayed in response to detecting a gesture at a location on the touch-sensitive surface that corresponds to one of: a first field configured to receive a first query input and a second field configured to receive a second query input.

25. The computing device of claim 24, wherein the popup view for the first field includes a list of prior query inputs received in the first field; and the popup view for the second field includes a list of prior query inputs received in the second field.

26. The computing device of claim 25, wherein the list of prior query inputs received in the first field is distinct from the list of prior query inputs received in the second field.

27. A non-transitory computer-readable storage medium storing one or more programs configured to be executed by one or more processors of a computing device, the one or more programs including instructions for:
    displaying a map on the display, wherein displaying a map on the display includes displaying on the map one or more search results for a prior search;
    while displaying the map including displaying one or more search results for the prior search, displaying a popup view with a list of prior query inputs, wherein the list of prior query inputs is displayed concurrently with the one or more search results;
    detecting selection of a prior query input in the list of prior query inputs; and
    in response to detecting selection of the prior query input in the list of prior query inputs:
        initiating a search using the selected prior query input; and
        displaying on the map one or more search results for the selected prior query input, while maintaining the one more search results for the prior search on the map.

28. The non-transitory computer-readable storage medium of claim 27, wherein the list of prior query inputs is scrollable.

29. The non-transitory computer-readable storage medium of claim 27, the one or more programs further including instructions for:
    in response to detecting selection of the prior query input in the list of prior query inputs, ceasing to display the popup view.

30. The non-transitory computer-readable storage medium of claim 27, wherein the computing device includes a touch-sensitive surface and detecting selection of the prior query input includes detecting a gesture at a location on the touch-sensitive surface that corresponds to the prior query input.

31. The non-transitory computer-readable storage medium of claim 27, wherein the computing device includes a touch-sensitive surface, the one or more programs further including instructions for:
    displaying a keyboard on the display;
    detecting a gesture at a location on the touch-sensitive surface that corresponds to the keyboard; and
    in response to detecting the gesture at the location on the touch-sensitive surface that corresponds to the keyboard, displaying a suggestion box that includes a list of suggested query inputs.

32. The non-transitory computer-readable storage medium of claim 31, wherein displaying the suggestion box includes replacing the list of prior query inputs with the list of suggested query inputs.

33. The non-transitory computer-readable storage medium of claim 31, wherein the list of suggested query inputs is generated in accordance with input received via the keyboard.

34. The non-transitory computer-readable storage medium of claim 33, wherein generating the list of suggested query inputs includes identifying an entry in an address book stored in the computing device, the entry at least partially matching the input received via the keyboard.

35. The non-transitory computer-readable storage medium of claim 33, wherein generating the list of suggested query inputs includes obtaining suggested query inputs from a remote server.

36. The non-transitory computer-readable storage medium of claim 35, wherein the computing device includes a touch-sensitive surface and the popup view with the list of prior query inputs is displayed in response to detecting a gesture at a location on the touch-sensitive surface that corresponds to a recent queries icon.

37. The non-transitory computer-readable storage medium of claim 35, wherein the computing device includes a touch-sensitive surface and the popup view with the list of prior query inputs is displayed in response to detecting a gesture at a location on the touch-sensitive surface that corresponds to one of: a first field configured to receive a first query input and a second field configured to receive a second query input.

38. The non-transitory computer-readable storage medium of claim 37, wherein the popup view for the first field includes a list of prior query inputs received in the first field; and the popup view for the second field includes a list of prior query inputs received in the second field.

39. The non-transitory computer-readable storage medium of claim 38, wherein the list of prior query inputs received in the first field is distinct from the list of prior query inputs received in the second field.

* * * * *